US009828082B2

(12) United States Patent
Goelet

(10) Patent No.: US 9,828,082 B2
(45) Date of Patent: Nov. 28, 2017

(54) AIRSHIP HAVING A CARGO COMPARTMENT

(71) Applicant: LTA Corporation, New York, NY (US)

(72) Inventor: John Goelet, Washington, DC (US)

(*) Notice: Subject to any disclaimer, the term of this patent is extended or adjusted under 35 U.S.C. 154(b) by 0 days.

(21) Appl. No.: 14/532,546

(22) Filed: Nov. 4, 2014

(65) Prior Publication Data

US 2015/0060598 A1 Mar. 5, 2015

Related U.S. Application Data

(63) Continuation of application No. 14/032,806, filed on Sep. 20, 2013, now Pat. No. 8,899,514, which is a
(Continued)

(51) Int. Cl.
*B64B 1/34* (2006.01)
*B64B 1/06* (2006.01)
(Continued)

(52) U.S. Cl.
CPC ............. *B64B 1/06* (2013.01); *B64B 1/005* (2013.01); *B64B 1/08* (2013.01); *B64B 1/10* (2013.01);
(Continued)

(58) Field of Classification Search
CPC .. B64B 1/005; B64B 1/06; B64B 1/08; B64B 1/10; B64B 1/16; B64B 1/20; B64B 1/22;
(Continued)

(56) References Cited

U.S. PATENT DOCUMENTS

| 1,027,590 A | 5/1912 | Bucher |
| 1,261,005 A | 4/1918 | Barstow et al. |
| | (Continued) | |

FOREIGN PATENT DOCUMENTS

| CA | 1054124 A1 | 5/1979 |
| DE | 210003 | 5/1909 |
| | (Continued) | |

OTHER PUBLICATIONS

International Search Report and the Written Opinion dated Oct. 8, 2012, in counterpart International Application No. PCT/US2012/030562, 24 pages.
(Continued)

*Primary Examiner* — Medhat Badawi
(74) *Attorney, Agent, or Firm* — Finnegan, Henderson, Farabow, Garrett & Dunner LLP

(57) ABSTRACT

A solar-powered airship with a hull configured to contain a gas and at least one propulsion assembly with a propulsion device and electric motors configured to drive the propulsion device. The airship may also include a power supply system including solar panels operatively coupled to the electric motors and configured to supply power to the electric motors. The power supply system may also include batteries operatively coupled to the solar panels and configured to receive and store electrical energy supplied by the solar panels, the batteries being further operatively coupled to the electric motors and configured to supply power to the electric motors. The batteries may each be located within an outer envelope of the airship defined by the hull of the airship in a position selected to provide ballast. The solar-powered airship may also include a cargo system configured to contain passengers or freight.

11 Claims, 35 Drawing Sheets

Related U.S. Application Data continuation of application No. 13/182,864, filed on Jul. 14, 2011, now Pat. No. 8,894,002.

(60) Provisional application No. 61/366,125, filed on Jul. 20, 2010.

(51) Int. Cl.
  *B64B 1/00* (2006.01)
  *B64B 1/08* (2006.01)
  *B64B 1/10* (2006.01)
  *B64B 1/16* (2006.01)
  *B64B 1/20* (2006.01)
  *B64B 1/22* (2006.01)
  *B64B 1/28* (2006.01)
  *B64B 1/30* (2006.01)
  *B64B 1/58* (2006.01)
  *B64D 9/00* (2006.01)

(52) U.S. Cl.
  CPC .............. *B64B 1/16* (2013.01); *B64B 1/20* (2013.01); *B64B 1/22* (2013.01); *B64B 1/28* (2013.01); *B64B 1/30* (2013.01); *B64B 1/58* (2013.01); *B64D 9/00* (2013.01)

(58) Field of Classification Search
  CPC .... B64B 1/28; B64B 1/30; B64B 1/58; B64C 2201/022; B64C 25/56; B64D 9/00
  See application file for complete search history.

(56) References Cited

U.S. PATENT DOCUMENTS

| | | | |
|---|---|---|---|
| 1,350,211 A | 8/1920 | Corson, Jr. | |
| 1,944,467 A | 1/1934 | Sabin | |
| 2,286,014 A | 6/1942 | Rowe | |
| 2,379,355 A | 6/1945 | Hodgdon | |
| 2,935,275 A | 5/1960 | Grayson | |
| 3,337,845 A | 8/1967 | Hart | |
| 3,395,877 A | 8/1968 | McFadden et al. | |
| 3,432,120 A | 3/1969 | Guerrero | |
| D213,731 S | 4/1969 | Hsi | |
| 3,477,168 A | 11/1969 | Trodglen, Jr. | |
| 3,529,283 A | 9/1970 | Emerson | |
| 3,580,636 A | 5/1971 | Setto | |
| RE28,454 E | 6/1975 | Fitzpatrick et al. | |
| 3,946,364 A | 3/1976 | Codomo et al. | |
| 3,970,270 A | 7/1976 | Pittet, Jr. | |
| 3,971,533 A | 7/1976 | Slater | |
| 3,976,265 A | 8/1976 | Doolittle | |
| 4,085,912 A | 4/1978 | Slater | |
| 4,269,375 A | 5/1981 | Hickey | |
| 4,298,175 A | 11/1981 | Earl | |
| 4,326,681 A | 4/1982 | Eshoo | |
| 4,461,436 A | 7/1984 | Messina | |
| D274,999 S | 8/1984 | Reeves | |
| D280,194 S | 8/1985 | Bothe | |
| 4,583,094 A | 4/1986 | Mosier | |
| 4,685,640 A | 8/1987 | Warrington et al. | |
| D305,418 S | 1/1990 | Blake | |
| 4,901,948 A | 2/1990 | Panos | |
| D307,131 S | 4/1990 | Kramer | |
| 4,914,976 A | 4/1990 | Wyllie | |
| 4,915,792 A | 4/1990 | Zeilon | |
| D307,884 S | 5/1990 | Ninkovich | |
| D309,887 S | 8/1990 | Ninkovich | |
| 5,096,141 A | 3/1992 | Schley | |
| 5,170,963 A | 12/1992 | Beck, Jr. | |
| 5,240,206 A | 8/1993 | Omiya | |
| 5,281,960 A | 1/1994 | Dwyer, III | |
| 5,348,251 A | 9/1994 | Ferguson | |
| 5,351,911 A | 10/1994 | Neumayr | |
| 5,368,256 A | 11/1994 | Kalisz et al. | |
| 5,447,110 A * | 9/1995 | Brown | B65D 1/0292 141/114 |
| 5,516,060 A | 5/1996 | McDonnell | |
| 5,614,897 A | 3/1997 | Durnford | |
| 5,675,327 A | 10/1997 | Coirier et al. | |
| 5,755,402 A | 5/1998 | Henry | |
| 5,769,317 A * | 6/1998 | Sokhey | B64C 15/02 239/1 |
| 5,823,468 A | 10/1998 | Bothe | |
| 5,906,335 A | 5/1999 | Thompson | |
| D418,804 S | 1/2000 | Glasgow et al. | |
| 6,010,093 A * | 1/2000 | Paulson | B64B 1/50 244/24 |
| 6,019,312 A | 2/2000 | Blenn | |
| D424,508 S | 5/2000 | Hankinson et al. | |
| 6,156,102 A | 12/2000 | Conrad et al. | |
| 6,164,589 A | 12/2000 | Kalisz | |
| 6,196,498 B1 | 3/2001 | Eichstedt et al. | |
| 6,230,503 B1 | 5/2001 | Spletzer | |
| 6,231,007 B1 * | 5/2001 | Schafer | B64B 1/22 244/116 |
| 6,286,783 B1 | 9/2001 | Kuenkler | |
| 6,293,493 B1 | 9/2001 | Eichstedt et al. | |
| 6,302,357 B1 | 10/2001 | Kalisz | |
| 6,302,944 B1 | 10/2001 | Hoenig | |
| 6,311,925 B1 | 11/2001 | Rist | |
| 6,315,242 B1 | 11/2001 | Eichstedt et al. | |
| 6,328,257 B1 | 12/2001 | Schäfer | |
| 6,336,957 B1 | 1/2002 | Tsymerman | |
| 6,360,549 B1 | 3/2002 | Spletzer et al. | |
| 6,383,727 B1 | 5/2002 | Twist et al. | |
| 6,393,719 B1 | 5/2002 | Stipp | |
| 6,427,943 B2 | 8/2002 | Yokomaku et al. | |
| 6,453,684 B1 | 9/2002 | Spletzer et al. | |
| 6,499,309 B1 | 12/2002 | Yeh | |
| 6,511,525 B2 | 1/2003 | Spletzer et al. | |
| 6,549,179 B2 | 4/2003 | Youngquist et al. | |
| 6,565,037 B1 | 5/2003 | Tonkovich | |
| 6,574,979 B2 | 6/2003 | Faqih | |
| 6,577,929 B2 | 6/2003 | Johnson et al. | |
| 6,644,060 B1 | 11/2003 | Dagon | |
| 6,648,272 B1 | 11/2003 | Kothmann | |
| 6,659,838 B1 | 12/2003 | Anderson | |
| 6,670,304 B2 | 12/2003 | Chang | |
| 6,702,229 B2 | 3/2004 | Anderson et al. | |
| 6,860,449 B1 * | 3/2005 | Chen | B64B 1/06 244/12.1 |
| 6,868,690 B2 | 3/2005 | Faqih | |
| 6,880,783 B2 | 4/2005 | Munk | |
| 6,885,313 B2 | 4/2005 | Selk et al. | |
| 6,892,118 B1 | 5/2005 | Feyereisen | |
| 6,910,339 B2 | 6/2005 | Laine et al. | |
| 6,955,715 B1 | 10/2005 | Tittle | |
| 6,960,243 B1 | 11/2005 | Smith et al. | |
| 6,966,523 B2 | 11/2005 | Colting | |
| 7,000,410 B2 | 2/2006 | Hutchinson | |
| 7,040,572 B2 | 5/2006 | Munk | |
| 7,043,934 B2 | 5/2006 | Radermacher et al. | |
| 7,055,777 B2 | 6/2006 | Colting | |
| 7,108,228 B1 | 9/2006 | Marshall | |
| 7,137,592 B2 | 11/2006 | Barocela et al. | |
| 7,156,342 B2 | 1/2007 | Heaven, Jr. et al. | |
| 7,159,817 B2 | 1/2007 | VanderMey et al. | |
| 7,216,069 B2 | 5/2007 | Hett | |
| 7,251,945 B2 | 8/2007 | Tongue | |
| 7,306,654 B2 | 12/2007 | King et al. | |
| 7,384,454 B2 | 6/2008 | Tongue | |
| D583,294 S | 12/2008 | Balaskovic | |
| 7,478,535 B2 | 1/2009 | Turner, Jr. | |
| 7,601,208 B2 | 10/2009 | Tongue | |
| 7,722,706 B2 | 5/2010 | Thielow | |
| 7,759,275 B2 | 7/2010 | Birbara et al. | |
| 7,760,438 B2 | 7/2010 | Suiter | |
| 7,825,830 B2 | 11/2010 | Joyner | |
| 7,866,601 B2 | 1/2011 | Balaskovic | |
| 2002/0003189 A1 | 1/2002 | Kuenkler | |
| 2002/0109045 A1 | 8/2002 | Beach et al. | |
| 2003/0001044 A1 | 1/2003 | Munk | |
| 2003/0023355 A1 | 1/2003 | Johnson et al. | |

(56) References Cited

U.S. PATENT DOCUMENTS

| | | |
|---|---|---|
| 2003/0127557 A1 | 7/2003 | Anderson et al. |
| 2003/0234320 A1 | 12/2003 | Colting |
| 2004/0162000 A1 | 8/2004 | Anderson |
| 2004/0172776 A1* | 9/2004 | Hutton .................. B64F 1/3055 14/71.5 |
| 2005/0277359 A1 | 12/2005 | Anderson |
| 2006/0000945 A1 | 1/2006 | Voss |
| 2006/0016930 A1 | 1/2006 | Pak |
| 2006/0060695 A1 | 3/2006 | Walden et al. |
| 2006/0065777 A1 | 3/2006 | Walden et al. |
| 2006/0151666 A1 | 7/2006 | VanderMey et al. |
| 2006/0227013 A1 | 10/2006 | Harvison et al. |
| 2006/0261213 A1 | 11/2006 | Lavan |
| 2006/0284002 A1 | 12/2006 | Stephens et al. |
| 2007/0075184 A1 | 4/2007 | Marimon et al. |
| 2007/0164162 A1* | 7/2007 | Olive ...................... B64D 1/16 244/136 |
| 2007/0295859 A1 | 12/2007 | Colvin |
| 2008/0035787 A1 | 2/2008 | Thompson |
| 2008/0179454 A1 | 7/2008 | Balaskovic |
| 2009/0109064 A1 | 4/2009 | Joyner |
| 2009/0200416 A1 | 8/2009 | Lee |
| 2009/0272841 A1 | 11/2009 | Sinsabaugh et al. |
| 2009/0321557 A1 | 12/2009 | Colting |
| 2010/0067118 A1 | 3/2010 | Takahashi et al. |
| 2010/0076628 A1 | 3/2010 | Boorman et al. |
| 2010/0102164 A1 | 4/2010 | Brutoco |
| 2010/0140391 A1 | 6/2010 | Wu |
| 2010/0166554 A1* | 7/2010 | Dierksmeier ....... B64C 29/0025 415/220 |
| 2011/0051041 A1 | 3/2011 | Yashiro |
| 2011/0163200 A1 | 7/2011 | Balaskovic |
| 2012/0018571 A1 | 1/2012 | Goelet |
| 2012/0212228 A1 | 8/2012 | Cho et al. |

FOREIGN PATENT DOCUMENTS

| | | |
|---|---|---|
| DE | 2348085 A1 | 4/1975 |
| DE | 2640433 C2 | 4/1977 |
| DE | 3508101 A1 | 9/1986 |
| DE | 197 44 581 A1 | 4/1999 |
| DE | 10011319 A1 | 9/2001 |
| DE | 201 15 193 U1 | 1/2002 |
| DE | 20116152 U1 | 2/2002 |
| DE | 20116152 U1 | 4/2002 |
| DE | 10058072 A1 | 6/2002 |
| DE | 20204023 U1 | 7/2002 |
| DE | 10120232 A1 | 10/2002 |
| DE | 10121854 C1 | 11/2002 |
| DE | 10139877 A1 | 2/2003 |
| DE | 201 15 193 U1 | 3/2003 |
| DE | 10148589 A1 | 4/2003 |
| DE | 10148590 A1 | 4/2003 |
| DE | 10201133 A1 | 7/2003 |
| DE | 10210541 A1 | 9/2003 |
| DE | 10210542 A1 | 9/2003 |
| DE | 10216480 A1 | 10/2003 |
| DE | 10226868 A1 | 12/2003 |
| DE | 10228048 A1 | 1/2004 |
| DE | 10252895 A1 | 5/2004 |
| DE | 10252896 A1 | 5/2004 |
| DE | 10252908 A1 | 5/2004 |
| DE | 10252909 A1 | 5/2004 |
| DE | 10252910 A1 | 5/2004 |
| DE | 10252911 A1 | 5/2004 |
| DE | 10 2005 013529 | 6/2007 |
| EP | 0095763 A2 | 12/1983 |
| EP | 0 282 425 A1 | 9/1988 |
| EP | 0 291 355 A2 | 11/1988 |
| EP | 0 325 452 A1 | 7/1989 |
| EP | 0 503 801 A | 9/1992 |
| EP | 0 503 801 A2 | 9/1992 |
| EP | 0 619 792 B1 | 10/1994 |
| EP | 0 714 362 B1 | 6/1996 |
| EP | 0 729 423 B1 | 9/1996 |
| EP | 0 745 045 B1 | 12/1996 |
| EP | 1 070 008 B1 | 1/2001 |
| EP | 1 160 156 A2 | 12/2001 |
| EP | 1 292 474 B1 | 3/2003 |
| EP | 1 294 608 B1 | 3/2003 |
| EP | 1 451 063 B1 | 9/2004 |
| EP | 1 529 726 A2 | 5/2005 |
| EP | 1 770 009 A2 | 4/2007 |
| FR | 2630397 A1 | 10/1989 |
| FR | 2 813 663 A1 | 3/2002 |
| FR | 2 815 336 A1 | 4/2002 |
| FR | 2830838 B1 | 4/2003 |
| FR | 2 853 895 A1 | 10/2004 |
| FR | 2 896 495 A1 | 7/2007 |
| GB | 1 577 488 | 10/1980 |
| GB | 2 055 728 A | 3/1981 |
| GB | 2 197 276 A | 5/1988 |
| GB | 2 250 007 A | 5/1992 |
| GB | 2 275 036 A | 6/1994 |
| GB | 2 278 815 A | 12/1994 |
| GB | 2359534 A | 8/2001 |
| GB | 2 300 010 A | 3/2002 |
| GB | 2 366 274 A | 3/2002 |
| GB | 2 447 411 A | 9/2008 |
| JP | 52145999 | 12/1977 |
| RU | 37568 | 10/1993 |
| RU | 2009073 C1 | 3/1994 |
| RU | 40822 S | 1/1995 |
| RU | 2028249 C1 | 2/1995 |
| RU | 2070136 C1 | 12/1996 |
| RU | 2092381 C1 | 10/1997 |
| RU | 2098318 C1 | 12/1997 |
| RU | 2111146 D1 | 5/1998 |
| RU | 2111147 C1 | 5/1998 |
| RU | 2114027 C1 | 6/1998 |
| RU | 2141911 C1 | 11/1999 |
| RU | 2196703 C2 | 1/2003 |
| RU | 2249536 C1 | 4/2005 |
| RU | 2250122 C1 | 4/2005 |
| SU | 1799335 A3 | 2/1993 |
| UA | 10870 A | 12/1996 |
| UA | 32397 A | 12/2000 |
| UA | 55928 A | 4/2003 |
| WO | WO 92/06002 A1 | 4/1992 |
| WO | WO 93/13979 A1 | 4/1992 |
| WO | WO 93/24364 A2 | 12/1993 |
| WO | WO 95/05307 A1 | 6/1995 |
| WO | WO 95/14607 A1 | 6/1995 |
| WO | WO 95/22486 A1 | 8/1995 |
| WO | WO 95/27652 A1 | 10/1995 |
| WO | WO 95/32893 A1 | 12/1995 |
| WO | WO 95/32894 A1 | 12/1995 |
| WO | WO 96/20897 | 7/1996 |
| WO | WO 96/38340 A1 | 12/1996 |
| WO | WO 97/15492 A2 | 5/1997 |
| WO | WO 98/28188 A1 | 5/1997 |
| WO | WO-97/49606 A1 | 12/1997 |
| WO | WO 98/29303 A2 | 7/1998 |
| WO | WO 98/31589 A1 | 7/1998 |
| WO | WO 98/58217 | 12/1998 |
| WO | WO 99/67131 A1 | 12/1999 |
| WO | WO 00/48902 A1 | 8/2000 |
| WO | WO 00/73142 A2 | 8/2000 |
| WO | WO 01/36885 | 5/2001 |
| WO | WO 01/42082 A1 | 6/2001 |
| WO | WO 01/68447 A2 | 9/2001 |
| WO | WO 01/94172 A1 | 12/2001 |
| WO | WO 03/021291 | 3/2003 |
| WO | WO 03/024791 A1 | 3/2003 |
| WO | WO 03/047967 A1 | 6/2003 |
| WO | WO 03/055745 A1 | 7/2003 |
| WO | WO 03/055746 A1 | 7/2003 |
| WO | WO 03/074356 A3 | 9/2003 |
| WO | WO 03/097451 A1 | 11/2003 |
| WO | WO 03/697450 A1 | 11/2003 |
| WO | WO 2004/000642 A1 | 12/2003 |
| WO | WO 2004/074091 A2 | 9/2004 |
| WO | WO 2004/087499 A2 | 10/2004 |

(56) References Cited

FOREIGN PATENT DOCUMENTS

| | | |
|---|---|---|
| WO | WO 2005/002960 A1 | 1/2005 |
| WO | WO 2005/007508 A1 | 1/2005 |
| WO | WO 2006/061617 A1 | 6/2006 |
| WO | WO 2006/085919 A2 | 8/2006 |
| WO | WO 2006/137880 A2 | 12/2006 |
| WO | WO 2007/036038 A1 | 4/2007 |
| WO | WO 2007/037932 A2 | 4/2007 |
| WO | WO 2007/045091 A1 | 4/2007 |
| WO | WO 2007/065649 A2 | 6/2007 |

OTHER PUBLICATIONS

Demonstrator Alpha, Lenticular Aircraft of Air Photography, accessed Oct. 11, 2006, machine translated Jun. 25, 2007, http://perso.orange.fr/balaskovic/actu-texte.html (2 pages).
Edwin Mowforth, "Lenticular History," an excerpt from "An Introduction to the Airship," Second Edition, 2001, (6 pages).
http://www.hybridairvehicles.net/index.html, accessed Dec. 1, 2009 (16 pages).
International Search Report and Written Opinion dated Jul. 26, 2012 in counterpart international application No. PCT/US2012/023954 (14 pages).
Edwin Mowforth, "An Introduction to the Airship," Third Edition, The Airship Association, Sep. 2007 (157 pages).
PCT International Search Report re PCT/US2007/021962, dated Mar. 4, 2009.
PCT International Search Report re PCT/US2008/009453, dated Apr. 3, 2009.
Repoulias et al., "Dynamically Feasible Trajectory and Open-Loop Control Design for Unmanned Airships," 2007 Mediterranean Conference on Control and Automation, Jul. 27, 2007, XP002511581, Athens, Greece (6 pages).
International Search Report and Written Opinion for Int'l Appln. No. PCT/US2001/044102, dated Feb. 16, 2012 (18 pages).
21$^{st}$ Century Airships Web Site, accessed Jun. 22, 2007, http://www.21stcenturyairships.com (5 pages).
ALA-40 proof-of-concept—Thermoplane, Photos from "Janes—All the World's Aircraft," 1997 (2 pages).
Ben Ionnatta, "Spy Blimps and Heavy Lifters: The Latest Thing in Airships," Air & Space Smithsonian, Sep. 2007 (2 pages).
Blimp Europa N2A Web Site, accessed Oct. 11, 2006, machine translated Jun. 25, 2007, http://www.blimp-n2a.com/cl5alpha.htm (3 pages).
CargoLifter Web Site, accessed Jun. 19, 2007, http://cargolifter.info (2 pages).
Daniel P. Raymer, "Aircraft Design: A Conceptual Approach," 4$^{th}$ Ed., 2006, pp. 652-659, American Institute of Aeronautics and Astronautics, Inc., Reston, Viigtnia (11 pages).
Dynalifter Web Site, accessed Jun. 22, 2007, http://www.dynalifter.com (7 pages).
"Lift Equations," derived from "The Non-Rigid Airship Test and Evaluation Manual," U.S. Navy, 1940 (2 pages).
Michael A. Dornheim, "Skunks Working," Aviation Week, Feb. 6, 2006, accessed Jun. 22, 2007, http://www.aviationweek.com/aw/generic/story_generic.jsp?channel=awst&id=news/020606p2.xml (2 pages).
Gabriel A. Khoury and J. David Gillett, "Lenticular Mathematics," an excerpt from "Airship Technology," Cambridge University Press, 1999 (6 pages).
Lord Ventry and Eugene Kolesnik, Excerpt from "Jane's Pocket Book of Airships," Collier Books, 1977, pp. 94-96 (6 pages).
Edwin Mowforth, "Lenticular History," an excerpt from "An introduction to the Airship," Second Edition, 2001, and information sheet (7 pages).
Operation-LTA Web Site, accessed Oct. 11, 2006, http://web.archive.org/web/20040405173243/www.operation-lta.com (5 pages).
Stephane Doncieux and Jean-Arcady Meyer, "Evolving Neural Networks for the Control of a Lenticular Blimp," AnimatLab—LIP6, 2003, France, http://animatab.lip6.fr (12 pages).

Thomas F. Norton, "Now There's a 'Personal Blimp:' Unique Foldable Frame Makes it Practical as a Second Century Aircraft," General Aviation News, Jan. 19, 2007, p. 18-19, 59$^{th}$ year, No. 2, Flyer Media, Inc., Lakewood, WA (2 pages).
Worldwide Aeros Corporation Web Site, accessed Jun. 22, 2007, http://www.aerosml.com. (4 pages).
Yu. Boiko and V.A. Turian, "Dreamboat of Centuries," Moscow, Machine Building, p. 52, Jun. 13, 1991 (3 pages).
U.S. Army Advanced Materiel Concepts Agency, "Aerial Very Heavy Lift Concepts for the 1990 Army vol. I", Basic Report, Nov. 1969 (41 pages).
U.S. Army Advanced Materiel Concepts Agency, "Aerial Very Heavy Lift Concepts for the 1990 Army vol. III," Academic and Industrial Presentations, Nov. 1, 1969 (200 pages).
Boeing Vertol Company for NASA Ames., "Feasibility Study of Modern Airships", Final Report, vol. 1, May 1975 (478 pages).
P.A. Mackrodt, "Further Studies in the Concept of Delta-Winged Hybrid Airships", J. Aircraft, Oct. 1, 1980, pp. 734-740 (7 pages).
Mark D. Arderna, "Missions and Vehicle Concepts for Modern, Propelled, Lighter-Than-Air Vehicles", AGARD, NATO, Feb. 1985 (50 pages).
Dr. R.S. Ross et al., "New Air Transport System for Heavy Bulky Cargo" (Advanced Copy), Apr. 20, 1962 (35 pages).
W.L. Marcy, "Parametric Study of Advanced Fully-Buoyant Naval Air Vehicles", NADC, Nov. 30, 1976 (86 pages).
Stepler, Richard M., "Return to Lighter Than Air Transportation for Military and Civilian Application", Defense Systems Management School, Fort Belvoir, VA, Nov. 1973 (56 pages).
L. Balls Crema et al., "Some Trends in Airship Technology Developments", NATO, Apr. 10-15, 1983 (14 pages).
"Types of Lighter-Than-Air Aircraft," Author unknown, Publication date unknown (34 pages).
Mark D. Arderna, "Vehicle Concepts and Technology Requirements for Buoyant Heavy-Lift Systems", NASA, 1970 (36 pages).
Mark D. Arderna, "Vehicle Concepts and Technology Requirements for Buoyant Heavy-Lift Systems", NASA Technical Paper, 1981 (18 pages).
David Battey and William Mueller, "North Warning Airship Program, Final Overview," Naval Air Development Center, Apr. 6, 1987 (211 pages).
"Preliminary Design Investigation for New Payload and Ground Handling Concepts for Airships Operating in Remote Arctic Regions, Final Report," Naval Air Development Center, Mar. 31, 1986 (226 pages).
Capt. J. Arvi et al., "North Warning Program Airship Feasibility Tests, Final Report," Naval Air Development Center, Feb. 20, 1987 (42 pages).
Capt. J. Arvi et al., "North Warning System Familiarisation, Feasibility and Operational Demonstration, Final Report," Naval Air Development Center, Apr. 19, 1986 (133 pages).
Douglas Botting, "The Giant Airships," Time-Life Books, Alexandria, VA 1980 (185 pages).
E. Udartsev and E. Tyan, "Dirigible of a New Generation in Kiev," available at http://www.aviajournal.com/sections/journal/arh/magazine/200112/index.html, Dec. 2001. (9 pages).
Construction Cost Management Co., "With Us, Future Comes Faster," available at http://www.buildcostcontrol.com/Airship/tabid/640/Default.aspx, 2008 (1 page).
Future Flight?, Excite Deane, Ballooning, The Journal of the Balloon Federation of America, Jul./Aug. 2008. pp. 26-32 (7 pages).
Repoullas et al., "Dynamically Feasible Trajectory and Open-Loop Control Design for Unmanned Airships," 2007 Mediterranean Conference on Control and Automation, Jul. 27, 2007, XP002511581, Athens, Greece (6 pages).
Nagabhushan et al., "Directional control of an advanced airship," AIAA Lighter-Than-Air Systems Technology Conference. 11th, Clearwater Beach, FL, May 15-18, 1995, Technical Papers (A95-30317 07-01), Washington, DC, American Institute of Aeronautics and Astronautics, May 15, 1995, pp. 107-116 (10 pages).
PCT report of partial international search regarding PCT/US2007/021962 dated Dec. 2, 2008.
http://dynalifter.com/, accessed Dec. 1, 2009 (23 pages).

(56) References Cited

OTHER PUBLICATIONS http://hybridairvehicles.net/index.html, accessed Dec. 1, 2009 (16 pages).
http://www.skylifter.com.au/, accessed Dec. 1, 2009 (18 pages).
Luffman, "Aeroraft the Alternative Aircraft for Heavy Lift Transport or Crane Use," American Institute of Aeronautics and Astronautics, AIAA's 3rd Annual Aviation Technology, Integration, and Operations (ATIO) Tech, Nov. 17-19, 2003, Denver, Colorado, AIAA 2003-6754, pp. 1-13 (13 pages).
European Examination Report from EP Application No. 08 827 387.5-1254, Jun. 1, 2010. (4 pages).
European Examination Report from EP Application No. 07 873 810.1-2422, dated Aug. 16, 2010. (4 pages).
Office Action dated Sep. 3, 2009, from U.S. Appl. No. 11/907,883. (16 pages).
Final Office Action dated Apr. 1, 2010, from U.S. Appl. No. 11/907,883. (13 pages).
Advisory Action dated Aug. 2010, from U.S. Appl. No. 11/907,883. (3 pages).
Amendment After Final dated Aug. 17, 2010, from U.S. Appl. No. 11/907,883. (28 pages).
Notice of Allowance dated Sep. 1, 2010, from U.S. Appl. No. 11/907,883. (4 pages).
PCT Communication Relating to the Results of the Partial International Search re PCT/US2008/009453, dated Feb. 4, 2009.
Ahmed Ghanmi and Abderrahmane Sokri, "Airships for military logistics heavy lift: A performance assessment for Northern operation applications," Defence R&D Canada—CORA, Technical Memorandum, Jan. 2010 (53 pages).

\* cited by examiner

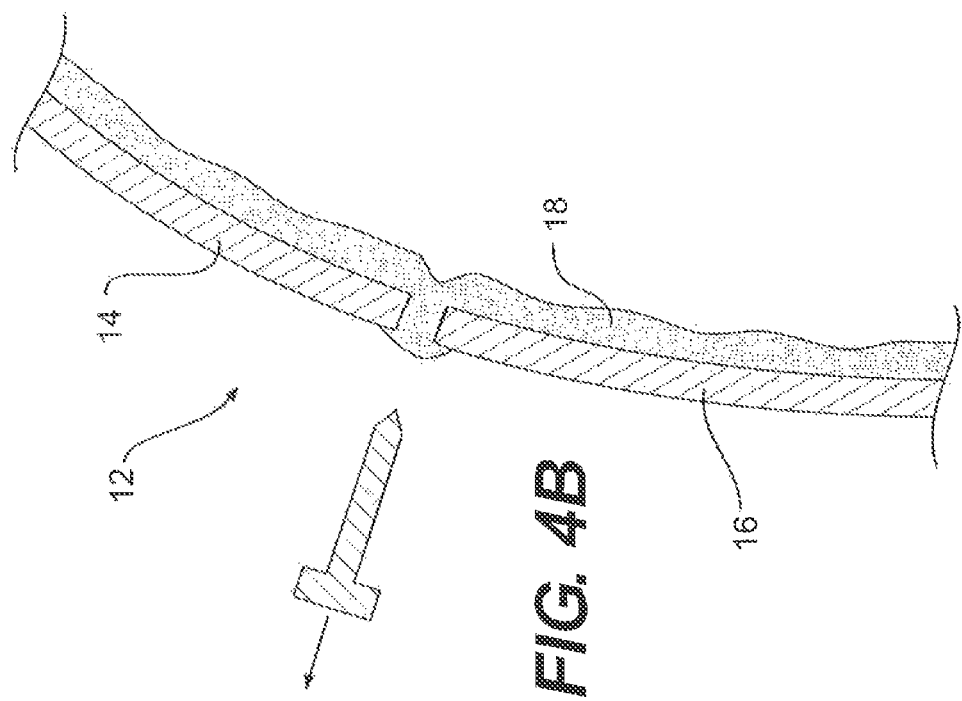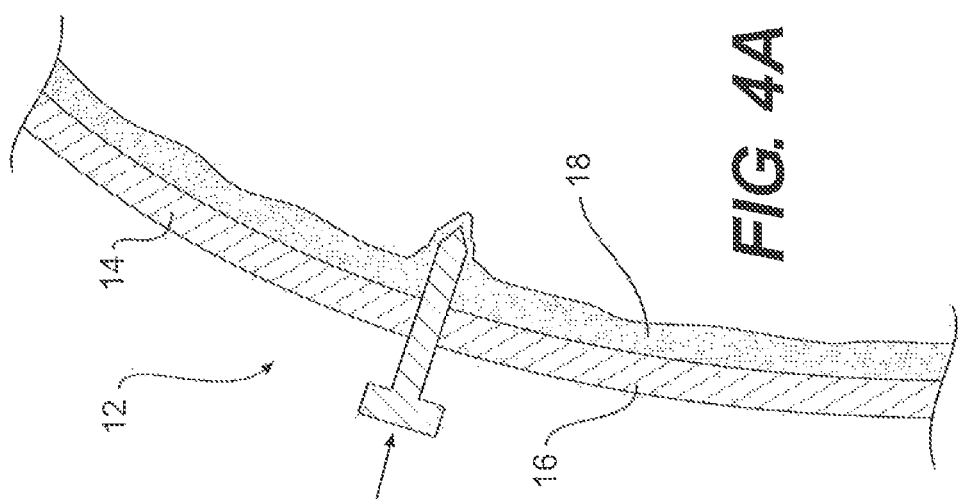

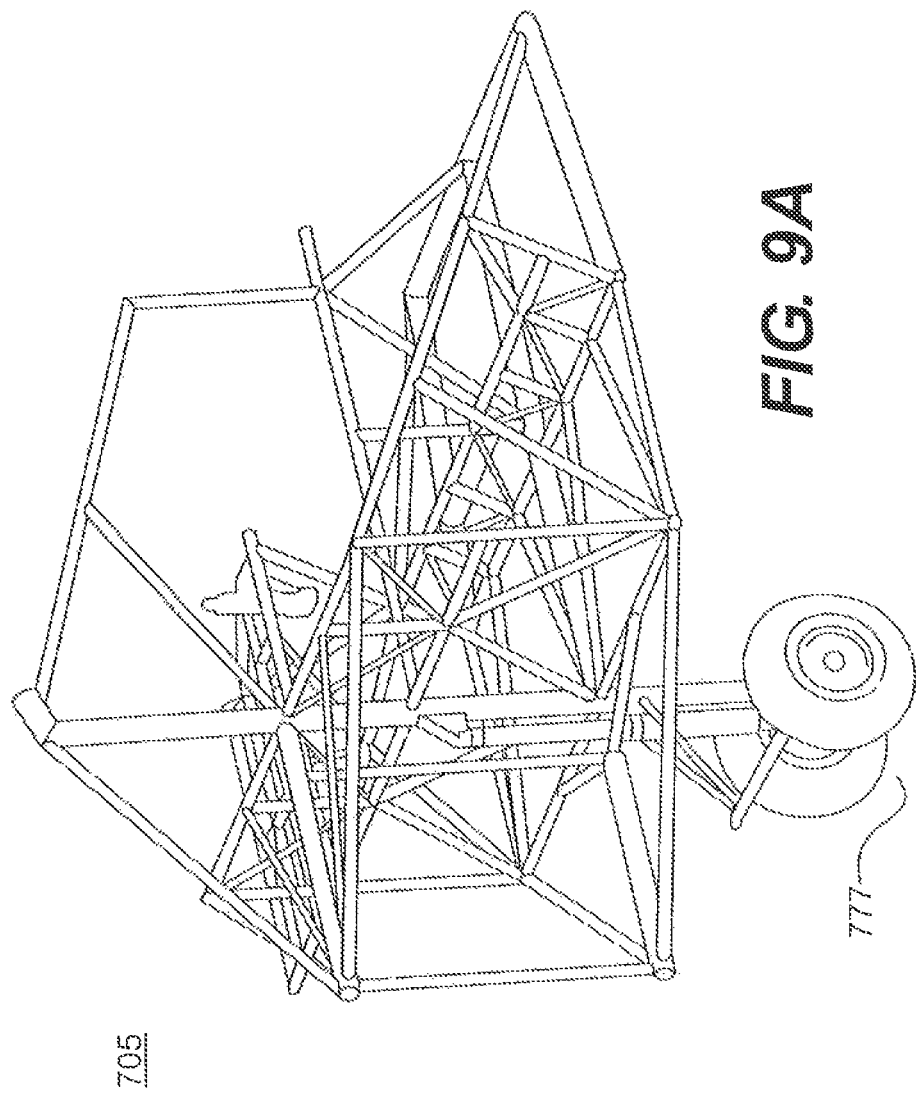

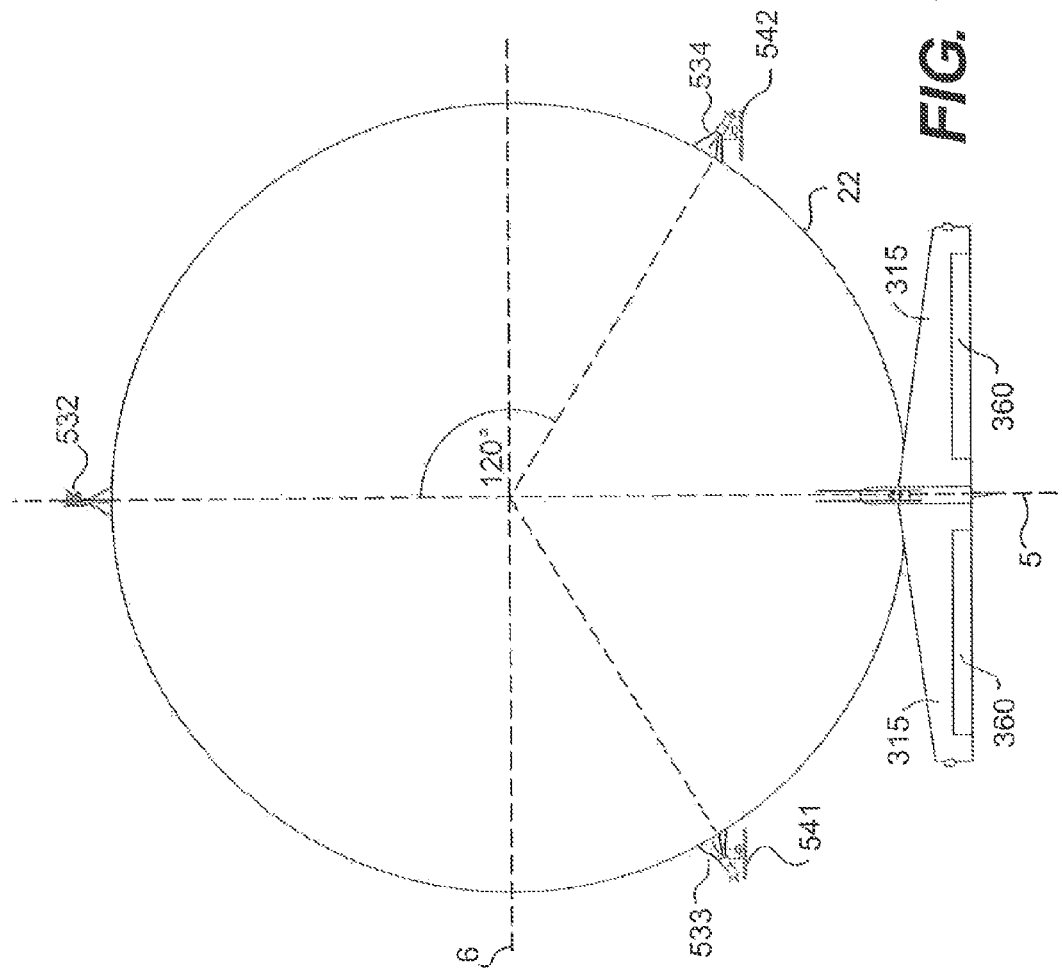

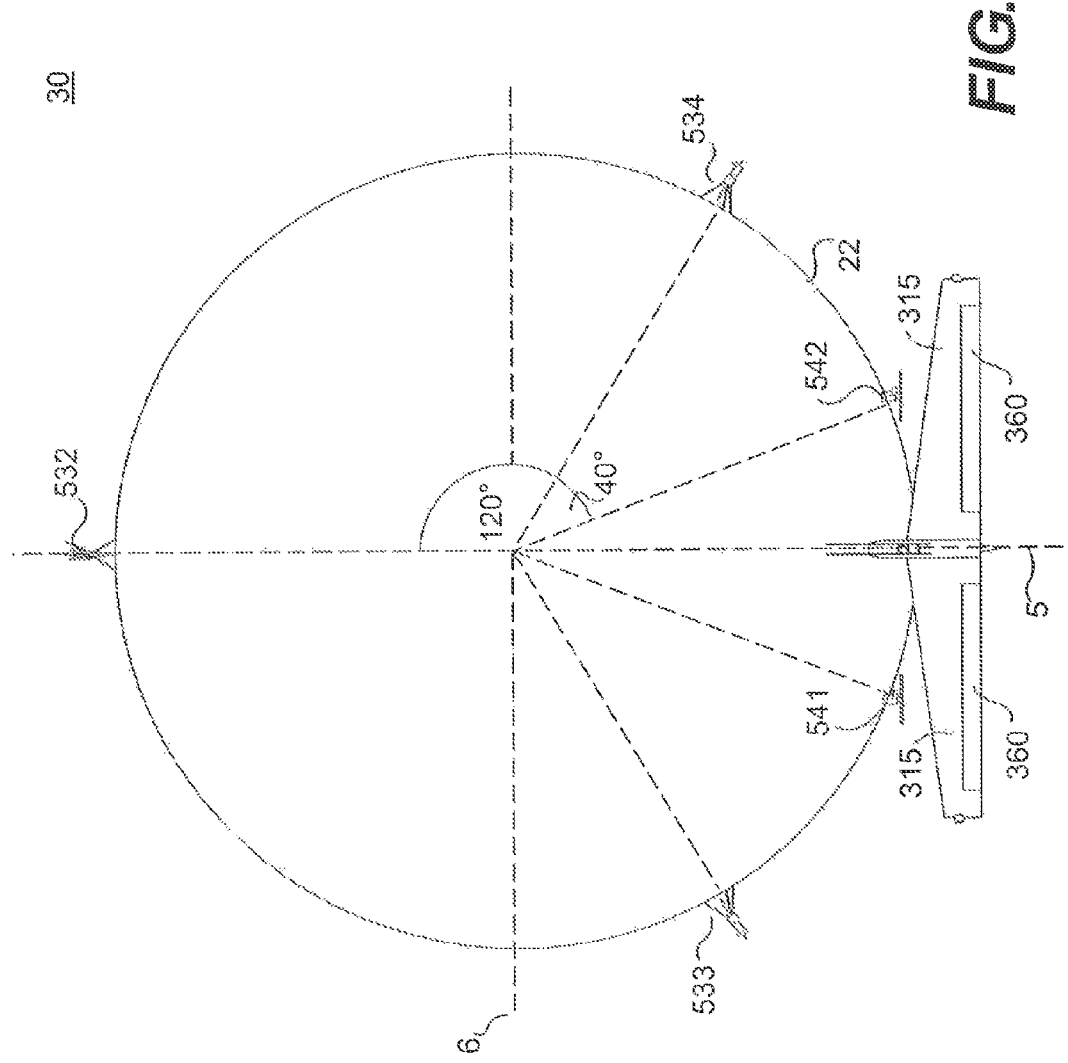

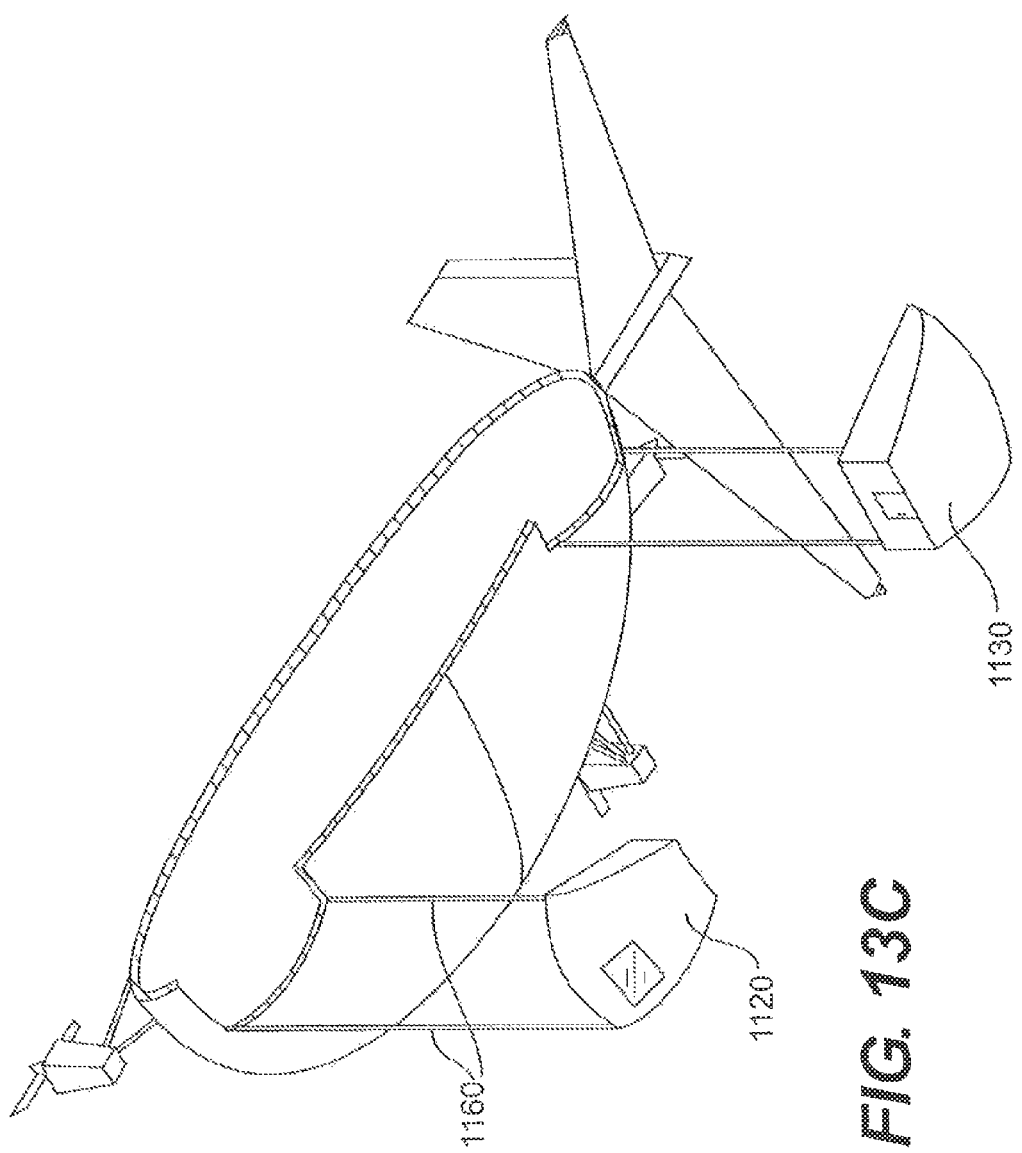

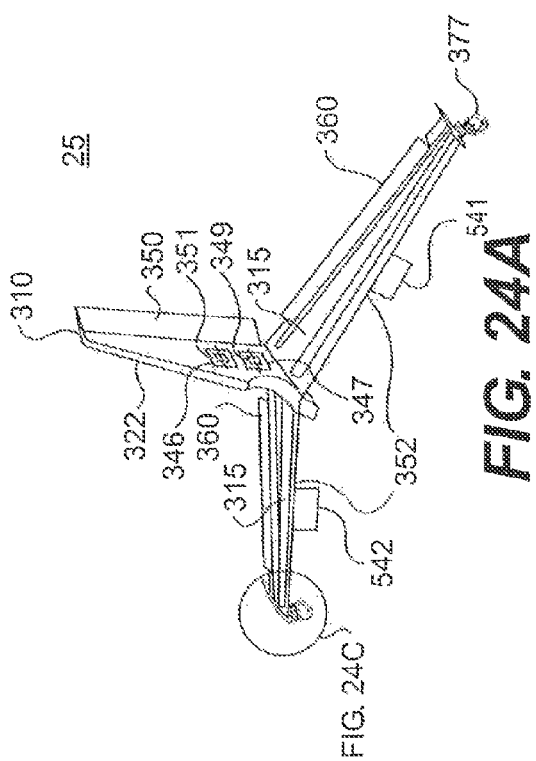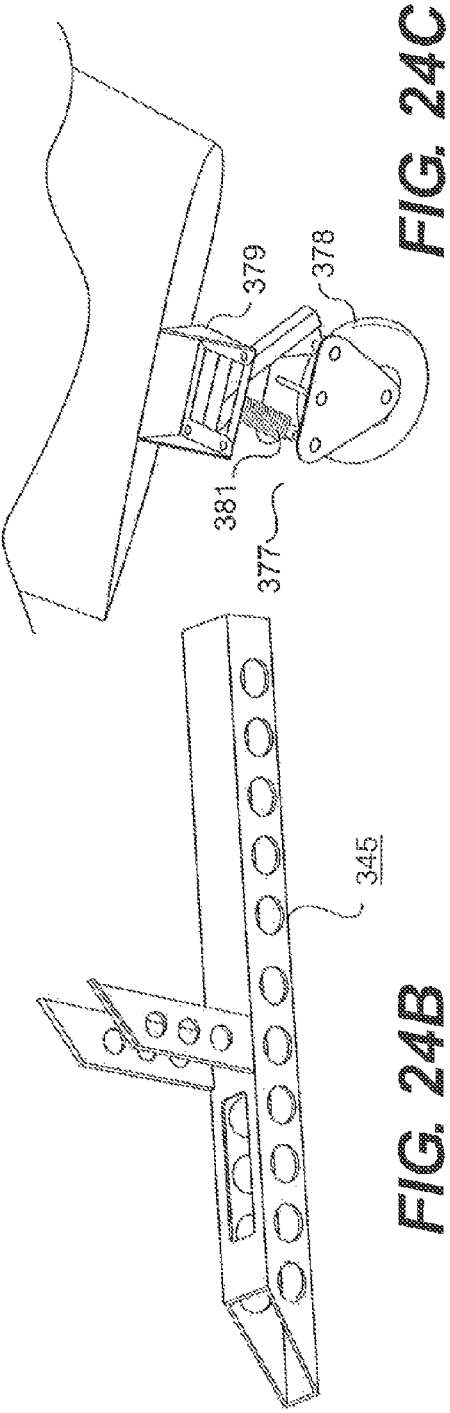

AIRSHIP HAVING A CARGO COMPARTMENT

CROSS-REFERENCE TO RELATED APPLICATIONS

This is a continuation of U.S. patent application Ser. No. 14/032,806 filed Sep. 20, 2013 (now allowed), which is a continuation of U.S. patent application Ser. No. 13/182,864, filed on Jul. 14, 2011 (now allowed), which claims priority from U.S. Provisional Application No. 61/366,125, filed Jul. 20, 2010. U.S. patent application Ser. No. 11/907,883, filed Oct. 18, 2007 (now U.S. Pat. No. 7,866,601), U.S. patent application Ser. No. 12/222,355, filed Aug. 7, 2008 (now U.S. Pat. No. 8,297,550), disclose subject matter related to embodiments of the present invention. Each of the previously filed applications is hereby incorporated by reference in its entirety.

TECHNICAL FIELD

The present disclosure is directed to a solar-powered airship and, more particularly, to a solar-powered airship having a cargo compartment within the hull of the airship.

BACKGROUND

Aerostatic lighter-than-air airships have seen substantial use since 1783, following the first successful manned flight of the Montgolfier brothers' hot-air balloon. Numerous improvements have been made since that time, but the design and concept of manned hot-air balloons remains substantially similar. Such designs may include a gondola for carrying a pilot and passengers, a heating device (e.g., a propane torch), and a large envelope or bag affixed to the gondola and configured to be filled with air. The pilot may then utilize the heating device to heat the air until the buoyant forces of the heated air exert sufficient force on the envelope to lift the balloon and an attached gondola. Navigation of such an airship has proven to be difficult, mainly due to wind currents and lack of propulsion units for directing the balloon.

To improve on the concept of lighter-than-air flight, some lighter-than-air airships have evolved to include propulsion units, navigational instruments, and flight controls. Such additions may enable a pilot of such an airship to direct the thrust of the propulsion units in such a direction as to cause the airship to proceed as desired. Airships utilizing propulsion units and navigational instruments typically do not use hot air as a lifting gas (although hot air may be used), with many pilots instead preferring lighter-than-air lifting gases such as hydrogen and helium. These airships may also include an envelope for retaining the lighter-than-air gas, a crew area, and a cargo area, among other things. The airships are typically streamlined in a blimp- or zeppelin-like shape, which, while providing reduced drag, may subject the airship to adverse aeronautic effects (e.g., weather cocking).

Airships other than traditional hot-air balloons may be divided into several classes of construction: rigid, semi-rigid, non-rigid, and hybrid type. Rigid airships typically possess rigid frames containing multiple, non-pressurized gas cells or balloons to provide lift. Such airships generally do not depend on internal pressure of the gas cells to maintain their shape. Semi-rigid airships generally utilize some pressure within a gas envelope to maintain their shape, but may also have frames along a lower portion of the envelope for purposes of distributing suspension loads into the envelope and for allowing lower envelope pressures, among other things. Non-rigid airships typically utilize a pressure level in excess of the surrounding air pressure in order to retain their shape and any load associated with cargo carrying devices is supported by the gas envelope and associated fabric. The commonly used blimp is an example of a non-rigid airship.

Hybrid airships may incorporate elements from other airship types, such as a frame for supporting loads and an envelope utilizing pressure associated with a lifting gas to maintain its shape. Hybrid airships also may combine characteristics of heavier-than-air airships (e.g., airplanes and helicopters) and lighter-than-air technology to generate additional lift and stability. It should be noted that many airships, when fully loaded with cargo and fuel, may be heavier than air and thus may use their propulsion system and shape to generate aerodynamic lift necessary to stay aloft. However, in the case of a hybrid airship, the weight of the airship and cargo may be substantially compensated for by lift generated by forces associated with a lifting gas such as, for example, helium. These forces may be exerted on the envelope, while supplementary lift may result from aerodynamic lift forces associated with the hull.

A lift force (i.e., buoyancy) associated with a lighter-than-air gas may depend on numerous factors, including ambient pressure and temperature, among other things. For example, at sea level, approximately one cubic meter of helium may balance approximately a mass of one kilogram. Therefore, an airship may include a correspondingly large envelope with which to maintain sufficient lifting gas to lift the mass of the airship. Airships configured for lifting heavy cargo may utilize an envelope sized as desired for the load to be lifted.

Hull design and streamlining of airships may provide additional lift once the airship is underway, however, previously designed streamlined airships, in particular, may experience adverse effects based on aerodynamic forces because of such hull designs. For example, one such force may be weather cocking, which may be caused by ambient winds acting on various surfaces of the airship. The term "weather cocking" is derived from the action of a weather vane, which pivots about a vertical axis and always aligns itself with wind direction. Weather cocking may be an undesirable effect that may cause airships to experience significant heading changes based on a velocity associated with the wind. Such an effect may thereby result in lower ground speeds and additional energy consumption for travel. Lighter-than-air airships may be particularly susceptible to weather cocking and, therefore, it may be desirable to design a lighter-than-air airship to minimize the effect of such forces.

On the other hand, airships having a hull shape with a length that is similar to the width may exhibit reduced stability, particularly at faster speeds. Accordingly, the aspect ratio of length to width (length:width) of an airship may be selected according to the intended use of the airship.

Landing and securing a lighter-than-air airship may also present unique problems based on susceptibility to adverse aerodynamic forces. Although many lighter-than-air airships may perform "vertical take off and landing" (VTOL) maneuvers, once such an airship reaches a point near the ground, a final landing phase may entail ready access to a ground crew (e.g., several people) and/or a docking apparatus for tying or otherwise securing the airship to the ground. Without access to such elements, the airship may be carried away by wind currents or other uncontrollable forces while a pilot of the airship attempts to exit and handle the final landing phase. Therefore, systems and methods enabling landing and securing of an airship by one or more pilots may be desirable.

In addition, airships may include passenger and/or cargo compartments, typically suspended below the hull of the airship. However, such placement of a passenger/cargo compartment can have an adverse affect on aerodynamics and, consequently, performance capabilities of the airship. For example, an externally-mounted compartment increases drag in both fore-aft and port-starboard directions, thus requiring more power to propel the airship, and rendering the airship more sensitive to cross-winds. Further, because an externally-mounted compartment is typically on the bottom of the airship, the compartment is offset from the vertical center of the airship and, therefore, may lead to instability as the added drag due to the compartment comes in the form of forces applied substantially tangential to the outer hull of the airship, causing moments that tend to twist and/or turn the airship undesirably. Such adverse moments require stabilizing measures to be taken, typically in the form of propulsion devices and/or stabilizing members (e.g., wings). However, propulsion devices require power, and stabilizing members, while providing stability in one direction, may cause stability in another direction. For example, a vertically-oriented stabilizer can provide lateral stability but may cause increased fore-aft drag, and may also render the airship more susceptible to cross winds. It would be advantageous to have an airship with a configuration that can carry passengers/cargo but is not susceptible to the adverse affects typically associated with externally-mounted compartments mentioned above.

The present disclosure is directed to addressing one or more of the desires discussed above, utilizing various exemplary embodiments of an airship.

BRIEF SUMMARY

The present disclosure is directed to a solar-powered airship. The airship may include a hull configured to contain a gas and at least one propulsion assembly coupled to the airship. The at least one propulsion assembly may include a propulsion device. The propulsion assembly may also include one or more electric motors operatively coupled to the at least one propulsion device and configured to drive the propulsion device. In addition, the airship may include a power supply system, which may include one or more solar panels operatively coupled to the one or more electric motors, and configured to supply power to the one or more electric motors for driving the at least one propulsion device. Further, the power supply system may include one or more batteries operatively coupled to the one or more solar panels and configured to receive and store electrical energy supplied by the one or more solar panels, the one or more batteries being further operatively coupled to the one or more electric motors and configured to supply power to the electric motors. Further, the one or more batteries may each be located within an outer envelope of the airship defined by the hull of the airship in a respective position providing ballast. In addition, the airship may also include a cargo system including at least one cargo compartment configured to contain at least one of passengers and freight, wherein the compartment is disposed substantially within the outer envelope of the airship.

In addition, the present disclosure is directed to a method of supplying power to operate an airship. The method may include receiving and storing, in one or more batteries, electrical energy from one or more solar panels operatively coupled to the one or more batteries, the one or more solar panels being further operatively coupled to one or more electric motors. The method may also include supplying electrical power to the one or more electric motors from the one or more solar panels. Further the airship may include a hull configured to contain a gas. In addition, the airship may also include at least one propulsion assembly coupled to the airship and including a propulsion device operatively coupled to the one or more electric motors, the one or more electric motors being configured to drive the propulsion device. Further, the airship may include a cargo system including at least one cargo compartment configured to contain at least one of passengers and freight, wherein the compartment is disposed substantially within the outer envelope of the airship. Also, the one or more batteries may each be located within an outer envelope of the airship defined by the hull of the airship in a respective position providing ballast.

It is to be understood that both the foregoing general description and the following detailed description are exemplary and explanatory only and are not restrictive of the invention.

BRIEF DESCRIPTION OF THE DRAWINGS

FIG. 4A illustrates an exemplary self-sealing hull, consistent with disclosed embodiments;

FIG. 4B illustrates an exemplary self-sealing hull, consistent with disclosed embodiments;

FIG. 9A illustrates an exemplary support structure of an airship, consistent with disclosed embodiments;

FIG. 11A illustrates a bottom-perspective exemplary configuration of a propulsion system associated with an airship, consistent with disclosed embodiments;

FIG. 11B illustrates a bottom-perspective exemplary configuration of a propulsion system associated with an airship, consistent with disclosed embodiments;

FIG. 13C illustrates an exemplary cargo system of an airship, consistent with disclosed embodiments;

FIG. 24A illustrates an exemplary empennage assembly, consistent with disclosed embodiments;

FIG. 24B illustrates an exemplary empennage mount, consistent with disclosed embodiments;

FIG. 24C illustrates an exemplary rear landing gear assembly, consistent with disclosed embodiments;

DETAILED DESCRIPTION

Reference will now be made in detail to the drawings. Wherever possible, the same reference numbers will be used throughout the drawings to refer to the same or like parts.

Figure 1:
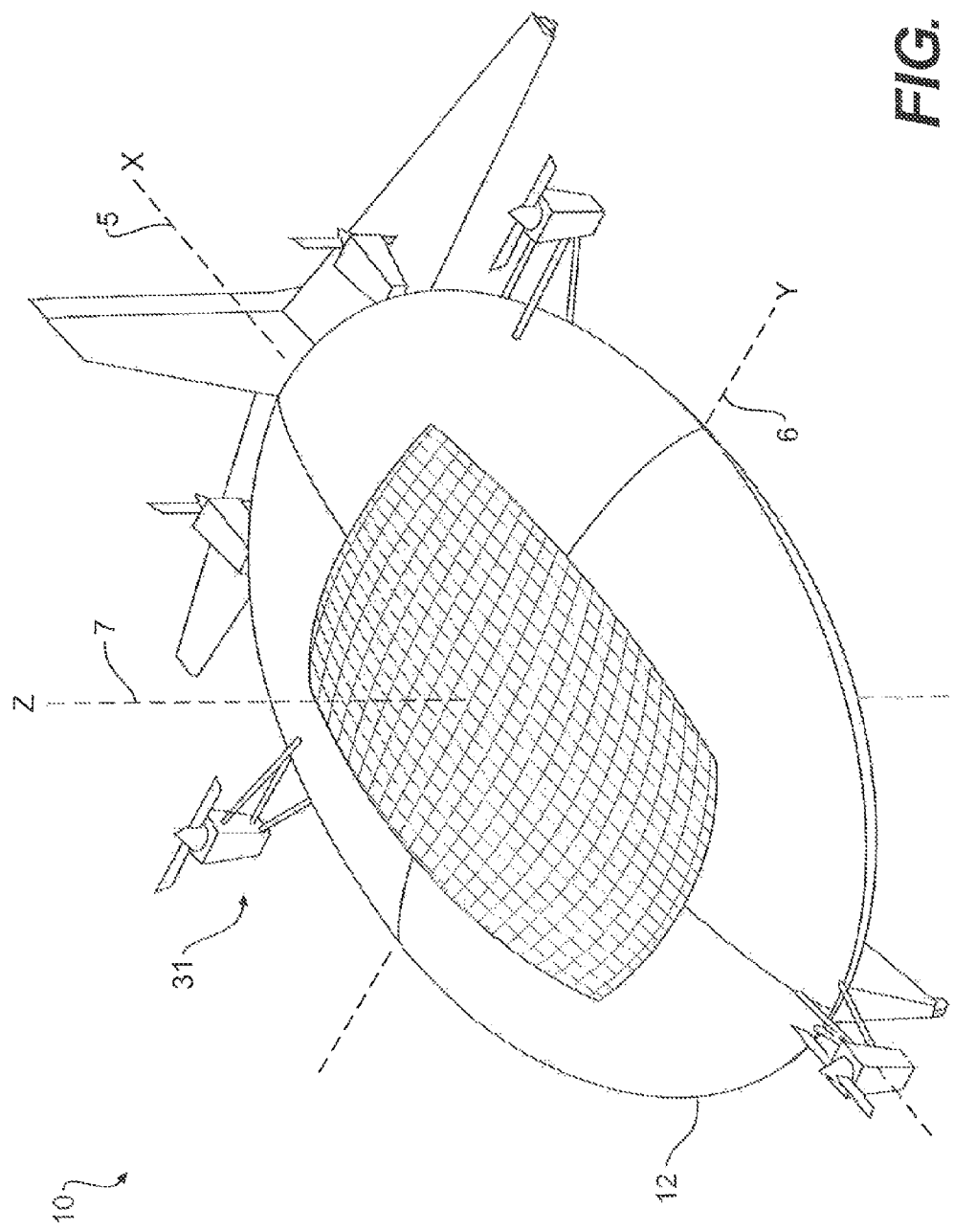
FIG. 1 illustrates an exemplary embodiment of a solar-powered airship, consistent with disclosed embodiments.

The accompanying figures depict exemplary embodiments of a solar-powered airship 10. Airship 10 may be configured for VTOL as well as navigation in three dimensions (e.g., X, Y, and Z planes). As shown in FIG. 1, for example, airship 10 may include a hull 12 configured to contain a gas. Airship 10 may also include at least one propulsion assembly 31 coupled to airship 10, a power supply system for delivering power to propulsion assembly 31 (further detailed in FIG. 12), and a cargo system 1100 for carrying passengers and/or freight (see, e.g., FIGS. 13A-13E).

Throughout this discussion of various embodiments, the terms "front" and/or "fore" will be used to refer to areas within a section of airship 10 closest to forward travel, and the term "rear" and/or "aft" will be used to refer to areas within a section of airship 10 closest to the opposite direction of travel. Moreover, the term "tail" will be used to refer to a rear-most point associated with hull 12, while the term "nose" will be used to refer to the forward-most point within the front section of hull 12.

FIG. 1 further illustrates various axes relative to the exemplary airship 10 for reference purposes. Airship 10 may include a roll axis 5, a pitch axis 6, and a yaw axis 7. Roll axis 5 of airship 10 may correspond with an imaginary line running through hull 12 in a direction from, for example, the tail to the nose of airship 10. Yaw axis 7 of airship 10 may be a central, vertical axis corresponding with an imaginary line running perpendicular to roll axis 5 through hull 12 in a direction from, for example, a bottom surface of hull 12 to a top surface of hull 12. Pitch axis 6 may correspond to an imaginary line running perpendicular to both yaw and roll axes, such that pitch axis 6 runs through hull 12 from one side of airship 10 to the other side of airship 10, as shown in FIG. 1. "Roll axis" and "X axis;" "pitch axis" and "Y axis;" and "yaw axis" and "Z axis" may be used interchangeably throughout this discussion to refer to the various axes associated with airship 10. One of ordinary skill in the art will recognize that the terms described in this paragraph are exemplary only and not intended to be limiting.

Hull

Hull 12 may include a support structure 20 (see FIG. 2), and one or more layers of material 14 (FIG. 3) substantially covering support structure 20. In some embodiments, airship 10 may be a "rigid" airship. As used herein, the term "rigid airship" shall refer to an airship having a rigid framework, and containing one or more non-pressurized gas cells or bladders to provide lift, wherein the hull of the airship does not depend on internal pressure of the gas cells to maintain its shape.

Figure 2:
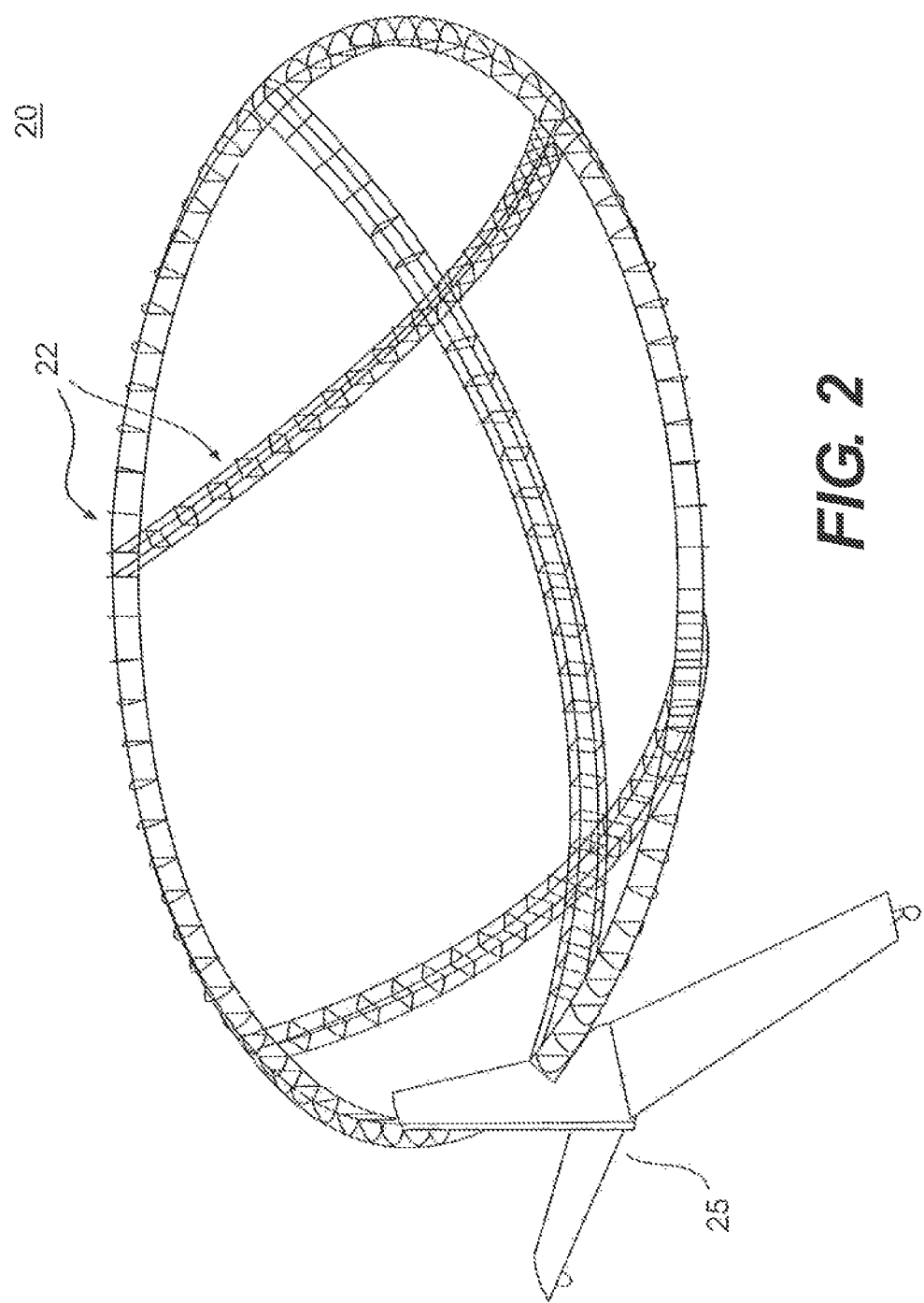
FIG. 2 illustrates an exemplary support structure of an airship, consistent with disclosed embodiments.
Figure 3:
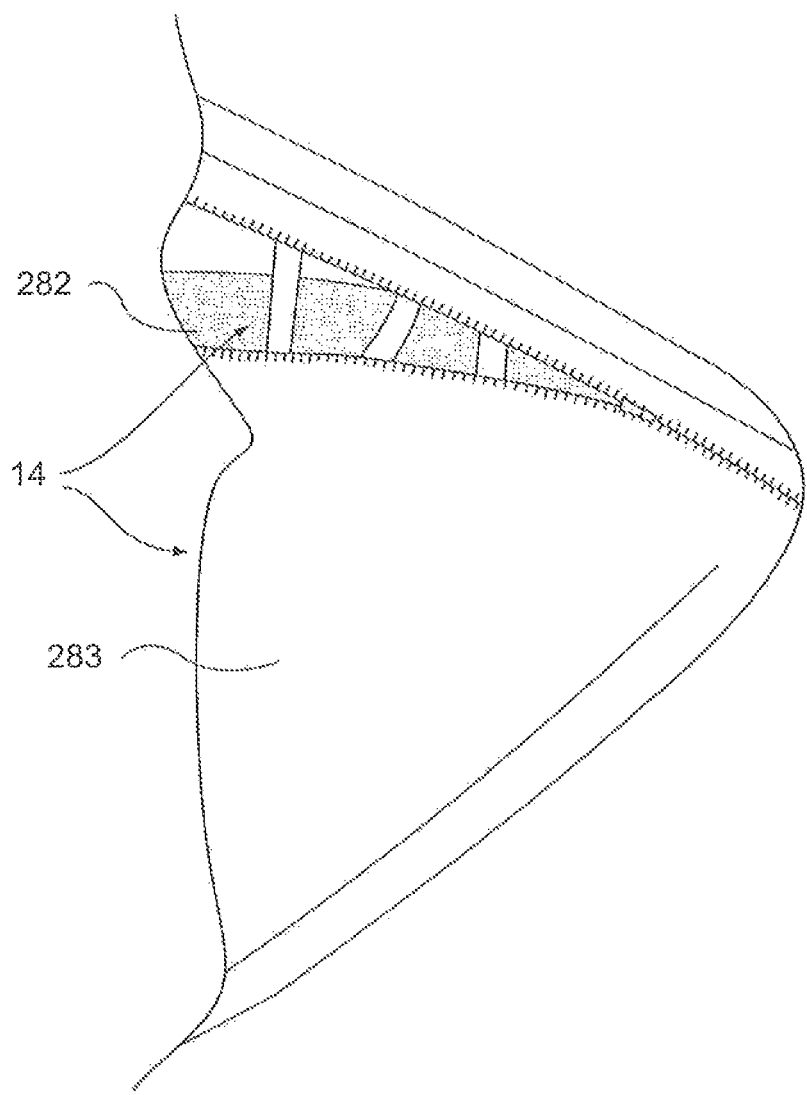
FIG. 3 illustrates an exemplary inner and outer envelope for retaining lighter-than-air gas, consistent with disclosed embodiments.

FIG. 2 illustrates an exemplary support structure 20 according to some embodiments of the present disclosure. For example, support structure 20 may be configured to define a shape associated with airship 10, while providing support to numerous systems associated with airship 10. Such systems may include, for example, hull 12, propulsion assemblies 31, power supply system 1000, and/or cargo system 1100 (FIG. 13D). As shown in FIG. 2, support structure 20 may be defined by one or more frame members 22 interconnected to form a desired shape.

To maximize a lifting capacity associated with airship 10, it may be desirable to design and fabricate support structure 20 such that weight associated with support structure 20 is minimized while strength, and therefore resistance to aerodynamic forces, for example, is maximized. In other words, maximizing a strength-to-weight ratio associated with support structure 20 may provide a more desirable configuration for airship 10. For example, one or more frame members 22 may be constructed from light-weight, but high-strength, materials including, for example, a substantially carbon-based material (e.g., carbon fiber) and/or aluminum, among other things.

Hull 12 may be configured to retain a volume of lighter-than-air gas. In some embodiments, hull 12 may include at least one envelope 282 (FIG. 3) sewn or otherwise assembled of fabric or material configured to retain a lighter-than-air gas. Envelope 282 may be fabricated from materials including, for example, aluminized plastic, polyurethane, polyester, laminated latex, mylar, and/or any other material suitable for retaining a lighter-than-air gas.

Lighter-than-air lifting gasses for use within envelope 282 of hull 12 may include, for example, helium, hydrogen, methane, and ammonia, among others. The lift force potential of a lighter-than-air gas may depend on the density of the gas relative to the density of the surrounding air or other fluid (e.g., water). For example, the density of helium at 0 degrees Celsius and 101.325 kilo-Pascals may be approximately 0.1786 grams/liter, while the density of air at 0 degrees C. and 101.325 kilo-Pascals may be approximately 1.29 g/L. Neglecting the weight of a retaining envelope, equation (1) below illustrates a simplified formula for calculating a buoyant force Fbuoyant based on volume of a lighter-than-air gas, where Df is a density associated with an ambient fluid, Dlta is a density associated with the lighter-than-air gas, gc is the gravity constant, and V is the volume of the lighter-than-air gas.

$$Fbuoyant = (Df - Dlta) * gc * V \quad (1)$$

Simplifying the equation based on a volume of helium suspended within air at 0 degrees C. and 101.325 kiloPascals, a buoyant force may be determined to be approximately Fbouyant/gc=1.11 grams per liter (i.e., approximately 1 kg per cubic meter of helium). Therefore, based on the lighter-than-air gas chosen, an internal volume of first envelope 282 associated with hull 12 may be selected such that a desired amount of lift force is generated by a volume of lighter-than-air gas. Equation (2) below may be utilized to calculate such a desired volume for aerostatic lift, taking into account the mass, M, of airship 10.

$$V > M/(Df - Dlta) \quad (2)$$

In addition, in some embodiments, hull 12 may be formed of a self-sealing material. One or more layers of hull 12 may be selected from known self-sealing materials. An exemplary self-sealing hull material is shown in FIGS. 4A and 4B. In such an embodiment, hull material 14 may include a flexible, air-tight layer 16 and a viscous substance 18 adjacent air-tight layer 16. When flexible, air-tight layer 16 is punctured, as shown in FIG. 4A, viscous substance 18 may fill and seal the puncture, as shown in FIG. 4B, after a puncturing object has been removed.

Hull 12 of airship 10 may have a three-dimensional shape that is selected according to intended functionality and use of the airship. Factors that may be considered in selecting an airship shape may include intended payload, speed of travel, range, longevity, maneuverability, etc. According to these and other factors, a number of design variables, many having an influence on hull shape, may be considered and balanced in arriving at a hull shape. Such variables may include, for example, volume/capacity of lighter-than-air gas, drag coefficient (including frontal, side, and vertical drag), weight, stability, etc.

Figure 5:
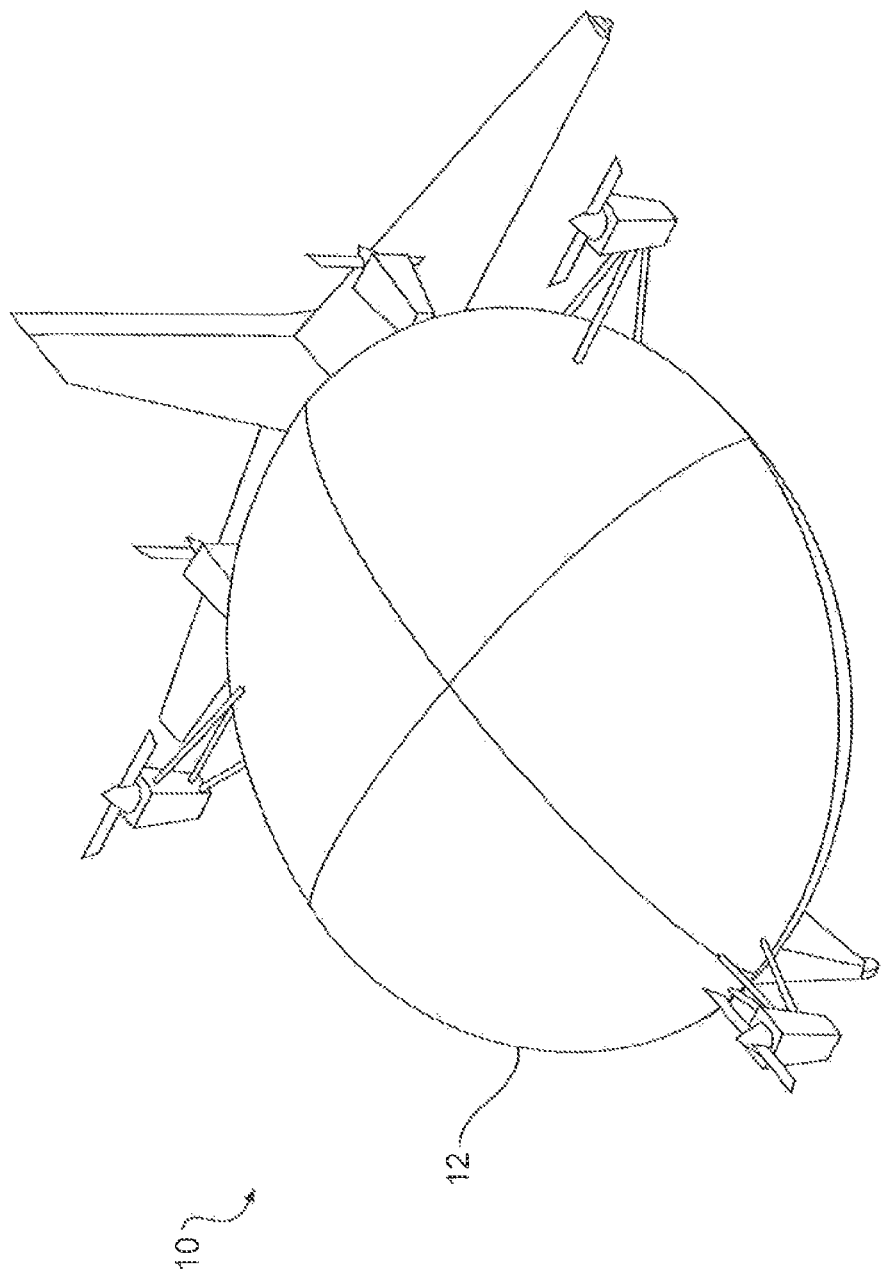
FIG. 5 illustrates an exemplary lenticular embodiment of an airship hull, consistent with disclosed embodiments.

In some embodiments, hull 12 of airship 10 may be "lenticular" in shape, i.e., substantially an oblate spheroid having a length, a width, and a height, wherein the length and the width have approximately the same dimension. For example, the dimensions of an oblate spheroid shape may be approximately described by the representation A=B>C, where A is a length dimension (e.g., along roll axis 5); B is a width dimension (e.g., along pitch axis 6); and C is a height dimension (e.g., along yaw axis 7) of an object. In other words, an oblate spheroid may have an apparently circular planform with a height (e.g., a polar diameter) less than the diameter of the circular planform (e.g., an equatorial diameter). For example, according to some embodiments, hull 12 may include dimensions as follows: A=21 meters; B=21 meters; and C=7 meters. An exemplary lenticular embodiment of airship 10 is shown in FIG. 5.

Figure 6:
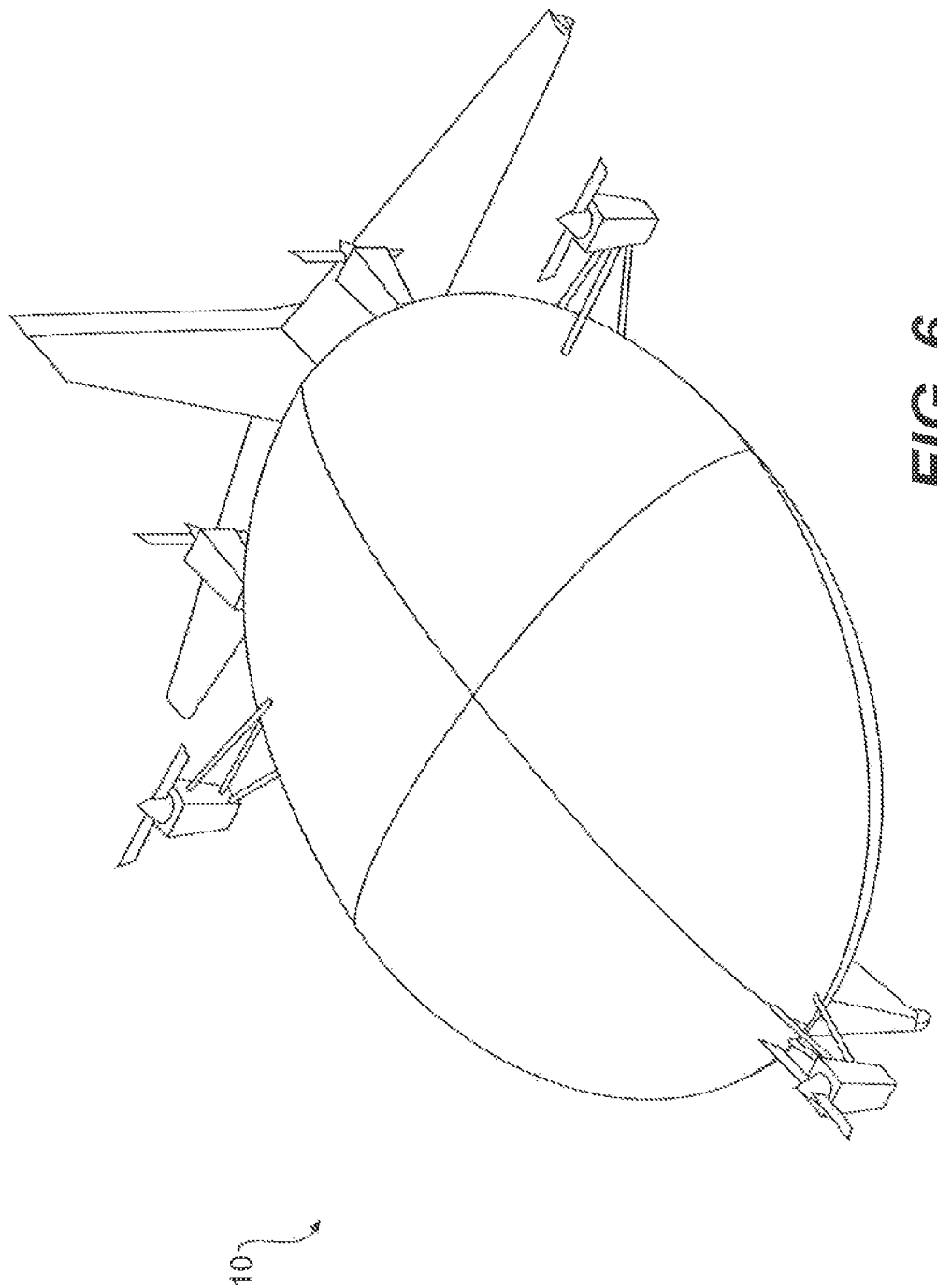
FIG. 6 illustrates an exemplary lenticular embodiment of an airship hull, consistent with disclosed embodiments.
Figure 7:
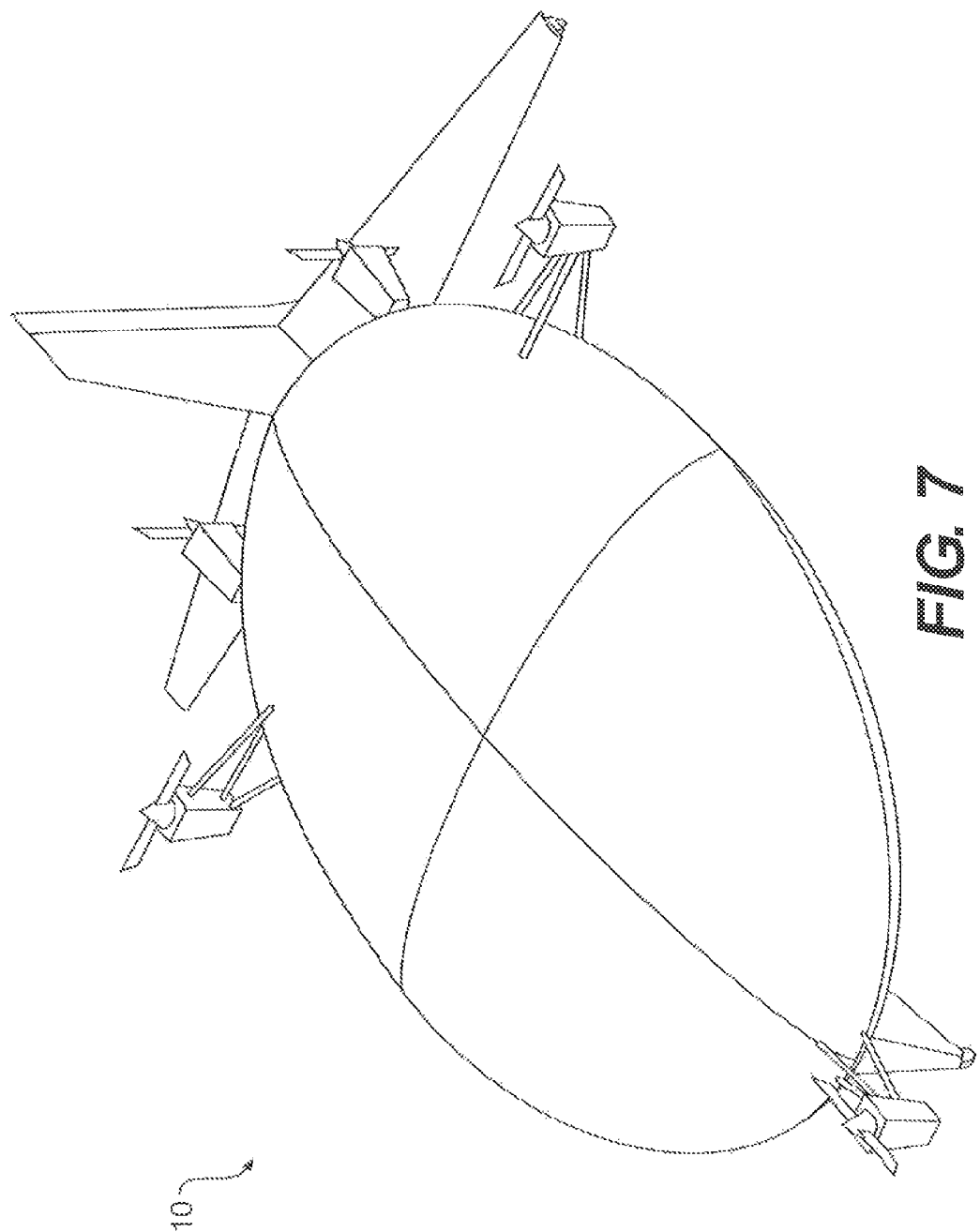
FIG. 7 illustrates an exemplary lenticular embodiment of an airship hull, consistent with disclosed embodiments.

In other embodiments, hull 12 of airship 12 may be substantially oblong. That is, hull 12 may have a length, a width, and a height, wherein an aspect ratio between the length and the width is greater than 1 to 1 (1:1). For example, in some embodiments the aspect ratio of hull length to hull width may be between approximately 4:3 and 2:1. Particularly, in some embodiments, the aspect ratio may be approximately 4:3, as shown in FIG. 6. In other embodiments, the aspect ratio may be approximately 3:2, as shown in FIG. 7.

Figure 8:
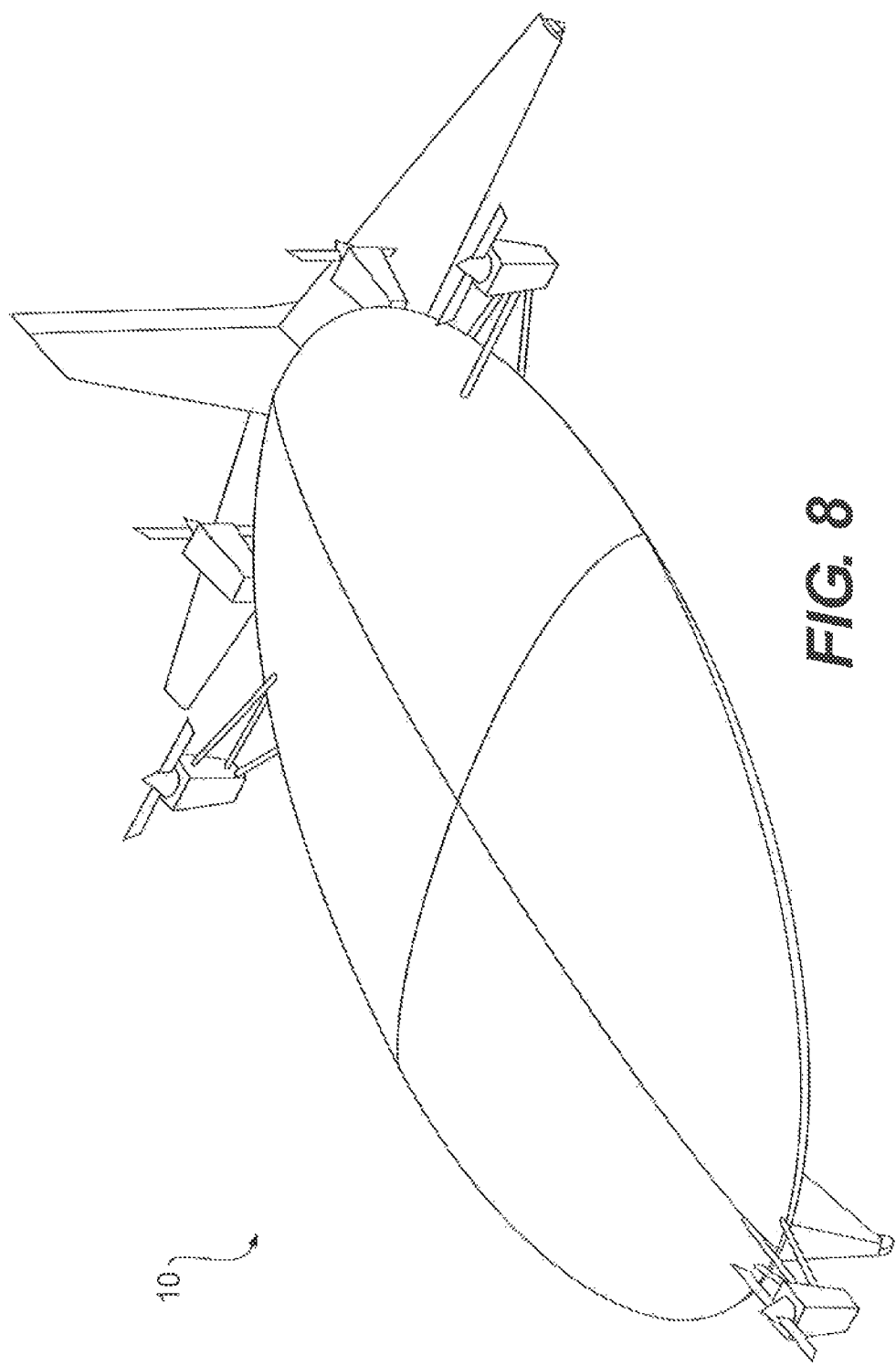
FIG. 8 illustrates an exemplary lenticular embodiment of an airship hull, consistent with disclosed embodiments.

In still other embodiments, the aspect ratio may be approximately 2:1, as shown in FIG. 8.

Figure 9B:
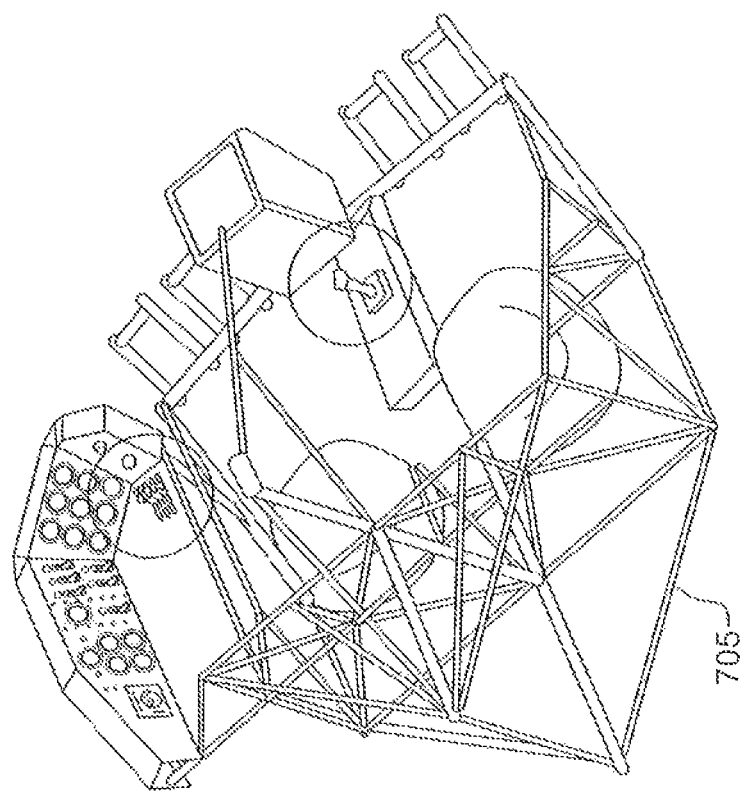
FIG. 9B illustrates an exemplary support structure of an airship, consistent with disclosed embodiments.

As shown in FIGS. 9A and 9B, support structure 20 may include one or more frame members comprising a chassis 705. In some embodiments, chassis 705 may be part of cargo system 1100 (FIG. 13D), e.g., as part of a cockpit. In other embodiments, chassis 705 may be integrated with hull 12 independent of cargo system 1100. Chassis 705 may include high strength-to-weight ratio materials including, for example, aluminum and/or carbon fiber. In some embodiments, the one or more frame members of chassis 705 may be constructed as substantially tubular and may include a carbon fiber/resin composite and honeycomb-carbon sandwich. The honeycomb-carbon sandwich may include a carbon mousse or foam-type material. In such embodiments, individual frame members may be fabricated in an appropriate size and shape for assembly of chassis 705. Such construction may lead to a suitable strength-to-weight ratio for chassis 705 as desired for a particular purpose of airship 10. One of skill in the art will recognize that chassis 705 may be constructed in numerous configurations without departing from the scope of the present disclosure. The configuration of chassis 705 shown in FIGS. 9A and 9B is merely exemplary.

Propulsion Assemblies

Figure 10:
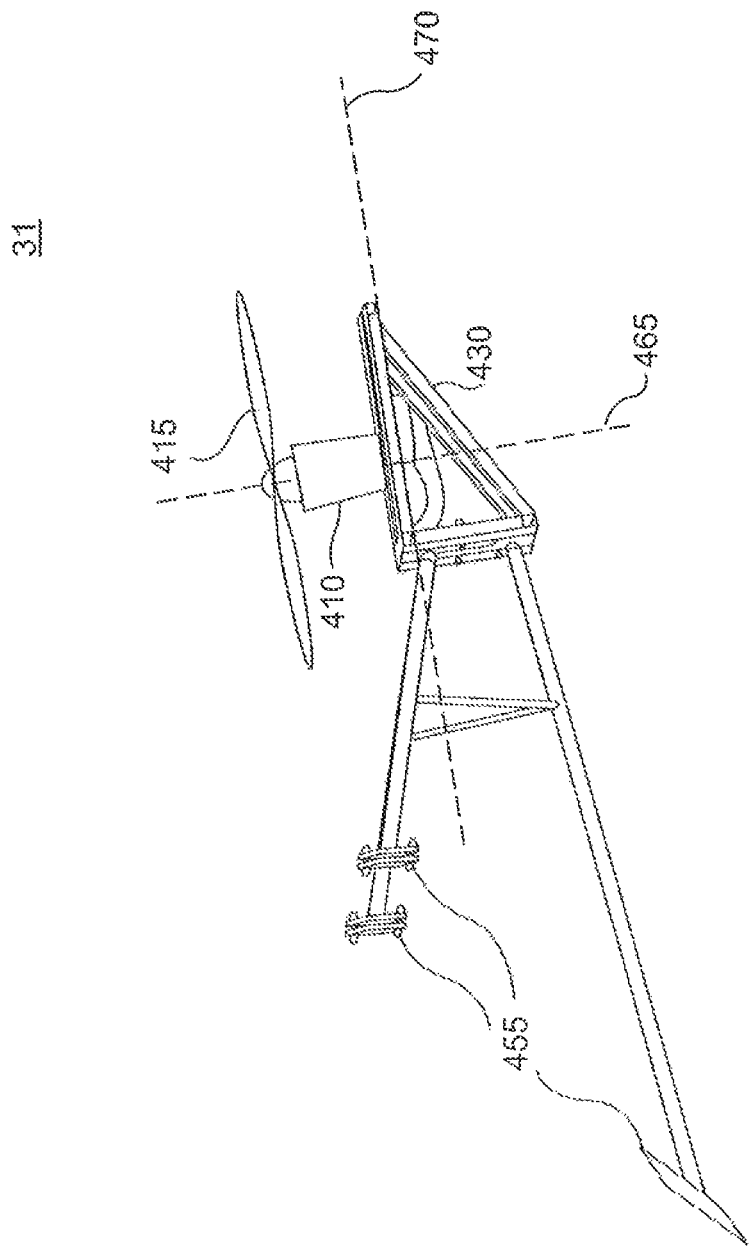
FIG. 10 illustrates an exemplary propulsion assembly, consistent with disclosed embodiments.
Figure 12A:
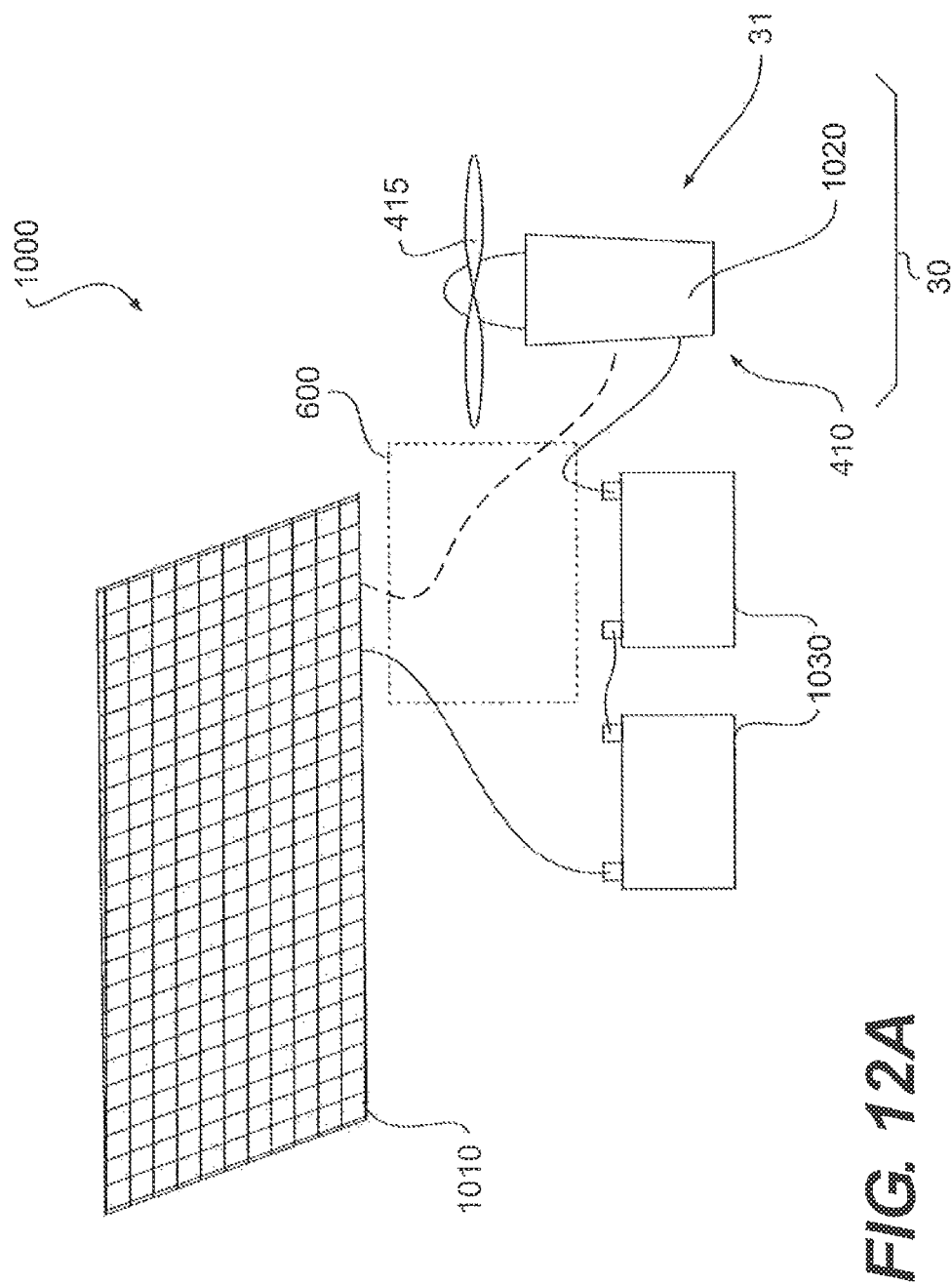
FIG. 12A illustrates an exemplary solar power supply system, consistent with disclosed embodiments.
Figure 12B:
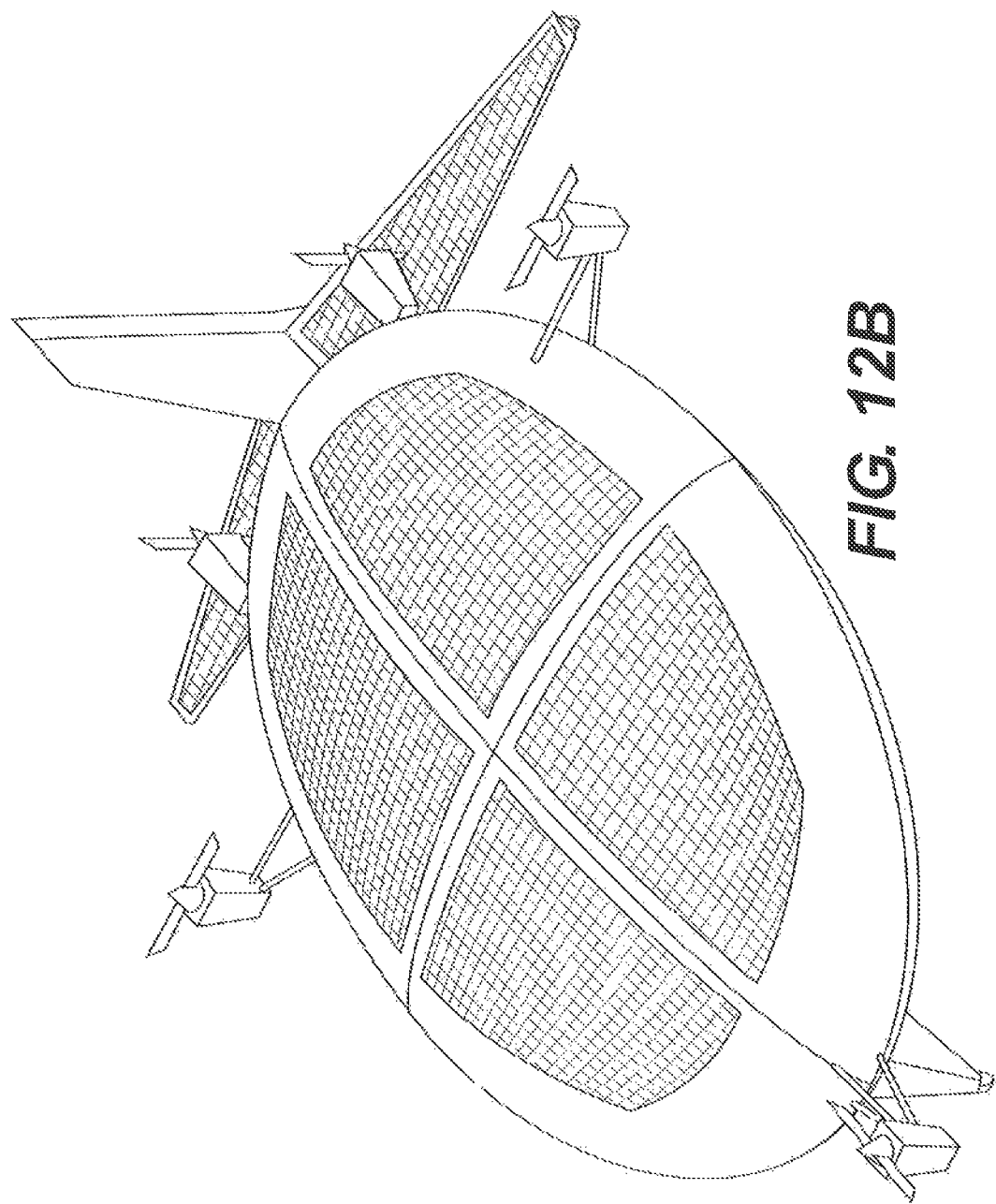
FIG. 12B illustrates an exemplary solar panel configuration, consistent with disclosed embodiments.
Figure 12C:
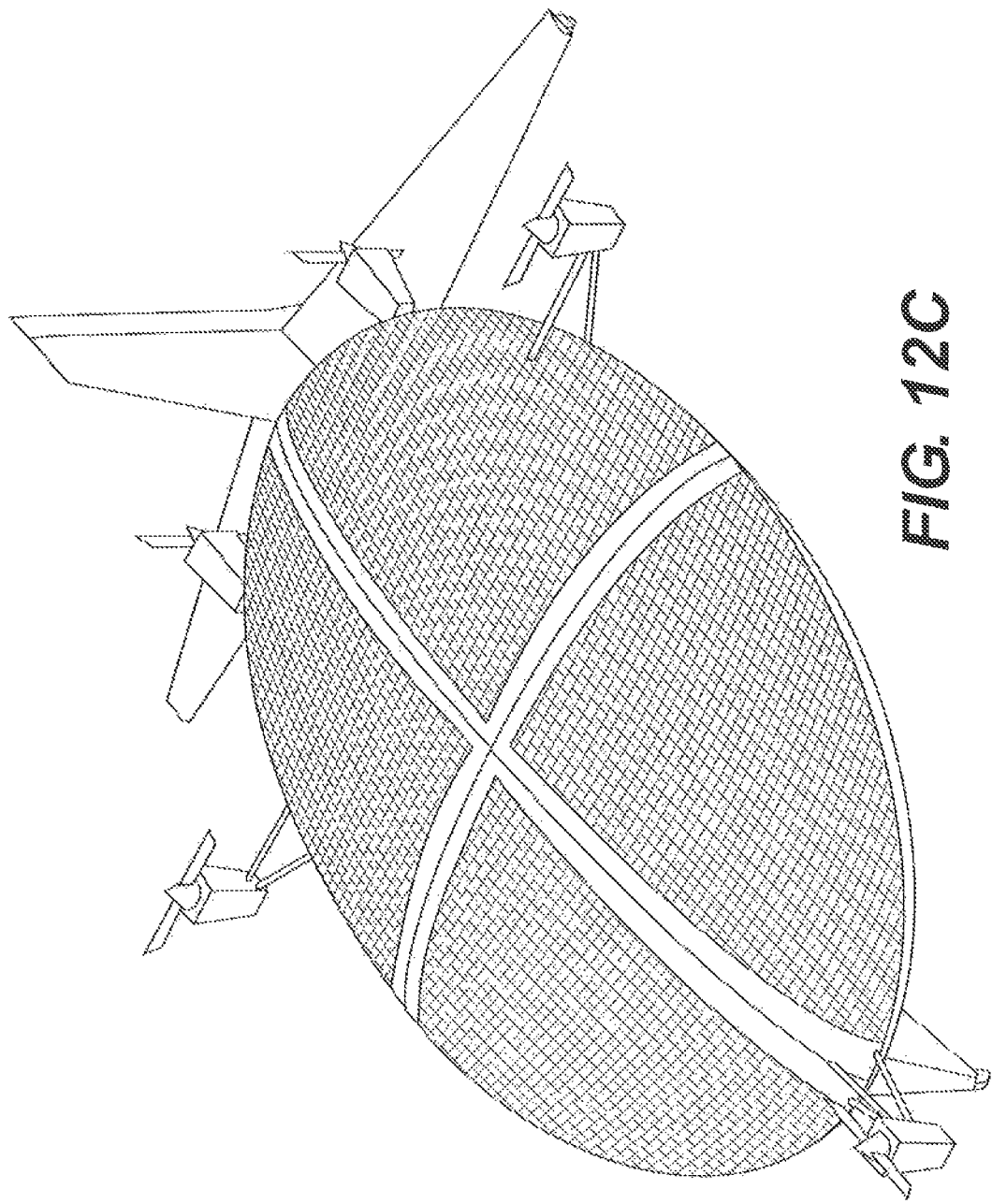
FIG. 12C illustrates an exemplary solar panel configuration, consistent with disclosed embodiments.
Figure 12D:
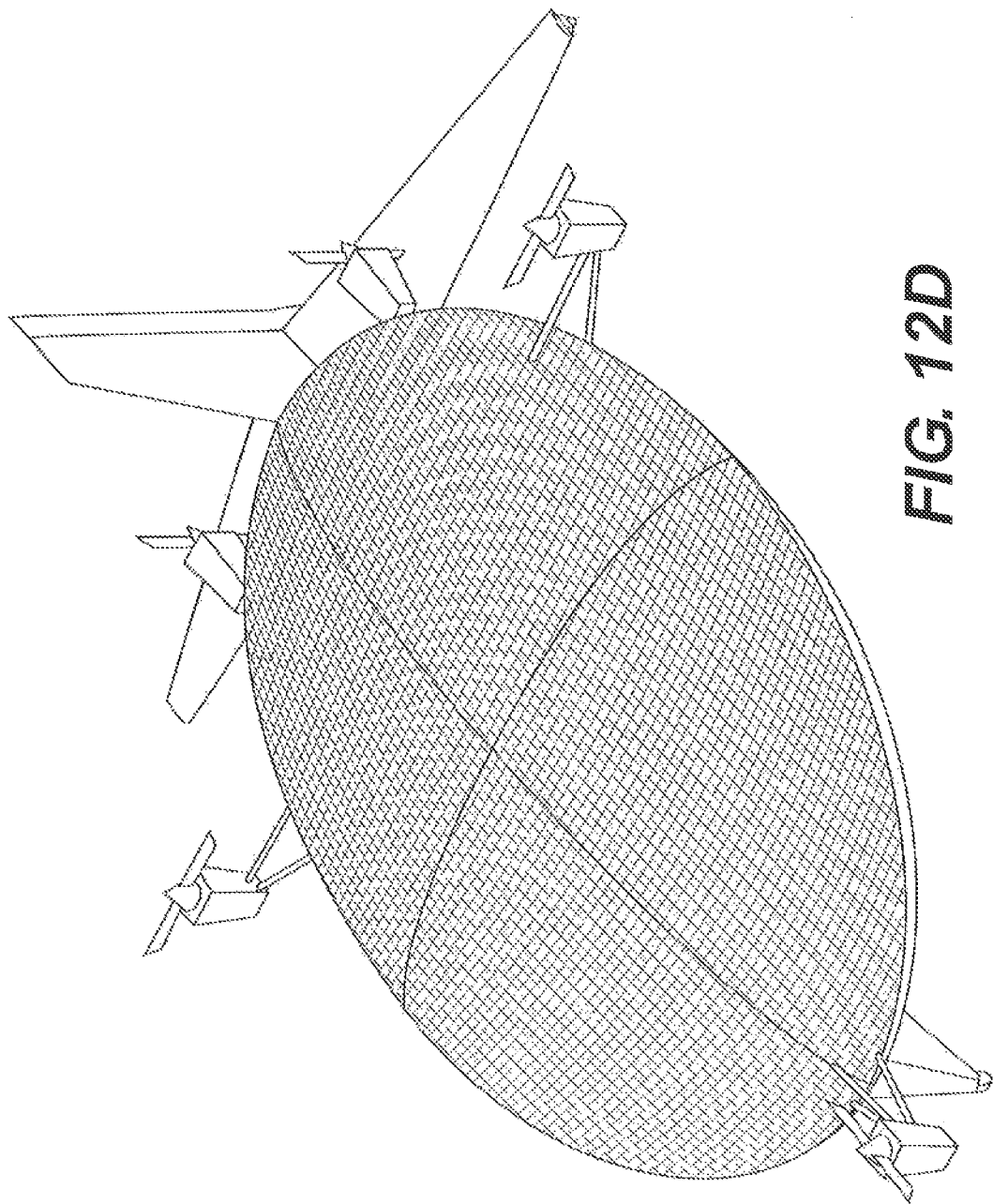
FIG. 12D illustrates an exemplary solar panel configuration, consistent with disclosed embodiments.

FIG. 10 illustrates an exemplary embodiment of propulsion assemblies 31. For example, as shown in FIG. 10, propulsion assemblies 31 may include a power source 410, a propulsion device (such as power conversion unit 415), and a propulsion unit mount 430. Power source 410 may be operatively coupled to and configured to drive power conversion unit 415. Power source 410 may include, for example, electric motors, liquid fuel motors, gas turbine engines, and/or any suitable power source configured to generate rotational power. Power source 410 may further include variable-speed and/or reversible type motors that may be run in either direction (e.g., rotated clockwise or counterclockwise) and/or at varying rotational speeds based on control signals (e.g., signals from computer 600 (e.g., as shown in FIG. 12A)). Power source 410 may be powered by batteries, solar energy, gasoline, diesel fuel, natural gas, methane, and/or any other suitable fuel source.

As shown in FIG. 10, each propulsion assembly 31 may include a power conversion unit 415 configured to convert the rotational energy of power source 410 into a thrust force suitable for acting on airship 10. For example, power conversion unit 415 may include a propulsion device, such as an airfoil or other device that, when rotated, may generate an airflow or thrust. For example, power conversion unit 415 may be arranged as an axial fan (e.g., propeller, as shown in FIG. 10), a centrifugal fan, and/or a tangential fan. Such exemplary fan arrangements may be suited to transforming rotational energy produced by power source 410 into a thrust force useful for manipulating airship 10. One of ordinary skill in the art will recognize that numerous configurations may be utilized without departing from the scope of the present disclosure.

Power conversion unit 415 may be adjustable such that an angle of attack of power conversion unit 415 may be modified. This may allow for modification to thrust intensity and direction based on the angle of attack associated with power conversion unit 415. For example, where power conversion unit 415 is configured as an adjustable airfoil (e.g., variable-pitch propellers), power conversion unit 415 may be rotated through 90 degrees to accomplish a complete thrust reversal. Power conversion unit 415 may be configured with, for example, vanes, ports, and/or other devices, such that a thrust generated by power conversion unit 415 may be modified and directed in a desired direction. Alternatively (or in addition), direction of thrust associated with power conversion unit 415 may be accomplished via manipulation of propulsion unit mount 430.

As shown in FIG. 10, for example, propulsion unit mount 430 may be operatively connected to support structure 20 (FIG. 2) and may be configured to hold a power source 410 securely, such that forces associated with propulsion assemblies 31 may be transferred to support structure 20 (FIG. 2). For example, propulsion unit mount 430 may include fastening points 455 designed to meet with a fastening location on a suitable portion of support structure 20 (FIG. 2) of hull 12 (FIG. 1). Such fastening locations may include structural reinforcement for assistance in resisting forces associated with propulsion assemblies 31 (e.g., thrust forces). Additionally, propulsion unit mount 430 may include a series of fastening points designed to match fastening points on a particular power source 410. One of ordinary skill in the art will recognize that an array of fasteners may be used for securing fastening points to obtain a desired connection between propulsion unit mount 430 and a fastening location.

Figure 25:
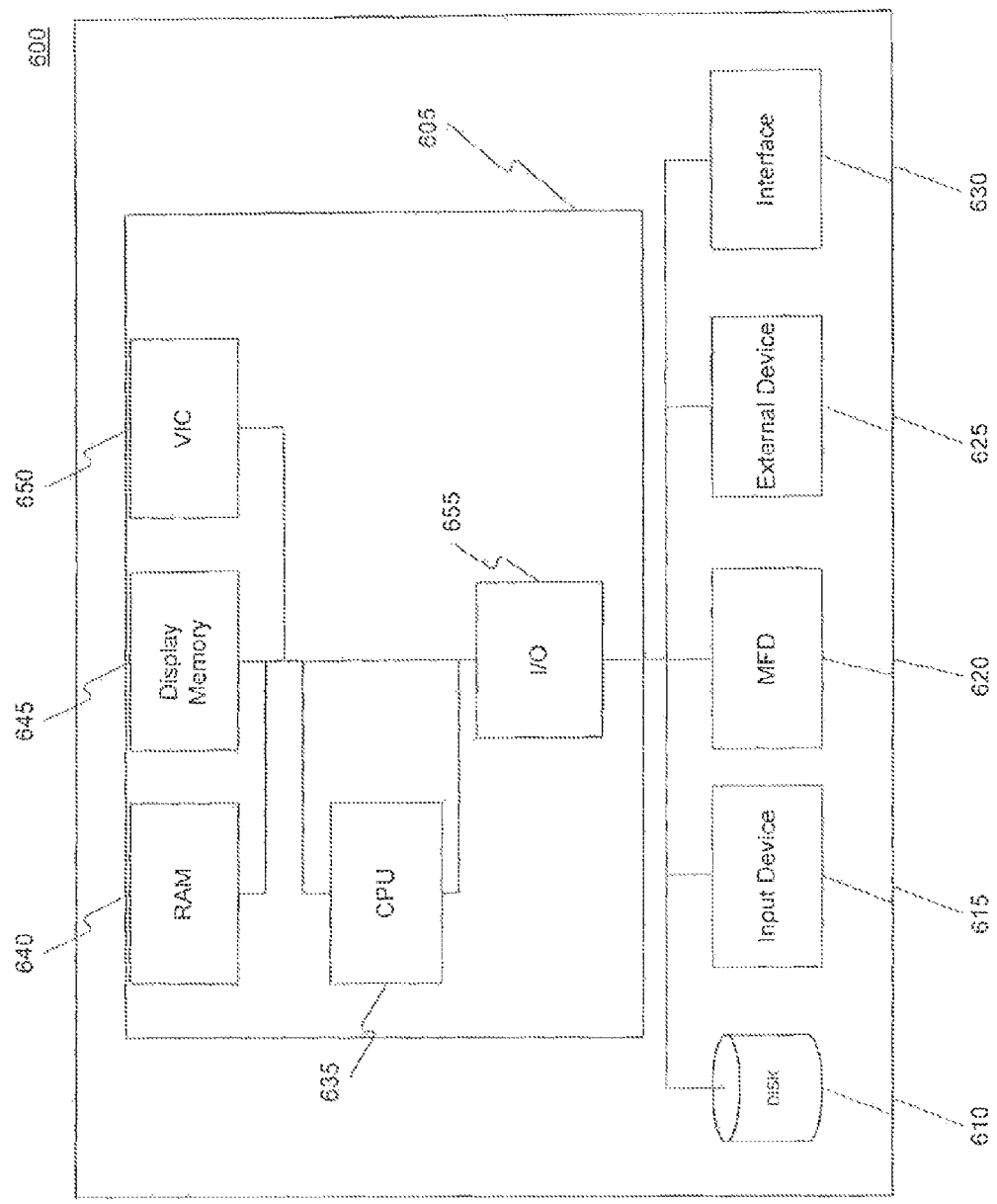
FIG. 25 is a block diagram of an exemplary flight computer, consistent with disclosed embodiments.

According to some embodiments, propulsion unit mount 430 may include pivot assemblies configured to allow a rotation of propulsion assemblies 31 about one or more axes (e.g., axes 465 and 470) in response to a control signal provided by, for example, computer 600 (FIG. 25).

FIGS. 11A and 11B illustrate exemplary configurations (viewed from the bottom of airship 10) of a propulsion system associated with airship 10 consistent with the present disclosure. Propulsion assemblies 31 associated with airship 10 may be configured to provide a propulsive force (e.g., thrust), directed in a particular direction (i.e., a thrust vector), and configured to generate motion (e.g., horizontal motion), counteract a motive force (e.g., wind forces), and/or other manipulation of airship 10 (e.g., yaw control). For example, propulsion assemblies 31 may enable yaw, pitch, and roll control as well as providing thrust for horizontal and vertical motion. Such functionality may depend on placement and power associated with propulsion assemblies 31.

Functions associated with propulsion system 30 may be divided among a plurality of propulsion assemblies 31 (e.g., five propulsion assemblies 31). For example, propulsion assemblies 31 may be utilized for providing a lift force for a vertical take-off such that the forces of the lighter-than-air gas within first envelope 282 are assisted in lifting by a thrust force associated with the propulsion assemblies 31. Alternatively (or in addition), propulsion assemblies 31 may be utilized for providing a downward force for a landing maneuver such that the forces of the lighter-than-air gas within first envelope 282 are counteracted by a thrust force associated with the propulsion assemblies 31. In addition, horizontal thrust forces may also be provided by propulsion assemblies 31 for purposes of generating horizontal motion (e.g., flying) associated with airship 10.

It may be desirable to utilize propulsion assemblies 31 for controlling or assisting in control of yaw, pitch, and roll associated with airship 10. For example, as shown in FIG. 11A, propulsion system 30 may include a fore propulsion assembly 532 operatively affixed to a fore section of keel hoop 120 (FIG. 24D) and substantially parallel to and/or on roll axis 5 of airship 10. In addition to fore propulsion assembly 532, propulsion system 30 may include a starboard propulsion assembly 533 operatively affixed to keel hoop 120 (FIG. 24D) at approximately 120 degrees (about yaw axis 7) relative to roll axis 5 of airship 10 and a port propulsion assembly 534 operatively affixed to keel hoop 120 (FIG. 24D) at approximately negative 120 degrees (e.g., positive 240 degrees) (about yaw axis 7) relative to roll axis 5 of airship 10. Such a configuration may enable control of yaw, pitch, and roll associated with airship 10. For example, where it is desired to cause a yawing movement of airship 10, fore propulsion assembly 532 may be rotated or pivoted such that a thrust vector associated with fore propulsion assembly 532 is directed parallel to pitch axis 6 and to the right or left relative to hull 12, based on the desired yaw. Upon operation of fore propulsion assembly 532, airship 10 may be caused to yaw in reaction to the directed thrust associated with fore propulsion assembly 532.

In other exemplary embodiments, for example, where it is desired to cause a pitching motion associated with airship 10, fore propulsion assembly 532 may be rotated such that a thrust force associated with fore propulsion assembly 532 may be directed parallel to yaw axis and toward the ground (i.e., down) or toward the sky (i.e., up), based on the desired pitch. Upon operation of fore propulsion assembly 532, airship 10 may then be caused to pitch in reaction to the directed thrust associated with fore propulsion assembly 532.

According to still other embodiments, for example, where it is desired to cause a rolling motion associated with airship 10, starboard propulsion assembly 533 may be rotated such that a thrust force associated with starboard propulsion assembly 533 may be directed parallel to yaw axis 7 and toward the ground (i.e., down) or toward the sky (i.e., up) based on the desired roll, and/or port propulsion assembly 534 may be rotated such that a thrust force associated with port propulsion assembly 534 may be directed in a direction opposite from the direction of the thrust force associated with starboard propulsion assembly 533. Upon operation of starboard propulsion assembly 533 and port propulsion assembly 534, airship 10 may then be caused to roll in reaction to the directed thrusts. One of ordinary skill in the art will recognize that similar results may be achieved using different combinations and rotations of propulsion assemblies 31 without departing from the scope of the present disclosure.

Fore, starboard, and port propulsion assemblies 532, 533, and 534 may also be configured to provide thrust forces for generating forward or reverse motion of airship 10. For example, starboard propulsion unit 533 may be mounted to propulsion mount 430 (FIG. 10) and configured to pivot from a position in which an associated thrust force is directed in a downward direction (i.e., toward the ground) to a position in which the associated thrust force is directed substantially parallel to roll axis 5 and toward the rear of airship 10. This may allow starboard propulsion unit 533 to provide additional thrust to supplement thrusters. Alternatively, starboard propulsion unit 534 may be rotated from a position in which an associated thrust force is directed substantially parallel to roll axis 5 and toward the rear of airship 10, to a position where the associated thrust force is directed along pitch axis 6 such that an adverse wind force may be counteracted.

In addition to fore, starboard, and port propulsion assemblies 532, 533, and 534, respectively, propulsion system 30 may include one or more starboard thrusters 541 and one or more port thrusters 542 configured to provide horizontal thrust forces to airship 10. Starboard and port thrusters 541 and 542 may be mounted to keel hoop 120 (FIG. 24D), lateral frame members, horizontal stabilizing members 315 (FIG. 24A), or any other suitable location associated with airship 10. Starboard and port thrusters 541 and 542 may be mounted using an operative propulsion unit mount 430 similar to that described above, or, alternatively, starboard and port thrusters 541 and 542 may be mounted such that minimal rotation or pivoting may be enabled (e.g., substantially fixed). For example, starboard and port thrusters 541 and 542 may be mounted to keel hoop 120 (FIG. 24D) at an aft location on either side of vertical stabilizing member 310 (FIG. 24D) (e.g., at approximately 160 degrees and negative 160 degrees, as shown in FIG. 5B). In some embodiments, starboard and port thrusters 541 and 542 may be substantially co-located with starboard and port propulsion assemblies 533 and 534 as described above (e.g., positive 120 degrees and negative 120 degrees). In such embodiments, propulsion unit mounts 430 associated with starboard and port propulsion assemblies 533 and 534 may include additional fastening points such that propulsion unit mounts 430 associated with starboard and port thrusters 541 and 542 may be operatively connected to one another. Alternatively, propulsion unit mounts 430 associated with starboard and port thrusters 541 and 542 may be operatively connected to substantially similar fastening points on support structure 20 as fastening points connected to propulsion unit mounts 430 associated with starboard and port propulsion assemblies 533 and 534.

In some embodiments, thrust from starboard and port thrusters 541 and 542 may be directed along a path substantially parallel to roll axis 5. Such a configuration may enable thrust forces associated with starboard and port thrusters 541 and 542 to drive airship 10 in a forward or reverse direction based on the thrust direction.

In some embodiments, thrust from starboard and port thrusters 541 and 542 may be configurable based on a position of associated propulsion unit mount 430. One of ordinary skill in the art will recognize that additional configurations for starboard and port thrusters 541 and 542 may be utilized without departing from the scope of this disclosure.

Power Supply System

As shown in FIG. 12A, power supply system 1000 may include one or more solar panels 1010 (including photovoltaic cells) disposed on airship 10. Solar panels 1010 may be disposed on various portions of airship 10 in a variety of different configurations, as shown in FIGS. 1 and 12B-12D. Persons of ordinary skill in the art will recognize the requirements of solar panels suitable for the applications disclosed herein. Further, the disclosed configurations and placement of solar panels shown and discussed herein are not intended to be limiting, and persons of ordinary skill in the art will understand that additional embodiments are possible.

Solar panels 1010 may be operatively coupled one or more electric motors 1020, and configured to supply power to the one or more electric motors for driving power conversion units 415. In addition, power supply system 1000 may include one or more batteries 1030 operatively coupled to solar panel 1010 and configured to receive and store electrical energy supplied by solar panel 1010, and may further be operatively coupled to electric motors 1020 to supply power to electric motors 1020.

Batteries 1030 may each be located within an outer envelope of airship 10 defined by hull 12 of airship 10. Batteries 1030 may be disposed in respective positions providing ballast. In some embodiments, batteries 1030 may be located in an aft portion of hull 12, as shown in FIGS. 13D and 13E. In addition, various lightweight battery technologies may be employed to minimize any reduction in airship performance due to the added weight of batteries. Persons of ordinary skill in the art will readily recognize lightweight battery technologies that may be suitable for applications disclosed herein.

Batteries 1030 may be configured to supply power to electric motors 1020 in addition to the power supplied to electric motors 1020 from solar panel 1010. Alternatively, or additionally, solar panel 1010 may be configured to supply power to electric motors 1020 via batteries 1030.

When airship 10 is exposed to sunlight and/or during certain operations of airship 10 that may not require large amounts of power, airship 10 may run exclusively on solar power from solar panel 1010. Under such conditions, electrical energy converted from sunlight by solar panel 1010 may also be used to charge batteries 1030.

Persons of ordinary skill in the art will recognize suitable operative connections between solar panel 1010, batteries 1030, and electric motors 1020, according to the arrangements described above.

Cargo System

As used herein, the term "cargo" is intended to encompass anything carried by airship 10 that is not a part of airship 10. For example, the term "cargo," as used herein, refers to freight, as well as passengers. Further, the term "passengers" is intended to encompass not only persons along for the ride, but also pilots and crew.

As shown in FIGS. 13A-13D, airship 10 may include a cargo system 1100, which may include at least one cargo compartment 1110 configured to contain passengers and/or freight, and disposed substantially within the outer envelope of the airship, which is defined by hull 12. In some embodiments, airship 10 may include multiple cargo compartments 1110 as shown in the accompanying figures. Cargo compartments 1110 may be of any suitable size and/or shape, and may include, for example, a passenger compartment 1120, which may include a pilot cockpit and/or accommodations (e.g., seating and/or lodging) for commercial travelers/tourists. In some embodiments, cargo compartments 1110 may include a freight compartment 1130. In some embodiments, airship 10 may include a passenger compartment 1120 and a separate freight compartment 1130.

Although the figures show cargo compartments 1110 generally disposed in the bottom portion of airship 10 and having a lower surface that conforms to, or is substantially continuous with, the envelope defined by hull 12, cargo compartments 1110 may have any suitable shape. Further, cargo compartments 1110 may be disposed in a location other than the bottom of airship 10. For example, embodiments are envisioned that include a passenger compartment disposed near the top portion of hull 12. Such embodiments may be practical, for example, if the passenger compartment is relatively small, e.g., to only hold a flight crew and/or several passengers.

Figure 13A:
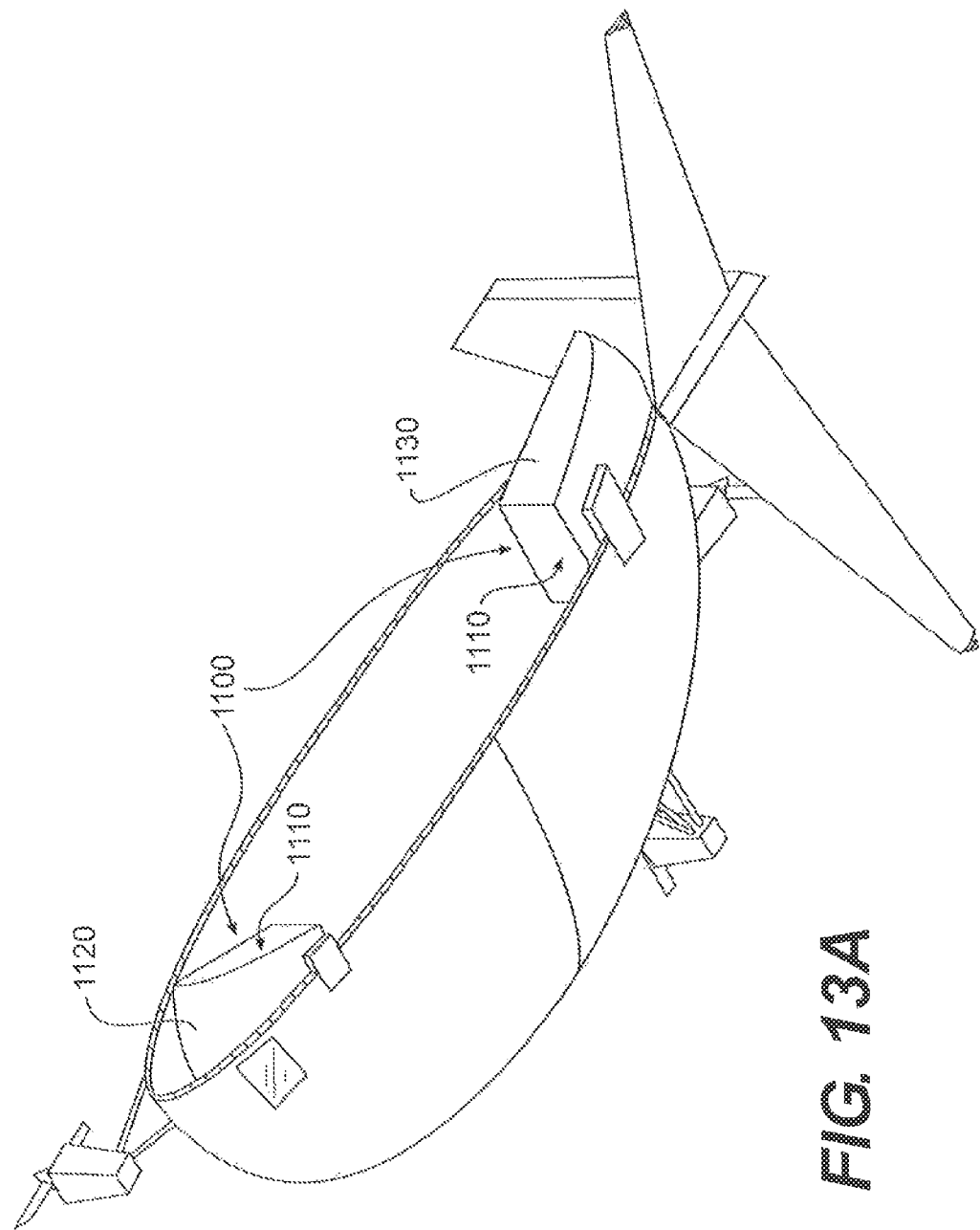
FIG. 13A illustrates an exemplary cargo system of an airship, consistent with disclosed embodiments.
Figure 13B:
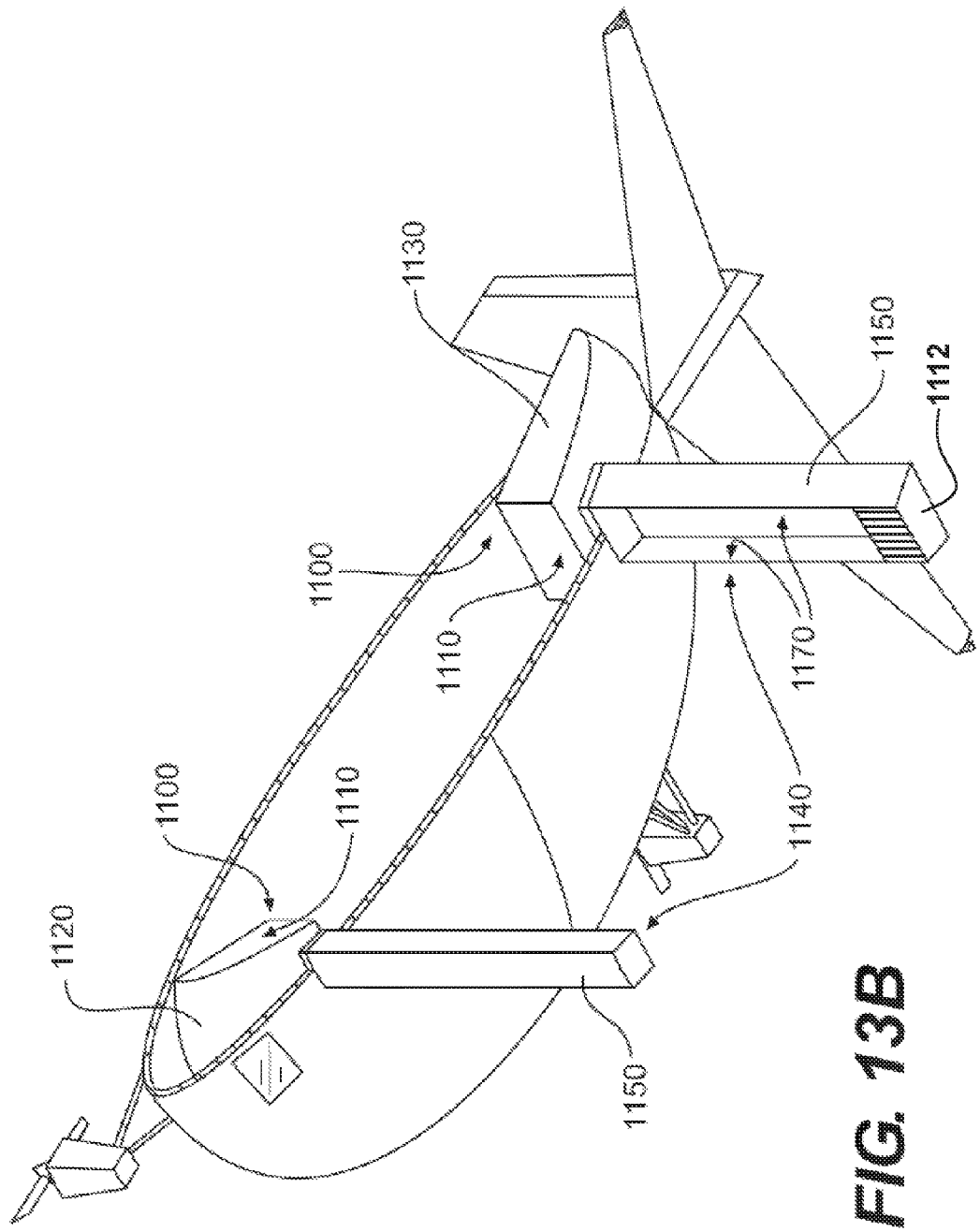
FIG. 13B illustrates an exemplary cargo system of an airship, consistent with disclosed embodiments.
Figure 13D:
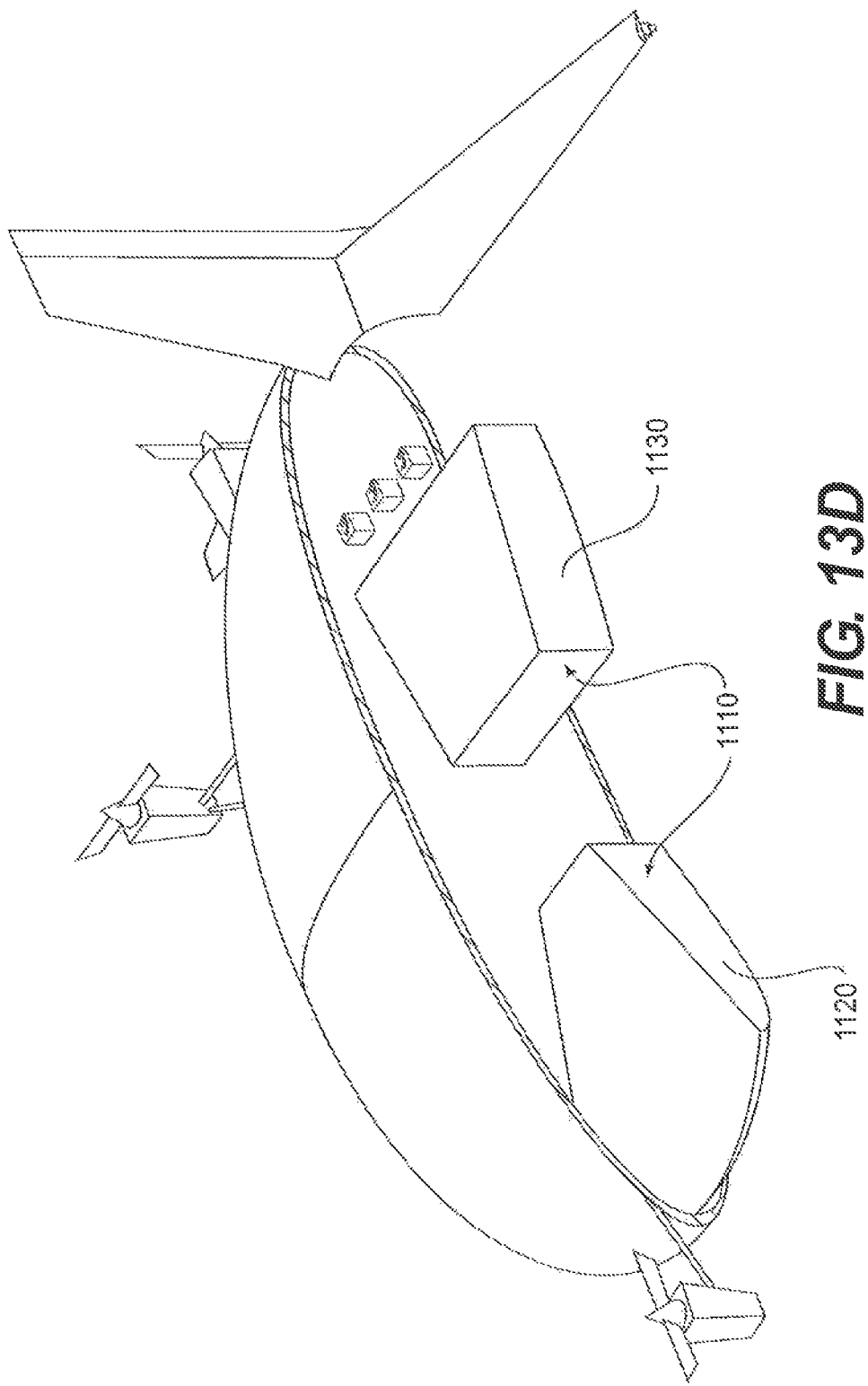
FIG. 13D illustrates an exemplary cargo system of an airship, consistent with disclosed embodiments.
Figure 13E:
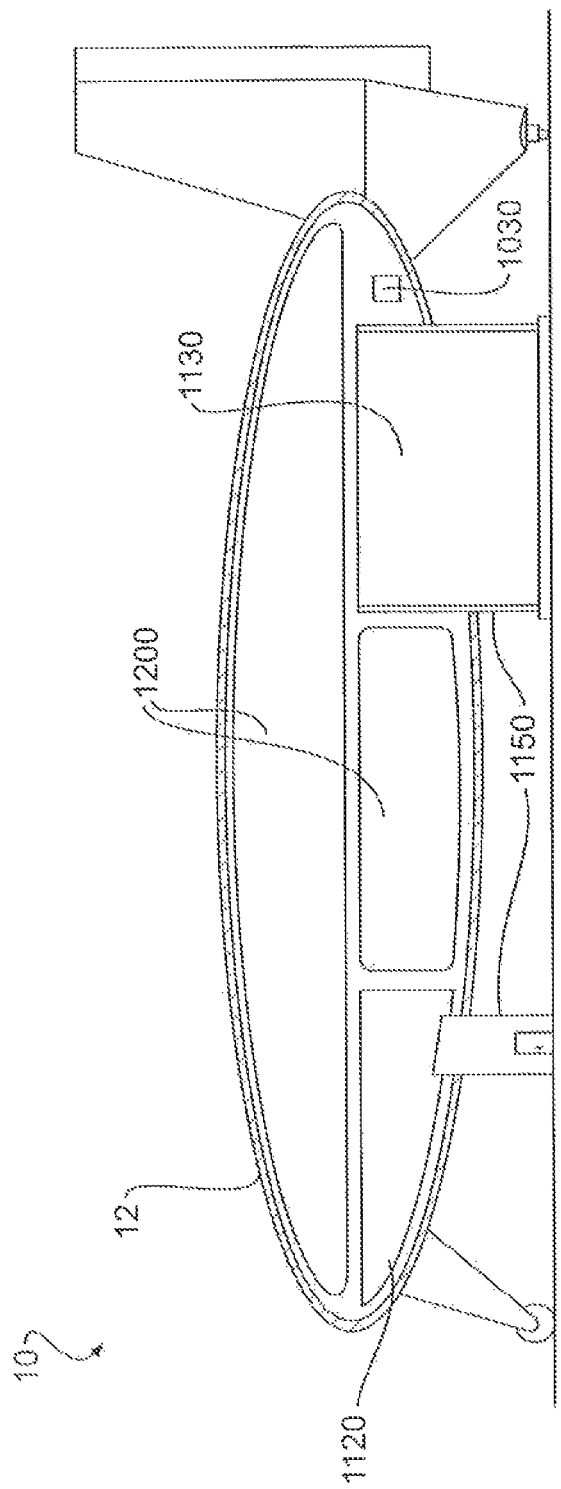
FIG. 13E illustrates an exemplary cargo system of an airship, consistent with disclosed embodiments.

In some embodiments, cargo compartments 1110 may be relatively small compared to the overall size of airship 10, as shown in FIG. 13A. Alternatively, cargo compartments 1110 may be significantly larger, as shown in FIG. 13D.

Persons of ordinary skill in the art will recognize that the size, shape, and location may be selected according to numerous parameters related to the intended operation of the airship, such as weight, ballast, desired lifting gas volume (since the internally-located cargo compartments come at the expense of lifting gas volume), etc. For example, in some embodiments one or more of cargo compartments 1110 may be disposed at a location such that a static equilibrium associated with airship 10 may be maintained. In such embodiments, a cargo compartment 1110 may be mounted, for example, at a location along roll axis 5, such that a moment about pitch axis 6 associated with the mass of the cargo compartment (or the mass of the cargo compartment including contents having a predetermined mass) substantially counteracts a moment about pitch axis 6 associated with the mass of empennage assembly 25. Furthermore, the placement of cargo compartments 1110 within the envelope of hull 12, places the mass of cargo compartments 1110 and any contents therein closer to both roll axis 5 and pitch axis 6, thus reducing moments associated with placement of such mass at distances from these axes. Similarly, positioning of cargo compartments 1110 relative to yaw axis 7 may also be taken into consideration.

In some embodiments, cargo compartments 1110 may include a suitable means of access, such as a ladder, stairs, or ramp. In other embodiments, at least one cargo compartment 1110 of airship 10 may include a transport system 1140 configured to lower and raise at least a portion of cargo compartment 1110 to facilitate loading and unloading of cargo compartment 1110. For example, as shown in FIG. 13B, cargo compartments 1110 may include elevators 1150. Elevators 1150 may include any suitable lifting mechanism. In some embodiments, elevators 1150 may include cables 1160 (see, e.g., FIG. 13C) that may connect hull 12 to a portion 1112 of cargo compartment 1110 (e.g., the floor/platform), and may be reeled in by winches attached to hull 12 in order to lift elevators 1150. Such winches may be electrically driven, using power from power supply system 1000. Persons of ordinary skill will recognize alternative mechanisms for raising and lowering portions of cargo compartments 1110.

In some embodiments, as illustrated by FIG. 13B, elevators 1150 may be configured to lower and raise portions of cargo compartments 1110 that are substantially smaller than the size of cargo compartments 1110. In other embodiments, a section of cargo compartment 1110 that may be lowered and raised may include substantially an entire lower section of cargo compartment 1110, (not shown). In still other embodiments, substantially the entire cargo compartment 1110 may be lowered and raised, as shown in FIG. 13C.

In addition, as shown in FIG. 13B, transport system 1140 may be configured to lower a portion of cargo compartment 1110 a distance from hull 12 of airship 10 that is greater than a maximum height of the compartment. In such embodiments, transport system 1140 may include elevators 1150 that include collapsible wall sections 1170.

Bladders

Figure 14:
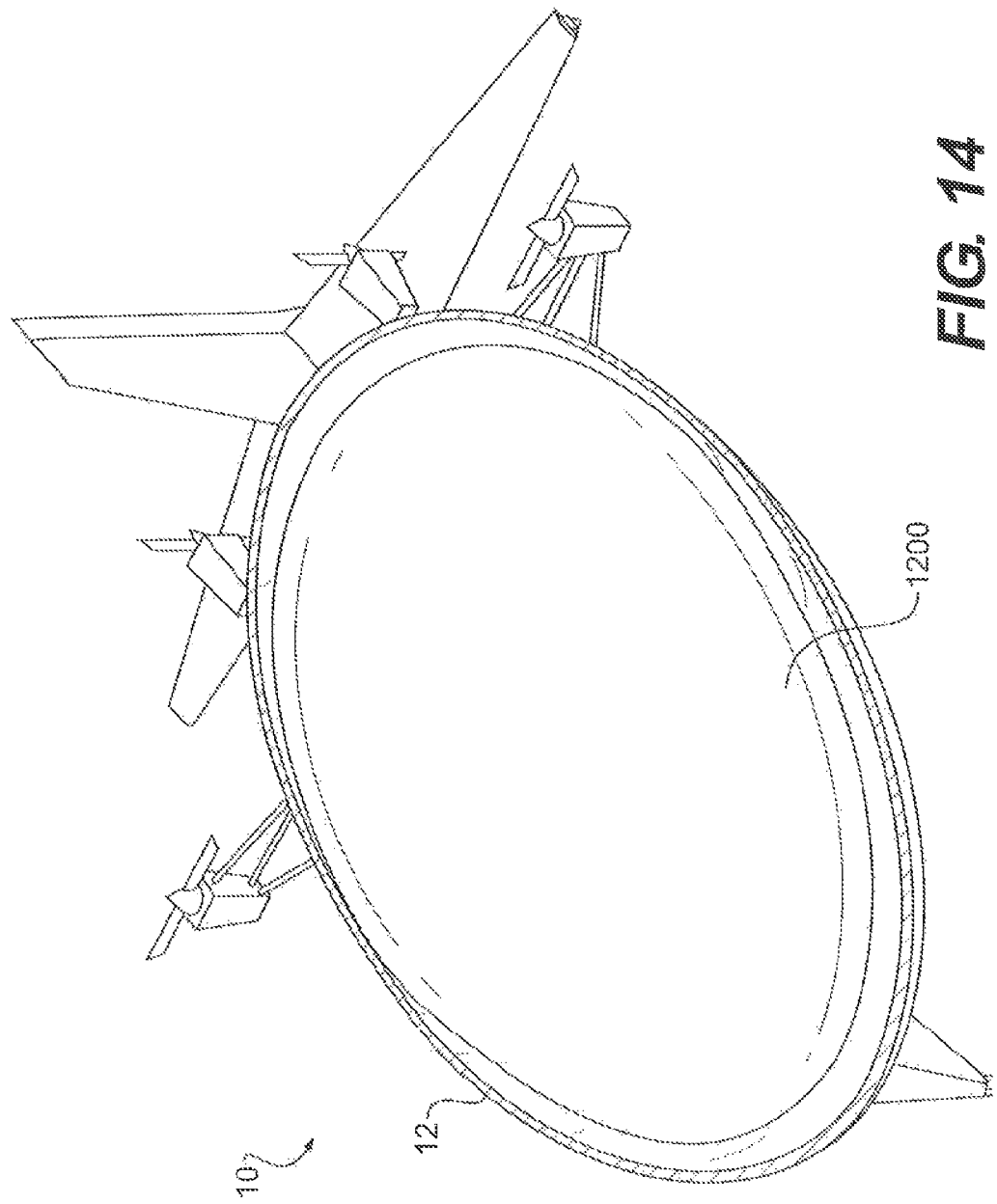
FIG. 14 illustrates an exemplary bladder configuration in a hull of an airship, consistent with disclosed embodiments.
Figure 15:
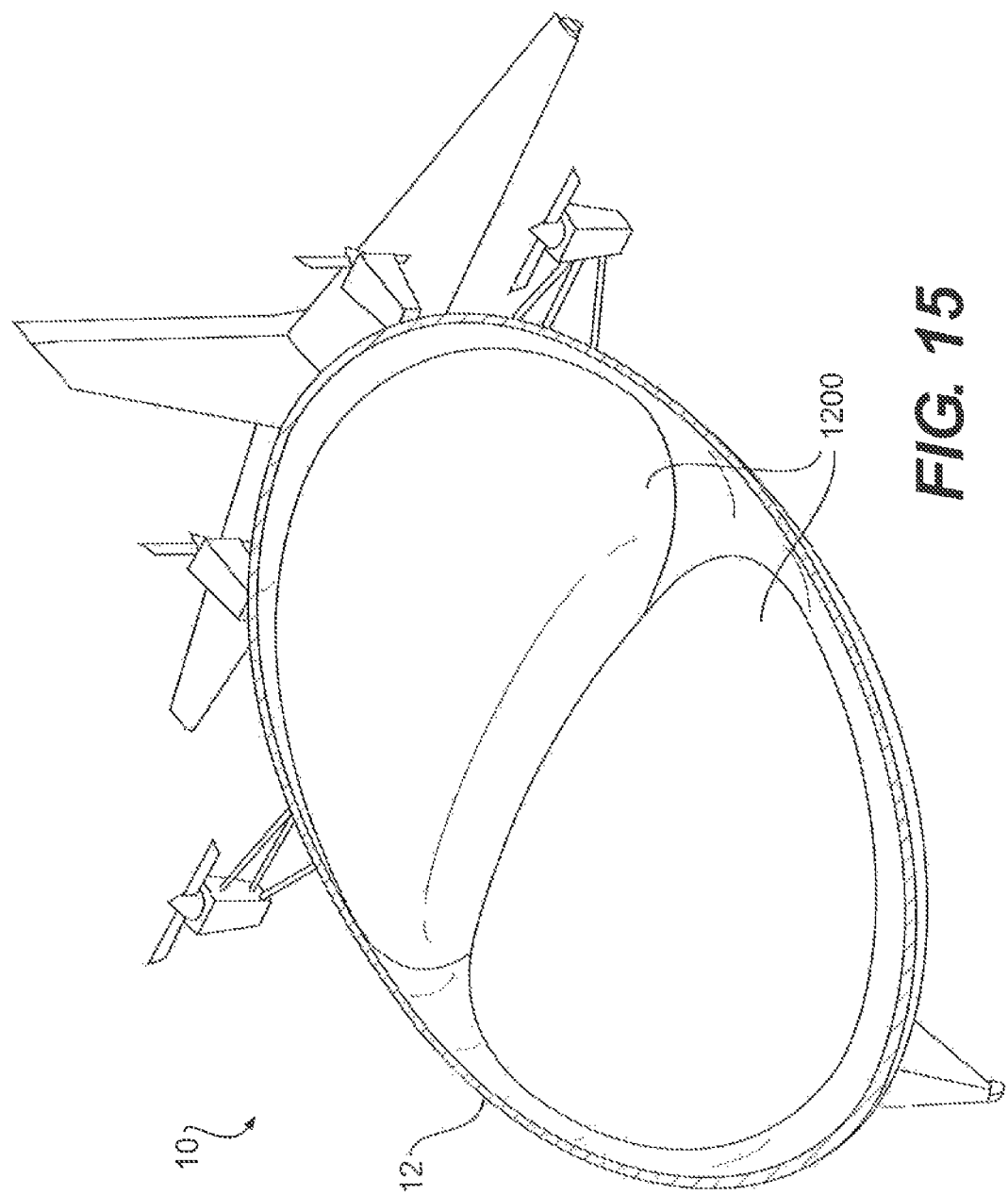
FIG. 15 illustrates an exemplary bladder configuration in a hull of an airship, consistent with disclosed embodiments.
Figure 16:
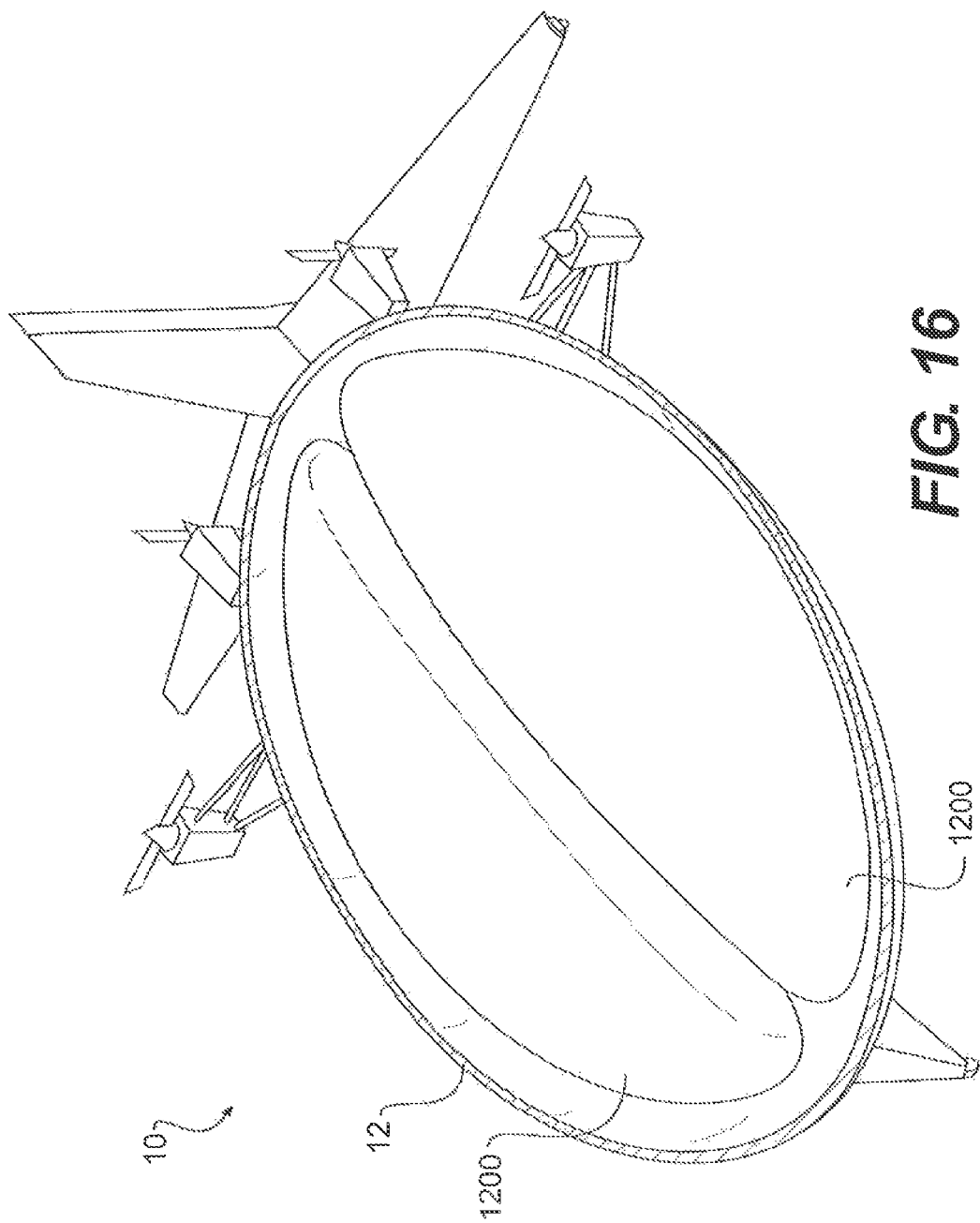
FIG. 16 illustrates an exemplary bladder configuration in a hull of an airship, consistent with disclosed embodiments.
Figure 17:
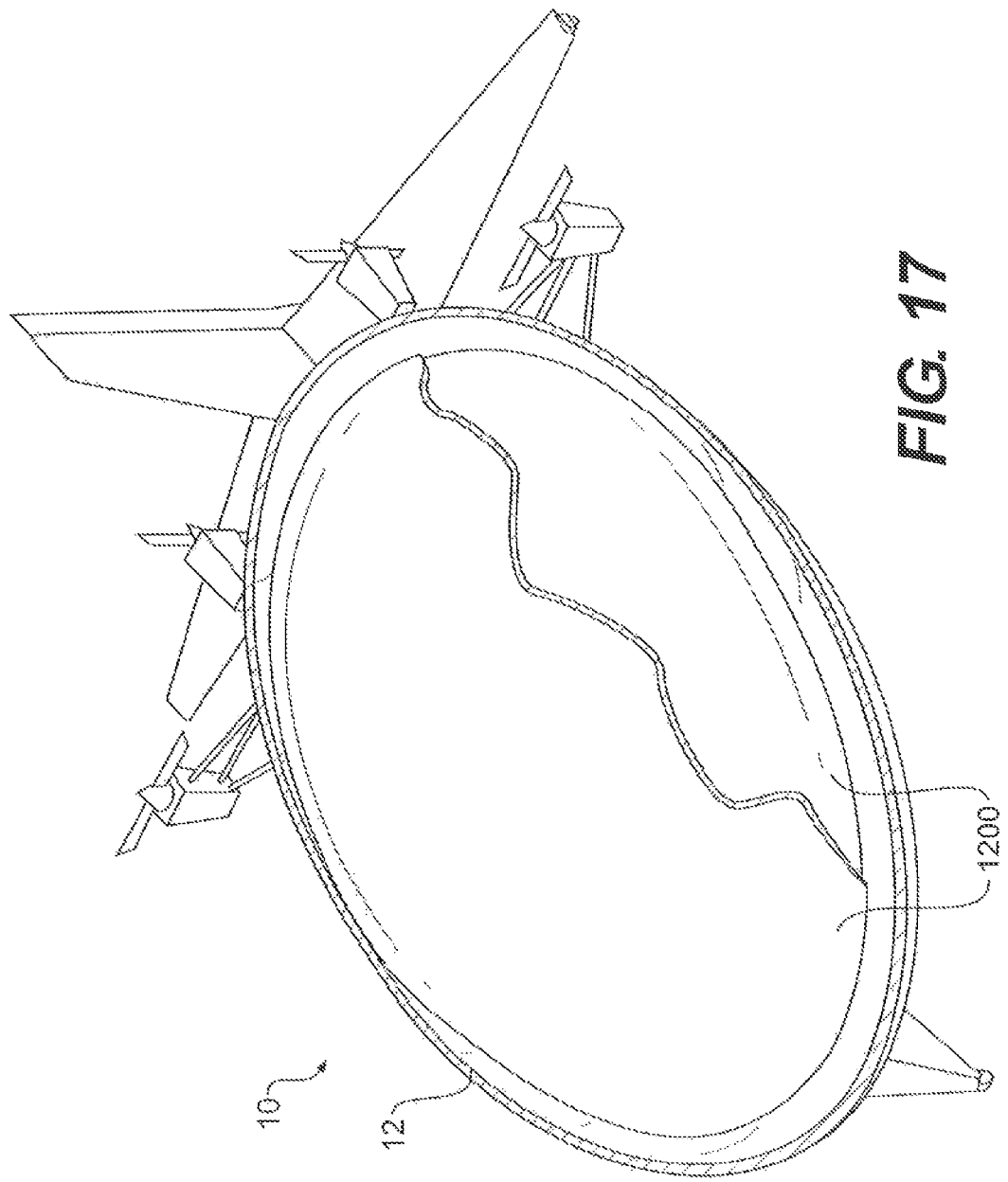
FIG. 17 illustrates an exemplary bladder configuration in a hull of an airship, consistent with disclosed embodiments.
Figure 18:
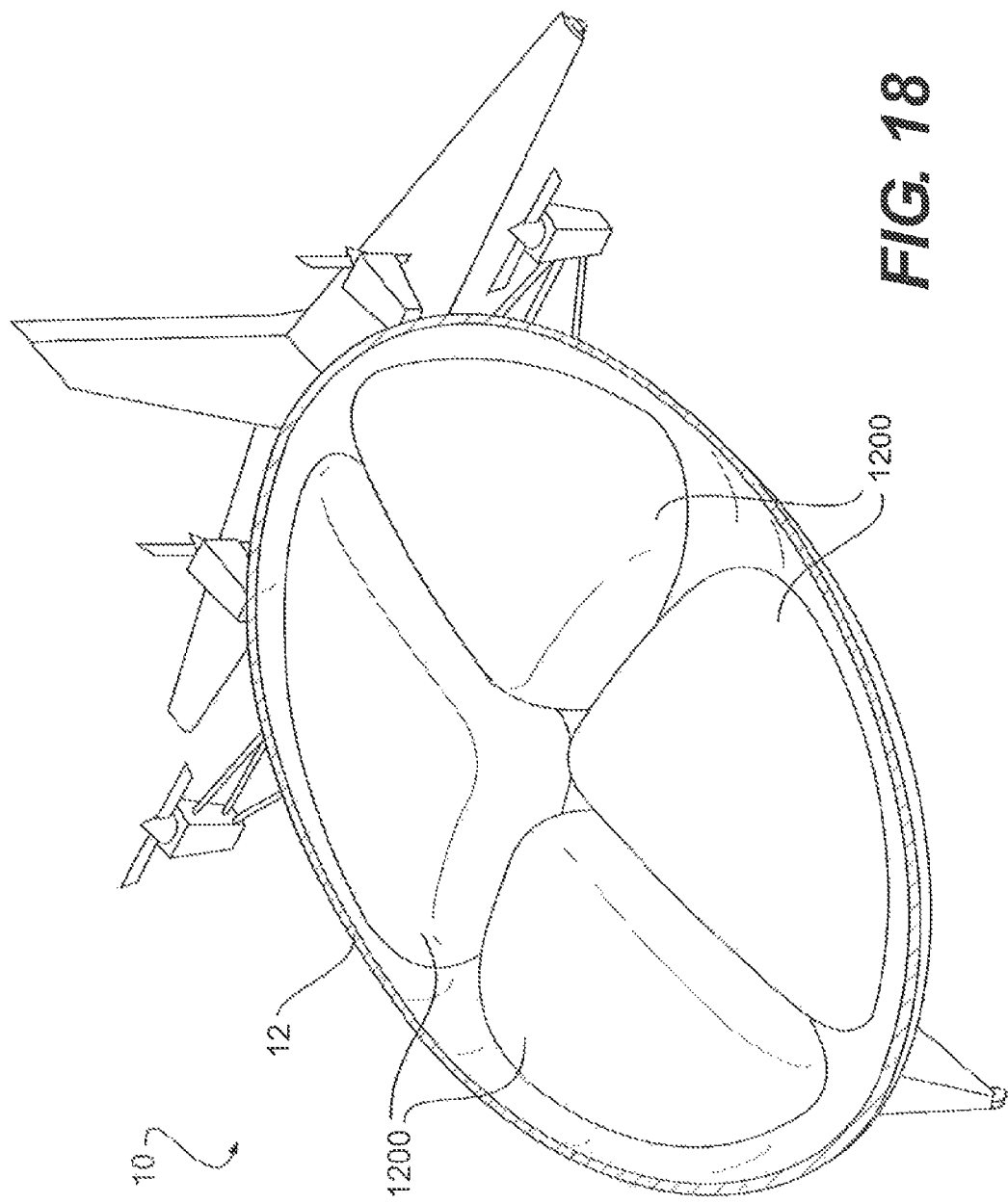
FIG. 18 illustrates an exemplary bladder configuration in a hull of an airship, consistent with disclosed embodiments.
Figure 19:
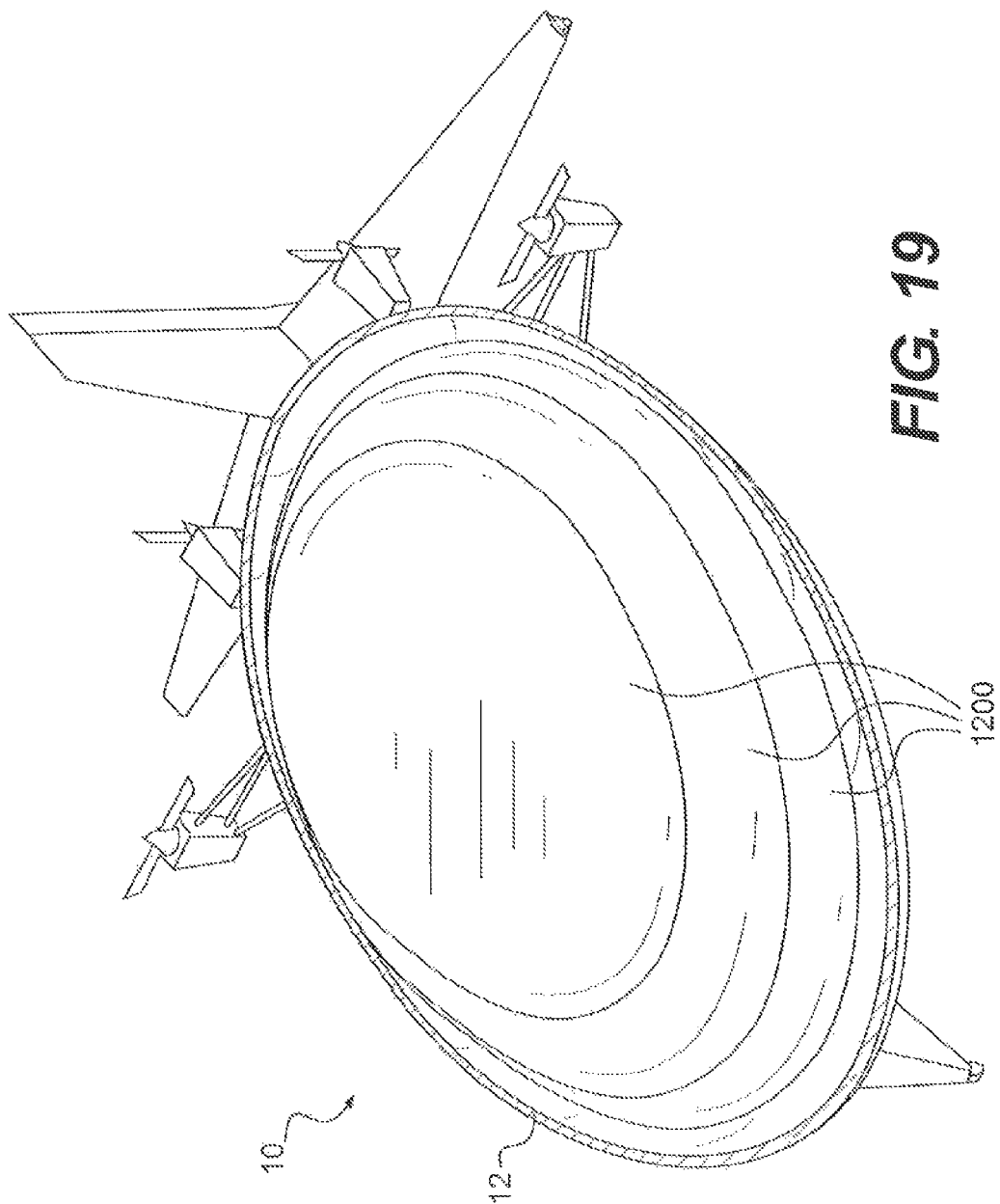
FIG. 19 illustrates an exemplary bladder configuration in a hull of an airship, consistent with disclosed embodiments.
Figure 20:
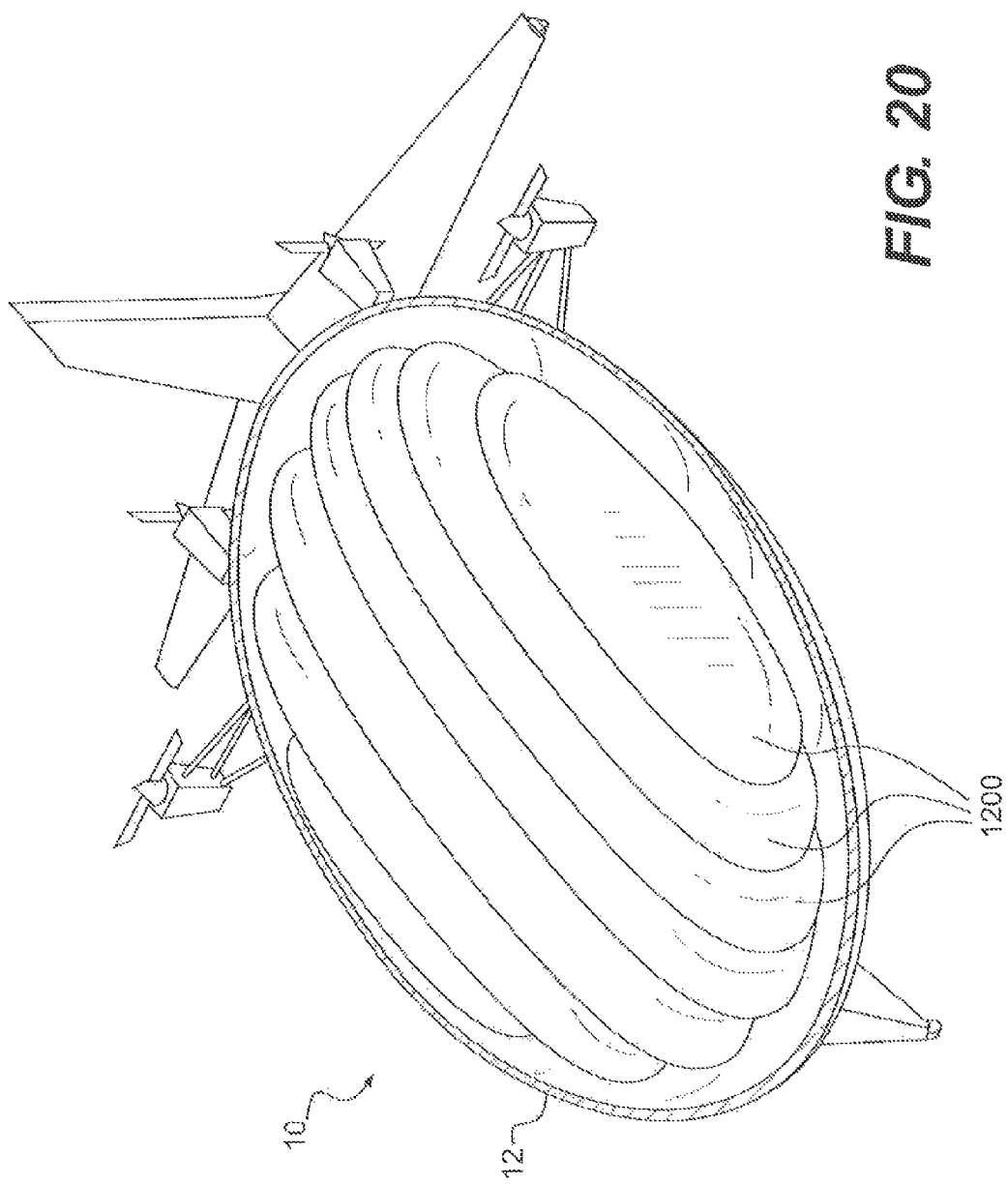
FIG. 20 illustrates an exemplary bladder configuration in a hull of an airship, consistent with disclosed embodiments.
Figure 21:
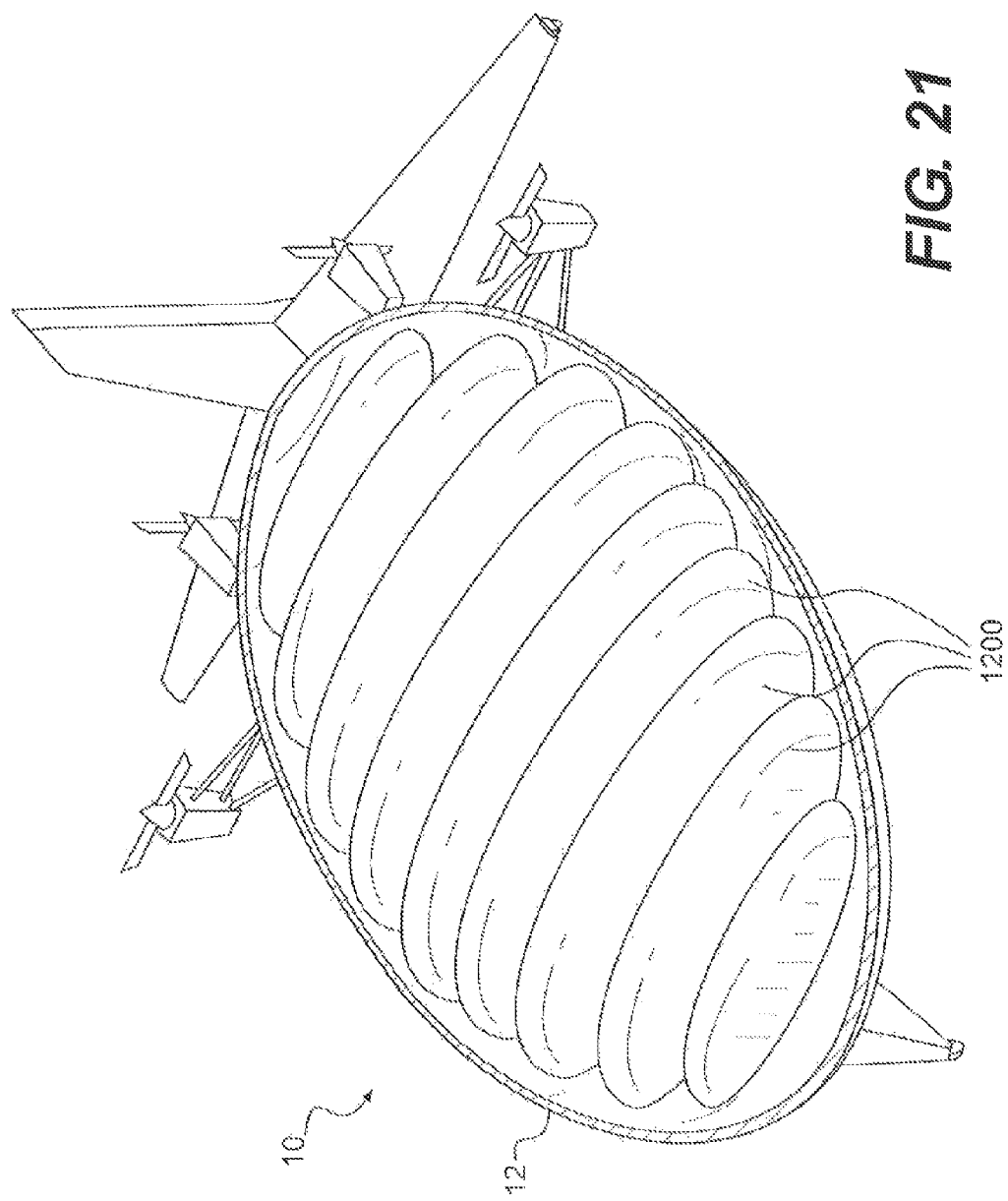
FIG. 21 illustrates an exemplary bladder configuration in a hull of an airship, consistent with disclosed embodiments.

Airship 10 may include one or more bladders 1200 inside hull 12 for containing a lighter-than-air gas, as shown in FIG. 14. In some embodiments, airship 10 may include multiple bladders 1200 disposed within hull 12 in a side-by-side, end-to-end, and/or stacked configuration. For example, bladders 1200 may be positioned end-to-end in a fore-aft configuration, as shown in FIG. 15. Alternatively, or additionally, bladders 1200 may be disposed side-by-side, as shown in FIG. 16. In some embodiments, one or more bladders 1200 may be disposed one inside another, as shown in FIG. 17. In some embodiments, both side-to-side and end-to-end configurations may be implemented, as shown in FIG. 18. In addition, embodiments are envisaged wherein bladders 1200 are stacked vertically (FIG. 19) or horizontally (FIGS. 20 and 21). A skilled artisan will recognize that various combinations of these bladder configurations may be implemented.

Figure 22:
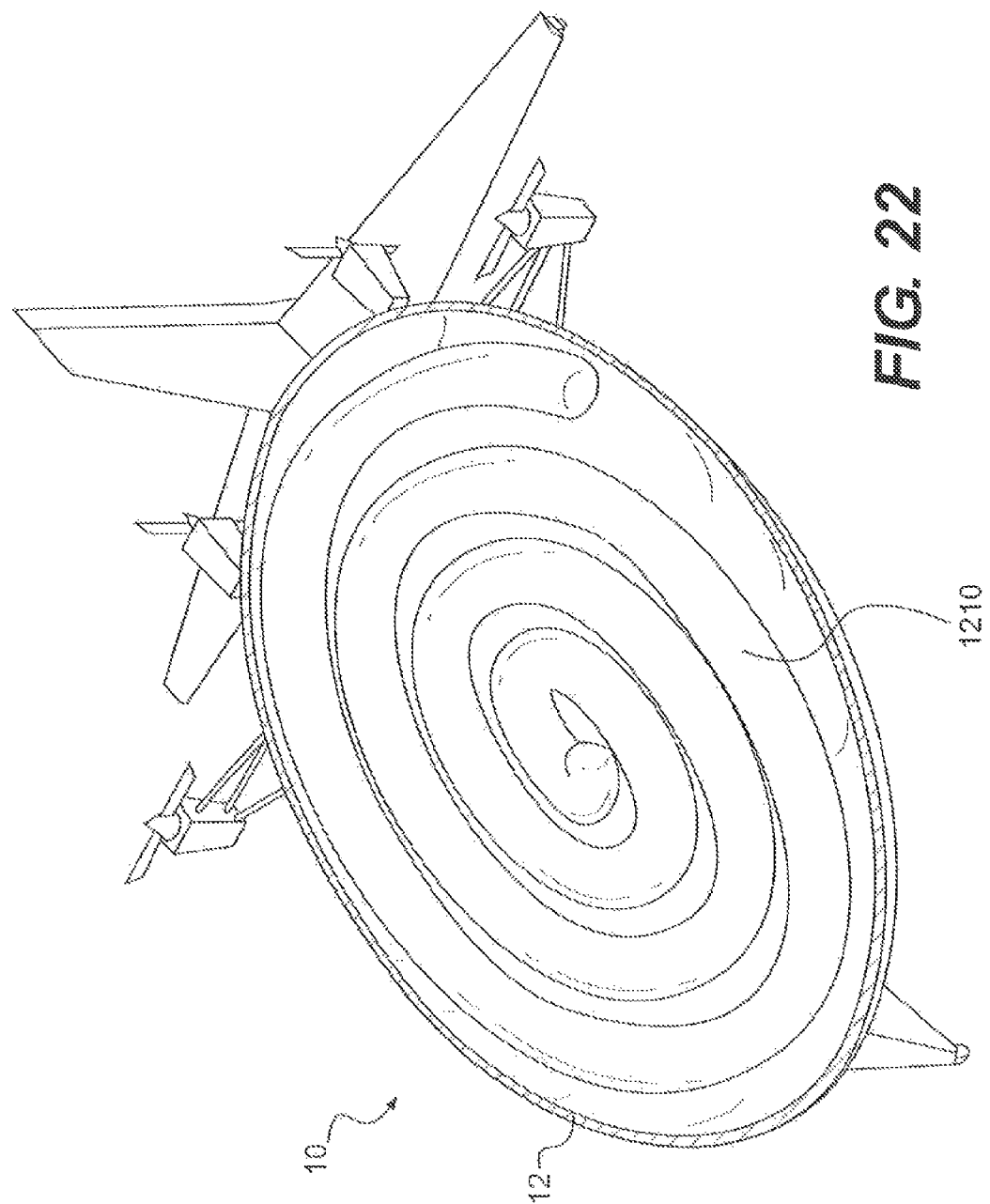
FIG. 22 illustrates an exemplary bladder configuration in a hull of an airship, consistent with disclosed embodiments.
Figure 23:
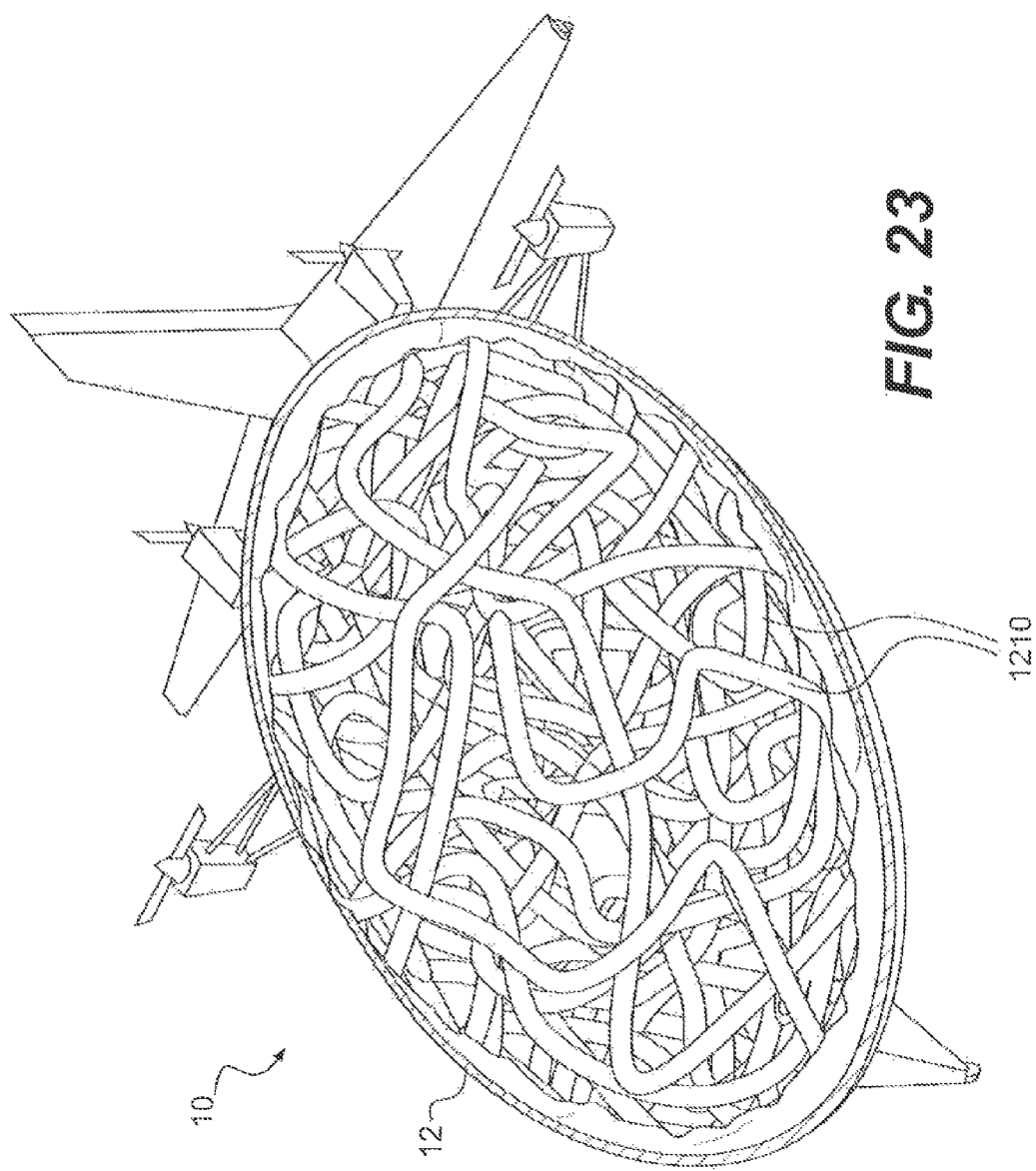
FIG. 23 illustrates an exemplary bladder configuration in a hull of an airship, consistent with disclosed embodiments.

In some embodiments, airship 10 may include a string bladder 1210, as shown, for example, in FIG. 22. Such a string bladder 1210 may have a length that is two or more times as long as a length of hull 12, and may be disposed within hull 12 such that string bladder 1210 curves or folds upon itself within hull 12. In some embodiments, string bladder 1210 may be disposed in an organized pattern, such as the spiral shown in FIG. 22. Alternatively, or additionally, airship 10 may include a string bladder 1210 that is randomly amassed within hull 12 (e.g., like spaghetti), as shown in FIG. 23.

In some embodiments, bladders 1200 may be formed of a self-sealing material. As discussed above with respect to hull 12, persons of ordinary skill in the art will recognize self-sealing technologies suitable for implementation in bladders 1200.

As an alternative to, or in addition to, multiple bladders 1200, envelope 282 associated with hull 12 may be divided by a series of "walls" or dividing structures (not shown) within envelope 282. These walls may create separated "compartments" that may each be filled with a lighter-than-air lifting gas individually. Such a configuration may mitigate the consequences of the failure of one or more compartments (e.g., a leak or tear in the fabric) such that airship 10 may still possess some aerostatic lift upon failure of one or more compartments. In some embodiments, each compartment may be in fluid communication with at least one other compartment, and such walls may be fabricated from materials similar to those used in fabrication of envelope 282, or, alternatively (or in addition), different materials may be used. According to some embodiments, envelope 282 may be divided into four compartments using "walls" created from fabric similar to that used to create envelope 282. One of skill in the art will recognize that more or fewer compartments may be utilized as desired.

One or more of the compartments or bladders 1200 within envelope 282 may include one or more fill and/or relief valves (not shown) configured to facilitate inflation, while minimizing the risk of over-inflation of envelope 282 and/or bladders 1200. Such valves may be designed to allow entry of a lighter-than-air gas as well as allowing escape of lighter-than-air gas upon an internal pressure reaching a predetermined value (e.g., about 150 to 400 Pascals). One of skill in the art will recognize that more or fewer fill/relief valves may be used as desired and that relief pressures may be selected based on materials associated with envelope 282 and/or bladders 1200, among other things.

In addition to aerostatic lift generated by retention of a lighter-than-air gas, hull 12 may be configured to generate at least some aerodynamic lift when placed in an airflow (e.g., airship 10 in motion and/or wind moving around hull 12) based on an associated angle of attack and airflow velocity relative to the airship.

Airship 10 may also include a second envelope 283 (see FIG. 3), thus defining a space between first envelope 282 and second envelope 283, which may be utilized as a ballonet for airship 10. For example, a ballonet may be used to compensate for differences in pressure between a lifting gas within first envelope 282 and the ambient air surrounding airship 10, as well as for ballasting of an airship. The ballonet may therefore allow hull 12 to maintain its shape when ambient air pressure increases (e.g., when airship 10 descends). The ballonet may also help control expansion of the lighter-than-air gas within first envelope 282 (e.g., when airship 10 ascends), substantially preventing bursting of first envelope 282 at higher altitudes. Pressure compensation may be accomplished, for example, by pumping air into, or venting air out of, the ballonet as airship 10 ascends and descends, respectively. Such pumping and venting of air may be accomplished via air pumps, vent tabs, or other suitable devices (e.g., action of the propulsion system 30)

associated with hull 12. For example, in some embodiments, as airship 10 ascends, air pumps (e.g., an air compressor) may fill the space between first envelope 282 and second envelope 283 with air such that a pressure is exerted on first envelope 282, thereby restricting its ability to expand in response to decreased ambient pressure. Conversely, as airship 10 descends, air may be vented out of the ballonet, thereby allowing first envelope 282 to expand and assisting hull 12 in maintaining its shape as ambient pressure increases on hull 12.

Empennage Assembly

FIG. 24A illustrates an exemplary empennage assembly 25. Empennage assembly 25 may be configured to provide stabilization and/or navigation functionality to airship 10. Empennage assembly 25 may be operatively connected to support structure 20 via brackets, mounts, and/or other suitable methods. For example, in some embodiments, an empennage mount 345 similar to that shown in FIG. 24B may be used for operatively connecting empennage assembly 25 to longitudinal frame member 124 and keel hoop 120.

Figure 24D:
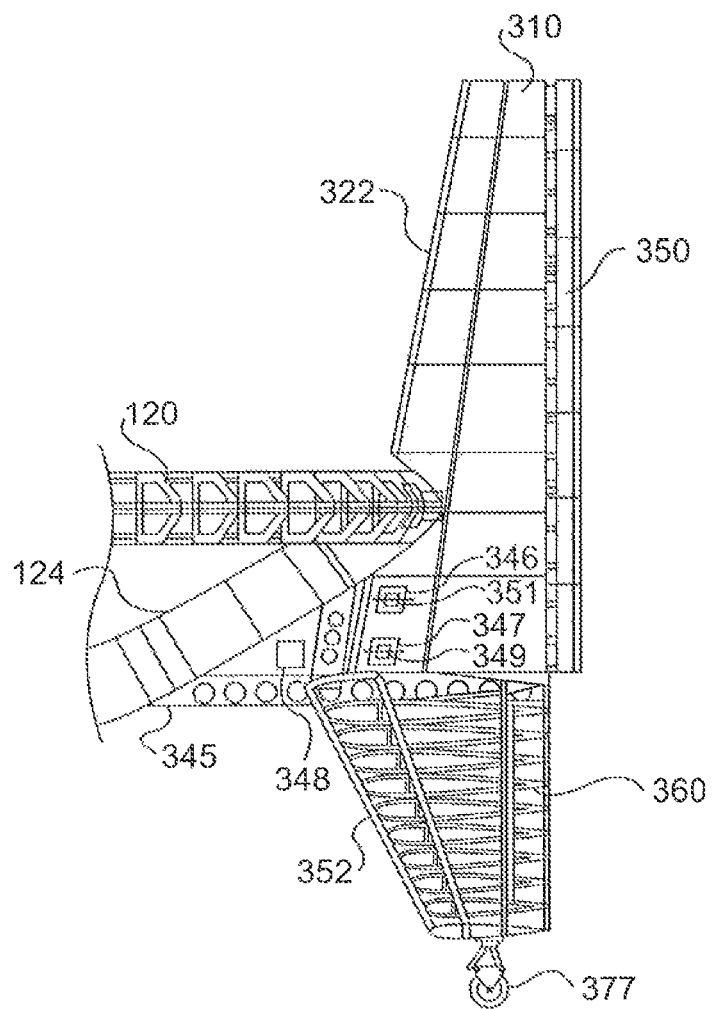
FIG. 24D illustrates an exemplary mounting configuration for an empennage assembly, consistent with disclosed embodiments.

FIG. 24D is a schematic view highlighting an exemplary mounting configuration between empennage 25, keel hoop 120, and longitudinal support member 124, utilizing empennage mount 345. One of ordinary skill in the art will recognize that numerous other mounting configurations may be utilized and are intended to fall within the scope of the present disclosure.

According to some embodiments, empennage assembly 25 may include a vertical stabilizing member 310 and horizontal stabilizing members 315 (FIG. 24A). Vertical stabilizing member 310 may be configured as an airfoil to provide airship 10 with stability and assistance in yaw/linear flight control. Vertical stabilizing member 310 may include a leading edge, a trailing edge, a pivot assembly, one or more spars, and one or more vertical control surfaces 350 (e.g., a rudder).

Vertical stabilizing member 310 may be pivotally affixed to a point on empennage assembly 25. During operation of airship 10, vertical stabilizing member 310 may be directed substantially upward from a mounting point of empennage assembly 25 to support structure 20 while the upper-most point of vertical stabilizing member 310 remains below or substantially at the same level as the uppermost point on the top surface of hull 12. Such a configuration may allow vertical stabilizing member 310 to maintain isotropy associated with airship 10. Under certain conditions (e.g., free air docking, high winds, etc.), vertical stabilizing member 310 may be configured to pivot about a pivot assembly within a vertical plane such that vertical stabilizing member 310 comes to rest in a horizontal or downward, vertical direction, and substantially between horizontal stabilizing members 315. Such an arrangement may further enable airship 10 to maximize isotropy relative to a vertical axis, thereby minimizing the effects of adverse aerodynamic forces, such as wind cocking with respect to vertical stabilizing member 310. In some embodiments consistent with the present disclosure, where hull 12 includes a thickness dimension of 7 meters and where empennage assembly 25 is mounted to keel hoop 120 and longitudinal frame member 124, vertical stabilizing member 310 may have a height dimension ranging from about 3 meters to about 4 meters.

Vertical stabilizing member 310 may include one or more spars (not shown) configured to define the planform of vertical stabilizing member 310 as well as provide support for a skin associated with vertical stabilizing member 310. The one or more spars may include a substantially carbon-based material, such as, for example, a carbon fiber honeycomb sandwich with a carbon fiber mousse. Each of the one or more spars may have openings (e.g., circular cutouts) at various locations, such that weight is minimized, with minimal compromise in strength. One of ordinary skill in the art will recognize that minimizing the number of spars used, while still ensuring desired structural support may allow for minimizing weight associated with vertical stabilizing member 310. Therefore, the one or more spars may be spaced along the span of vertical stabilizing member 310 at a desired interval configured to maximize support while minimizing weight.

A leading edge 322 may be utilized for defining an edge shape of vertical stabilizing member 310 as well as securing the spars prior to installation of a skin associated with vertical stabilizing member 310. Leading edge 322 may also include a substantially carbon-based material, such as a carbon fiber honeycomb sandwich with a carbon fiber mousse.

Leading edge 322 and the one or more spars may be aligned and fastened in place with a skin installed substantially encasing leading edge 322 and spars. The skin may include, for example, canvass, polyester, nylon, thermoplastics, and any other suitable material. The skin may be secured using adhesives, shrink wrap methods, and/or any other suitable method for securing the skin to leading edge 322 and the one or more spars.

For example, in some embodiments, a canvass material may be applied over the one or more spars and leading edge 322 then secured using an adhesive and/or other suitable fastener. The canvass material may then be coated with a polyurethane and/or thermoplastic material to further increase strength and adhesion to the one or more spars and leading edge 322.

Vertical stabilizing member 310 may also include one or more vertical control surfaces 350 configured to manipulate airflow around vertical stabilizing member 310 for purposes of controlling airship 10. For example, vertical stabilizing member 310 may include a rudder configured to exert a side force on vertical stabilizing member 310 and thereby, on empennage mount 345 and hull 12. Such a side force may be used to generate a yawing motion about yaw axis 7 of airship 10, which may be useful for compensating for aerodynamic forces during flight. Vertical control surfaces 350 may be operatively connected to vertical stabilizing member 310 (e.g., via hinges) and may be communicatively connected to systems associated with a pilot cockpit (e.g., operator pedals) or other suitable location. For example, communication may be established mechanically (e.g., cables) and/or electronically (e.g., wires and servo motors 346 and/or light signals) with the cockpit or other suitable location (e.g., remote control). In some embodiments, vertical control surfaces 350 may be configured to be operated via a mechanical linkage 351. In some cases, mechanical linkage 351 may be operably connected to one or more servo motors 346, as shown in FIGS. 24A and 24D.

Horizontal stabilizing members 315 associated with empennage assembly 25 may be configured as airfoils and may provide horizontal stability and assistance in pitch control of airship 10. Horizontal stabilizing members 315 may include a leading edge, a trailing edge, one or more spars, and one or more horizontal control surfaces 360 (e.g., elevators).

In some embodiments, horizontal stabilizing members 315 may be mounted on a lower side of hull 12 in an anhedral (also known as negative or inverse dihedral) configuration. In other words, horizontal stabilizing members 315 may extend away from vertical stabilizing member 310 at a downward angle relative to roll axis 5. The anhedral configuration of horizontal stabilizing members 315 may allow horizontal stabilizing members 315 to act as ground and landing support for a rear section of airship 10. Alternatively, horizontal stabilizing members 315 may be mounted in a dihedral or other suitable configuration.

According to some embodiments, horizontal stabilizing members 315 may be operatively affixed to empennage mount 345 and/or vertical stabilizing member 310 independent of hull 12. Under certain conditions (e.g., free air docking, high winds, etc.) horizontal stabilizing members 315 may be configured to allow vertical stabilizing member 310 to pivot within a vertical plane, such that vertical stabilizing member 310 comes to rest substantially between horizontal stabilizing members 315.

In some embodiments, a span (i.e., tip-to-tip measurement) associated with horizontal stabilizing members 315 may be approximately 10 to 20 meters across, depending on a desired size of hull 12. In some embodiments, a span associated with horizontal stabilizing members 315 may be, for example, approximately 14.5 meters. Horizontal stabilizing members 315 may include one or more spars (not shown) configured to define the planform of horizontal stabilizing members 315 as well as provide support for a skin associated with horizontal stabilizing members 315. The one or more spars may include a substantially carbon-based material, such as a carbon fiber honeycomb sandwich with a carbon fiber mousse. Each of the one or more spars may have openings (e.g., circular cutouts) at various locations, such that weight is minimized with minimal compromise in strength. One of ordinary skill in the art will recognize that minimizing the number of spars used, while still ensuring desired structural support may allow for minimizing weight associated with horizontal stabilizing members 315. Therefore, spars may be spaced along the span of horizontal stabilizing members 315 at a desired interval configured to maximize support while minimizing weight.

A leading edge 352 may be utilized for defining an edge shape of horizontal stabilizing members 315 as well as securing each spar prior to installation of a skin associated with horizontal stabilizing members 315. Leading edge 352 may also include a substantially carbon-based material, such as a carbon fiber honeycomb sandwich with a carbon fiber mousse to obtain a desirable strength-to-weight ratio. Once leading edge 352 and the one or more spars have been aligned and fastened in place, a skin may be installed substantially encasing leading edge 352 and the one or more spars. Skin materials may include, for example, canvass, polyester, nylon, thermoplastics, and/or any other suitable material. The skin may be secured using adhesives, shrink wrap methods, and/or any other suitable method. For example, in some embodiments, a canvass material may be applied over the one or more spars and leading edge 352 and secured using an adhesive, and/or other suitable fastener. The canvass material may then be coated with a polyurethane and/or thermoplastic material to further increase strength and adhesion to spars and leading edge 352.

Horizontal stabilizing members 315 may also include one or more horizontal control surfaces 360 (e.g., elevators) configured to manipulate airflow around horizontal stabilizing members 315 to accomplish a desired effect. For example, horizontal stabilizing members 315 may include elevators configured to exert a pitching force (i.e., up or down force) on horizontal stabilizing members 315. Such a pitching force may be used to cause motion of airship 10 about pitch axis 6. Horizontal control surfaces 360 may be operatively connected to horizontal stabilizing members 315 (e.g., via hinges) and may be mechanically (e.g., via cables) and/or electronically (e.g., via wires and servo motors 347 and/or light signals) controlled from a pilot cockpit or other suitable location (e.g., remote control). In some embodiments, horizontal control surfaces 360 may be configured to be operated via a mechanical linkage 349. In some cases, mechanical linkage 349 may be operably connected to one or more servo motors 347, as shown in FIG. 24A.

FIG. 24B is an illustration of an exemplary embodiment of empennage mount 345. Empennage mount 345 may be configured to operatively connect vertical stabilizing member 310, horizontal stabilizing members 315, and support structure 20. Empennage mount 345 may include similar high-strength, low-weight materials discussed with reference to support structure 20 (e.g., carbon fiber honeycomb sandwich). Further, empennage mount 345 may include fastening points configured to mate with fastening points present on support structure 20. For example, longitudinal frame member 124 and/or keel hoop 120 may be configured with fastening points near a rear location of keel hoop 120 (e.g., at approximately 180 degrees around keel hoop 120). Such fastening points may be configured to mate with fastening points provided on empennage mount 345. One of ordinary skill in the art will recognize that numerous fastener combinations may be utilized for fastening empennage mount 345 to the related fastening points of heel hoop 220 and longitudinal frame member 124.

Empennage mount 345 also may be configured to enable pivoting of vertical stabilizing member 310 such that vertical stabilizing member 310 may be placed in a position between horizontal stabilizing members 315 when desired. Empennage mount 345 may include pins, hinges, bearings, and/or other suitable devices to enable such a pivoting action. In some embodiments, vertical stabilizing member 310 may be mounted on a swivel pin (not shown) associated with empennage mount 345 and may include a latching mechanism (not shown) configured to operatively connect vertical stabilizing member 310 to keel hoop 120 and/or other suitable location. Latching mechanism (not shown) may include hawksbill latches, slam latches, spring loaded pins, striker plates, hydraulic actuators, and/or any other combination of suitable mechanisms. Control of latching mechanism (not shown) and pivoting of vertical stabilizing member 310 may be achieved utilizing mechanical (e.g., via cables) and/or electrical (e.g., via control signals and servo motors), or any other suitable control methods (e.g., via hydraulics).

Rear Landing Gear

When, for example, horizontal stabilizing members 315 are configured in an anhedral arrangement (i.e., angled downward away from hull 12) and are connected to a lower side of airship 10 (as shown in FIGS. 24A-D), horizontal stabilizing members 315 may function as ground and landing support for a rear section of airship 10. Accordingly, empennage assembly 25, specifically horizontal stabilizing members 315 may provide support for rear landing gear assembly 377.

Rear landing gear assembly 377 may be operatively connected to each airfoil associated with horizontal stabilizing members 315 (e.g., as shown in FIG. 24C). Rear landing gear assembly 377 may include one or more wheels 378, one or more shock absorbers 381, and mounting hardware 379. Rear landing gear assemblies 377 may be connected to horizontal stabilizing members 315 at a tip end and/or any other suitable location (e.g., a midpoint of horizontal stabilizing members 315).

In some embodiments, rear landing gear assembly 377 may include a single wheel mounted on an axle operatively connected via oleo-pneumatic shock-absorbers to horizontal stabilizing members 315 at an outer-most tip of each airfoil. Such a configuration may allow rear landing gear assembly 377 to provide a damping force in relation to an input (e.g., forces applied during touchdown and landing). Horizontal stabilizing member 315 may further assist in such damping based on configuration and materials used. One of ordinary skill in the art will recognize that rear landing gear assemblies 377 may include more or fewer elements as desired.

Rear landing gear assembly 377 may be configured to perform other functions including, for example, retracting and extending (e.g., with respect to horizontal stabilizing members 315), and/or adjusting for a load associated with airship 10. One of ordinary skill in the art will recognize that numerous configurations may exist for rear landing gear assembly 377 and any such configuration is meant to fall within the scope of this disclosure.

Front Landing Gear

According to some embodiments, support structure 20 may be configured to provide support as well as an operative connection to front landing gear assembly 777 (see FIG. 9A). Front landing gear assembly 777 may include one or more wheels, one or more shock absorbers, and mounting hardware. Front landing gear assembly 777 may be connected to support structure 20 at a location configured to provide stability during periods when airship 10 is at rest or taxiing on the ground. One of ordinary skill in the art will recognize that various positioning configurations of front landing gear assembly 777 (e.g., in front of passenger compartment 1120) may be used without departing from the scope of this disclosure. In some embodiments, front landing gear 777 may include dual wheels mounted on an axle operatively connected via oleo-pneumatic shock-absorbers to support structure 20 or passenger compartment 1120.

According to some embodiments, front landing gear assembly 777 may be configured to perform other functions including, for example, steering airship 10 while on the ground, retracting, extending, adjusting for load, etc. For example, front landing gear assembly 777 may include an operative connection to passenger compartment 1120 such that front landing gear assembly 777 may be turned to cause airship 10 to head in a desired direction while moving on the ground. Such a connection may include a rack and pinion, a worm gear, an electric motor, and/or other suitable devices for causing front landing gear assembly 777 to turn in response to a steering input.

According to some embodiments, front landing gear assembly 777 may include an operative connection to a steering control associated with a yoke in passenger compartment 1120. An operator may turn the yoke causing a signal indicative of a steering force to be sent to computer 600. Computer 600 may then cause an electric motor associated with front landing gear assembly 777 to cause front landing gear assembly 777 to turn in a direction indicated by the steering force input from the operator. Alternatively, steering may be accomplished via a mechanical connection (e.g., cables, hydraulics, etc.) or any other suitable method. One of ordinary skill in the art will recognize that a steering control may be linked to flight controls, a dedicated steering control, and/or other suitable control without departing from the scope of the present disclosure.

INDUSTRIAL APPLICABILITY

The disclosed airship 10 may be implemented for use in a wide range of applications. For example, in some embodiments, airship 10 may be configured to perform functions involving traveling from one location to another. For instance, airship 10 may be configured to perform a function associated with at least one of lifting objects (e.g., construction lifting), elevating a platform, transporting items (e.g., freight), displaying items (e.g., advertisement), and transporting humans (e.g., passenger carriage and/or tourism), and/or providing recreation.

In some embodiments, airship 10 may be configured to perform functions wherein the airship remains in substantially stationary flight. For example, airship 10 may be configured to perform a function including at least one of assembly of a structure, conducting cellular communications, conducting satellite communications, conducting surveillance, advertising, conducting scientific studies, and providing disaster support services. Airship 10 may include a platform or other cargo carrying structure configured to suspend communications equipment (e.g., satellite relay/receiver, cell tower, etc.) over a particular location. Because airship 10 may utilize, for example, associated control surfaces, propulsion assemblies 31, and its shape to remain suspended and substantially stationary over a given location, airship 10 may operate as a communications outpost in desired areas. Further, airship 10 may be employed for military or other reconnaissance/surveillance operations (e.g., for border patrol).

Operation of airship 10 may be performed by remotely controlling and/or utilizing manned flights of airship 10. Alternatively, or additionally, airship 10 may be operated by preprogrammed automated controls, particularly for applications involving stationary flight.

In some embodiments, airship 10 may be configured to fly at altitudes of 30,000 feet or more. Capability of flying at such altitudes may facilitate various aforementioned operations, such as surveillance, communications, scientific studies, etc. In addition, high altitude flight such as this may enable airship 10 to take advantage of jet streams, and also fly above adverse weather conditions and/or turbulence that may otherwise be present at lower altitudes. In addition, flying at high altitudes, above clouds, may expose solar panel 1010 to more sunlight. Further, at higher altitudes, sunlight may be more intense, further enhancing collection of solar energy.

In some embodiments, airship 10 may be configured for use at extreme high altitudes, e.g. as a replacement for satellites. Such embodiments of airship 10 may be configured for stationary or mobile flight at altitudes of more than 60,000 feet. Certain embodiments may be capable of normal operation at altitudes of more than 100,000 feet.

In some contemplated applications, airship 10 may be flown using solar energy during daylight hours and batteries at night and/or while flying beneath cloud cover. During flight in which airship 10 may be flown completely using solar energy, airship 10 may store any excess solar energy collected by using it to charge batteries 1030.

Whether configured for manned, un-manned, and/or automated flight, airship 10 may, according to some embodiments, be controlled by a computer 600. For example, propulsion assemblies 31 and control surfaces, among other things, may be controlled by a computer 600. FIG. 25 is a block diagram of an exemplary embodiment of a computer 600 consistent with the present disclosure. For example, as shown in FIG. 25, computer 600 may include a processor 605, a disk 610, an input device 615, a multi-function display (MFD) 620, an optional external device 625, and interface 630. Computer 600 may include more or fewer components as desired. In this exemplary embodiment, processor 605 includes a CPU 635, which is connected to a random access memory (RAM) unit 640, a display memory unit 645, a video interface controller (VIC) unit 650, and an input/output (I/O) unit 655. The processor may also include other components.

In this exemplary embodiment, disk 610, input device 615, MFD 620, optional external device 625, and interface 630 are connected to processor 605 via I/O unit 655. Further, disk 610 may contain a portion of information that may be processed by processor 605 and displayed on MFD 620. Input device 615 includes the mechanism by which a user and/or system associated with airship 10 may access computer 600. Optional external device 625 may allow computer 600 to manipulate other devices via control signals. For example, a fly-by-wire or fly-by-light system may be included allowing control signals to be sent to optional external devices, including, for example, servo motors associated with propulsion unit mounts 430 and control surfaces associated with horizontal and vertical stabilizing member 310 and 315. "Control signals," as used herein, may mean any analog, digital, and/or signals in other formats configured to cause operation of an element related to control of airship 10 (e.g., a signal configured to cause operation of one or more control surfaces associated with airship 10). "Fly-by-wire," as used herein, means a control system wherein control signals may be passed in electronic form over an electrically conductive material (e.g., copper wire). Such a system may include a computer 600 between the operator controls and the final control actuator or surface, which may modify the inputs of the operator in accordance with pre-defined software programs. "Fly-by-light," as used herein, means a control system where control signals are transmitted similarly to fly-by-wire (i.e., including a computer 600), but wherein the control signals may transmitted via light over a light conducting material (e.g., fiber optics).

According to some embodiments, interface 630 may allow computer 600 to send and/or receive information other than by input device 615. For example, computer 600 may receive signals indicative of control information from flight controls 720, a remote control, and/or any other suitable device. Computer 600 may then process such commands and transmit appropriate control signals accordingly to various systems associated with airship 10 (e.g., propulsion system 30, vertical and horizontal control surfaces 350 and 360, etc.). Computer 600 may also receive weather and/or ambient condition information from sensors associated with airship 10 (e.g., altimeters, navigation radios, pitot tubes, etc.) and utilize such information for generating control signals associated with operating airship 10 (e.g., signals related to trim, yaw, and/or other adjustments).

According to some embodiments, computer 600 may include software and/or systems enabling other functionality. For example, computer 600 may include software allowing for automatic pilot control of airship 10. Automatic pilot control may include any functions configured to automatically maintain a preset course and/or perform other navigation functions independent of an operator of airship 10 (e.g., stabilizing airship 10, preventing undesirable maneuvers, automatic landing, etc.). For example, computer 600 may receive information from an operator of airship 10 including a flight plan and/or destination information. Computer 600 may use such information in conjunction with autopilot software for determining appropriate commands to propulsion units and control surfaces for purposes of navigating airship 10 according to the information provided. Other components or devices may also be attached to processor 605 via I/O unit 655. According to some embodiments, no computer may be used, or other computers may be used for redundancy. These configurations are merely exemplary, and other implementations will fall within the scope of the present disclosure.

According to some embodiments, it may be desirable for computer 600 to transmit in-flight signals configured to, for example, correct course heading and/or assist in stabilizing airship 10 independent of an operator of airship 10. For example, computer 600 may calculate, based on inputs from various sensors (e.g., altimeter, pitot tubes, anemometers, etc.), a wind speed and direction associated with ambient conditions surrounding airship 10. Based on such information, computer 600 may determine a set of operational parameters that may maintain stability of airship 10. Such parameters may include, for example, propulsion unit parameters, control surface parameters, ballast parameters, etc. Computer 600 may then transmit commands consistent with such parameters assisting in maintaining stability and/or control of airship 10. For example, computer 600 may determine that as airship 10 gains altitude, the ballonet should be pressurized to prevent over-pressurization of first envelope 282. In such a situation, computer 600 may cause air pumps to activate, thereby pressurizing the ballonet to a desirable pressure. It should be noted that data associated with wind and other various effects on airship 10 (e.g., aerodynamic stresses) may be determined empirically and/or experimentally, and stored within computer 600. This may allow computer 600 to perform various actions consistent with safely navigating airship 10.

As noted above, according to some embodiments, once aloft, it may be desired to hold airship 10 substantially stationary over a desired area and at a desired altitude. For example, computer 600 and/or an operator may transmit control signals to propulsion system 30, vertical and horizontal control surfaces 350 and 360, the ballonet, and/or other systems associated with airship 10, such that airship 10 remains substantially stationary even where wind currents may cause airship 10 to be exposed to aerodynamic forces.

Although, for purposes of this disclosure, certain disclosed features are shown in some figures but not in others, it is contemplated that, to the extent possible, the various features disclosed herein may be implemented by each of the disclosed, exemplary embodiments. Accordingly, differing features disclosed herein are not to be interpreted as being mutually exclusive to different embodiments unless explicitly specified herein or such mutual exclusivity is readily understood, by one of ordinary skill in the art, to be inherent in view of the nature of the given features.

While the presently disclosed device and method have been described with reference to the specific embodiments thereof, it should be understood by those skilled in the art that various changes may be made and equivalents may be substituted without departing from the scope of the disclosure. In addition, many modifications may be made to adapt a particular situation, material, composition of matter, process, process step, or steps to the objective, spirit, and scope of the present invention. Other embodiments of the invention will be apparent to those skilled in the art from consideration of the specification and practice of the invention disclosed herein. It is intended that the specification and examples be considered as exemplary only.

What is claimed is:
1. An airship comprising:
a hull configured to contain a gas;
at least one propulsion assembly including a propulsion device;

a cargo system including at least one cargo compartment configured to contain at least one of passengers or freight, wherein the at least one cargo compartment is disposed substantially within an outer envelope of the airship; and
a transport system configured to lower and raise at least a portion of the cargo compartment to facilitate loading and unloading of the cargo compartment;
wherein the at least one cargo compartment includes a passenger compartment and a freight compartment separate from the passenger compartment, wherein the passenger compartment and the freight compartment are spaced apart along a roll axis of the airship such that the passenger compartment is nearer a forward-most point of the hull than the freight compartment and the freight compartment is nearer a rear-most point of the hull than the passenger compartment; and
wherein the freight compartment and the passenger compartment each include an elevator associated with the transport system such that the transport system is configured to lower and raise the passenger compartment and the freight compartment separately, wherein the elevators are configured to lower and raise respective portions of the passenger compartment and the freight compartment that are smaller than the size of the passenger compartment and the freight compartment, respectively.

2. The airship of claim 1, wherein the transport system is configured to lower a portion of the cargo compartment a distance from the hull that is greater than a maximum height of the cargo compartment.

3. The airship of claim 2, wherein the elevators include collapsible wall sections.

4. An airship comprising:
a hull configured to contain a gas;
at least one propulsion assembly including a propulsion device;
a cargo system including at least one cargo compartment configured to contain at least one of passengers or freight, wherein the at least one cargo compartment is disposed substantially within an outer envelope of the airship; and
a transport system configured to lower and raise at least a portion of the cargo compartment to facilitate loading and unloading of the cargo compartment;
wherein the at least one cargo compartment includes a passenger compartment and a freight compartment separate from the passenger compartment, wherein the passenger compartment and the freight compartment are spaced apart along a roll axis of the airship such that the passenger compartment is nearer a forward-most point of the hull than the freight compartment and the freight compartment is nearer a rear-most point of the hull than the passenger compartment; and
wherein the freight compartment and the passenger compartment each include an elevator associated with the transport system such that the transport system is configured to lower and raise the passenger compartment and the freight compartment separately, wherein the elevators are configured to lower and raise a portion of a floor or platform of the cargo compartment.

5. The airship of claim 1, wherein the hull of the airship is substantially an oblate spheroid having a length, a width, and a height, the length and the width having approximately the same dimension.

6. The airship of claim 1, wherein the hull is substantially oblong, having a length, a width, and a height, wherein an aspect ratio between the length and the width is greater than 1 to 1 (1:1).

7. The airship of claim 6, wherein the aspect ratio is between approximately 4:3 and 2:1.

8. The airship of claim 7, wherein the aspect ratio is approximately 4:3.

9. The airship of claim 7, wherein the aspect ratio is approximately 3:2.

10. The airship of claim 7, wherein the aspect ratio is approximately 2:1.

11. An airship comprising:
a hull configured to contain a gas;
at least one propulsion assembly including a propulsion device;
a cargo system including at least one cargo compartment configured to contain at least one of passengers or freight, wherein the at least one cargo compartment is disposed substantially within an outer envelope of the airship; and
a transport system configured to lower and raise at least a portion of the cargo compartment to facilitate loading and unloading of the cargo compartment;
wherein the at least one cargo compartment includes a passenger compartment and a freight compartment separate from the passenger compartment, wherein the passenger compartment and the freight compartment are spaced apart along a roll axis of the airship such that the passenger compartment is nearer a forward-most point of the hull than the freight compartment and the freight compartment is nearer a rear-most point of the hull than the passenger compartment; and
wherein the freight compartment and the passenger compartment each include an elevator associated with the transport system such that the transport system is configured to lower and raise the passenger compartment and the freight compartment separately, wherein the elevators are configured to lower and raise substantially the entire passenger compartment and the entire freight compartment, respectively.

* * * * *